United States Patent [19]

Omi et al.

[11] Patent Number: 5,087,968
[45] Date of Patent: Feb. 11, 1992

[54] DIGITAL COLOR COPIER WITH COLOR SEPARATION PROCESSING

[75] Inventors: Kyoji Omi, Kawasaki; Mitsuo Hasebe, Tokyo, both of Japan

[73] Assignee: Ricoh Company, Ltd., Tokyo, Japan

[21] Appl. No.: 588,200

[22] Filed: Sep. 25, 1990

Related U.S. Application Data

[62] Division of Ser. No. 222,705, Jul. 21, 1988, Pat. No. 5,003,382.

[30] Foreign Application Priority Data

Jul. 22, 1987 [JP] Japan .................. 62-181217

[51] Int. Cl.$^5$ .............................................. H04N 1/46
[52] U.S. Cl. .......................................... 358/75; 358/78
[58] Field of Search ............... 358/75, 468, 401, 78, 358/444, 296; 346/157

[56] References Cited

U.S. PATENT DOCUMENTS

| | | | |
|---|---|---|---|
| 4,303,936 | 12/1981 | Shaw | 358/75 X |
| 4,707,126 | 1/1988 | Ohshima et al. | |
| 4,752,822 | 6/1988 | Kawamura | 358/80 |
| 4,797,712 | 1/1989 | Hayashi et al. | 358/76 |
| 4,962,421 | 10/1990 | Murai | 358/78 X |

FOREIGN PATENT DOCUMENTS

| | | | |
|---|---|---|---|
| 0144188 | 6/1985 | European Pat. Off. | 358/80 |
| 0050481 | 4/1982 | Japan | 358/75 |
| 59-171289 | 9/1984 | Japan | 358/80 |
| 60-220659 | 11/1985 | Japan | 358/80 |
| 60-232542 | 11/1985 | Japan | 358/76 |

*Primary Examiner*—Kenneth A. Wieder
*Assistant Examiner*—Glenn W. Brown
*Attorney, Agent, or Firm*—Oblon, Spivak, McClelland, Maier & Neustadt

[57] ABSTRACT

A digital color copying machine preparing an image reproducing copy by applying color separation to an original image of an original and processing color component signals for each of the separated colors into recording information. With such a digital signal processing, the color copying machine of the present invention can increase the speed and efficiency of multiple copies and can provide a symmetric copy mode, a swap or inverting copy mode and a multiple image copy mode.

3 Claims, 69 Drawing Sheets

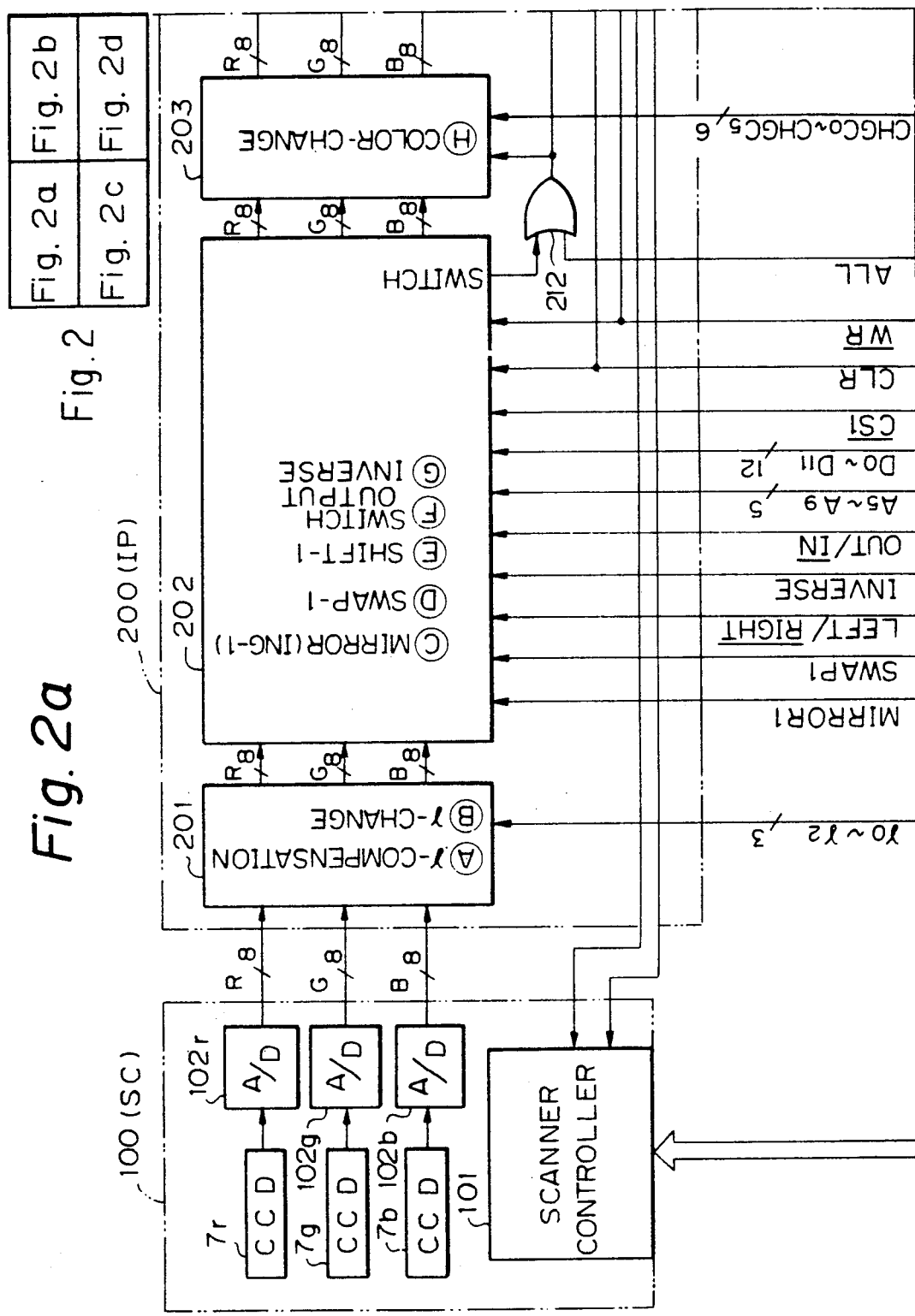

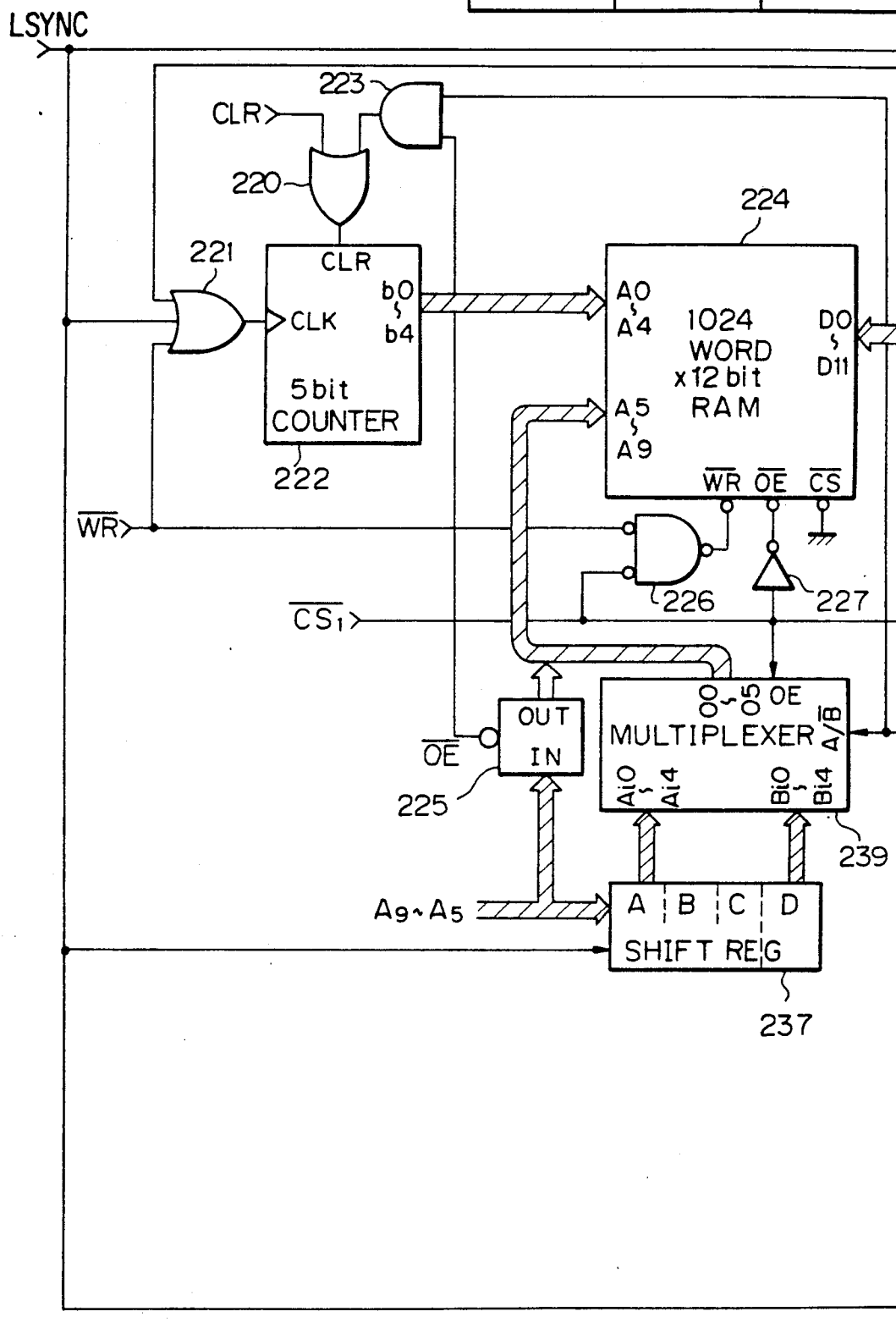

| Fig.8a | Fig.8b |
|---|---|
| Fig.8c | Fig.8d |
| Fig.8e | Fig.8f |

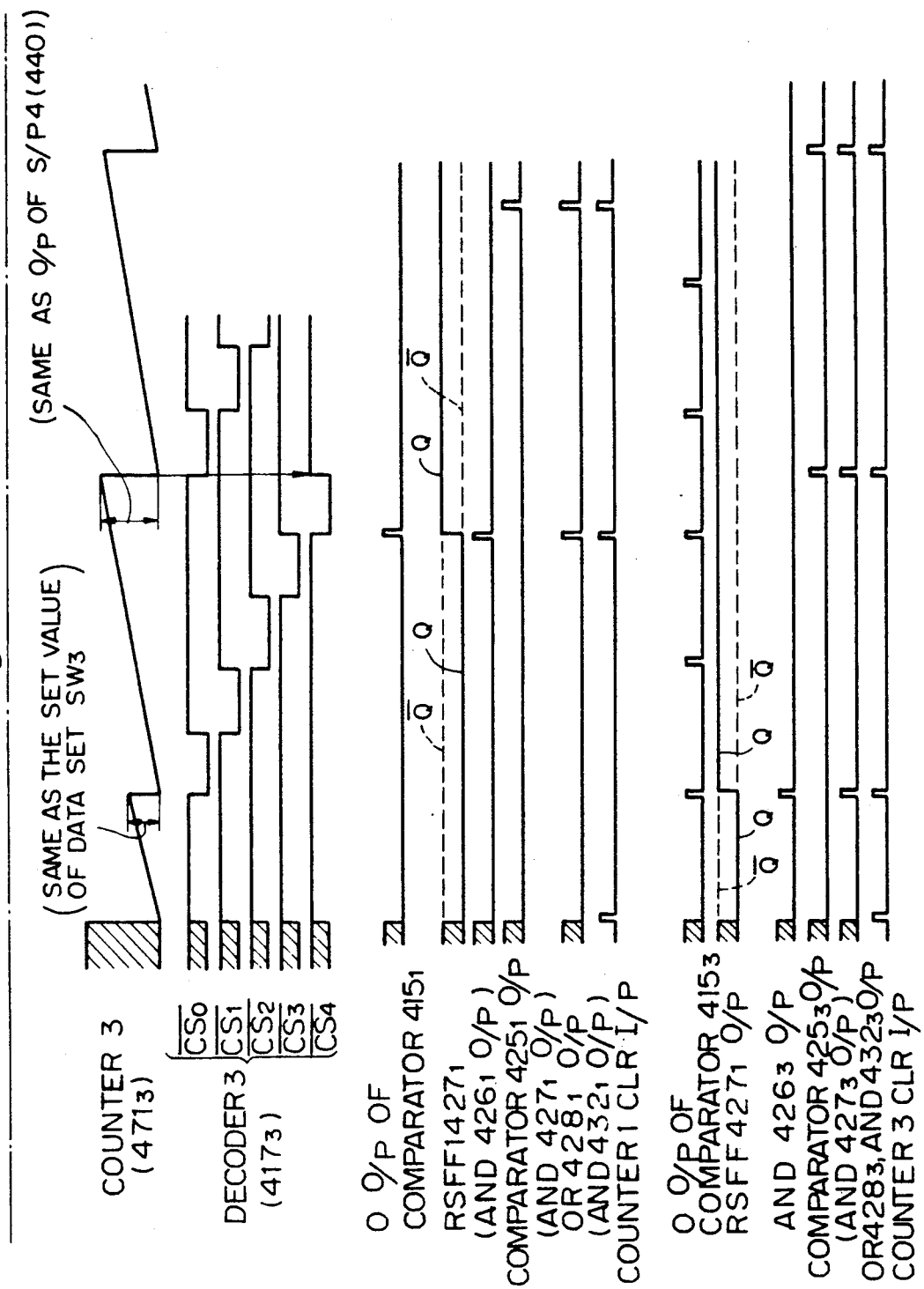

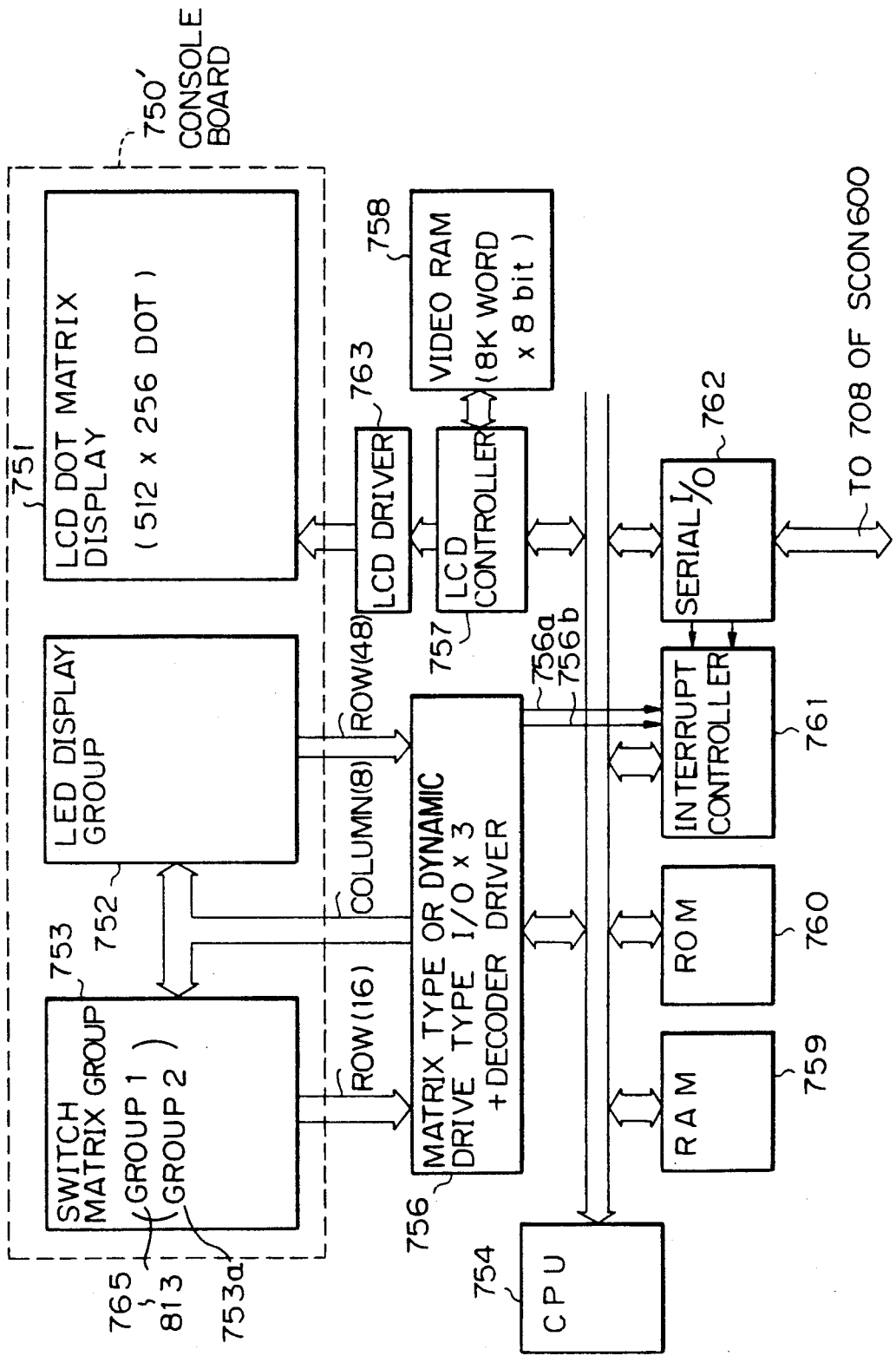

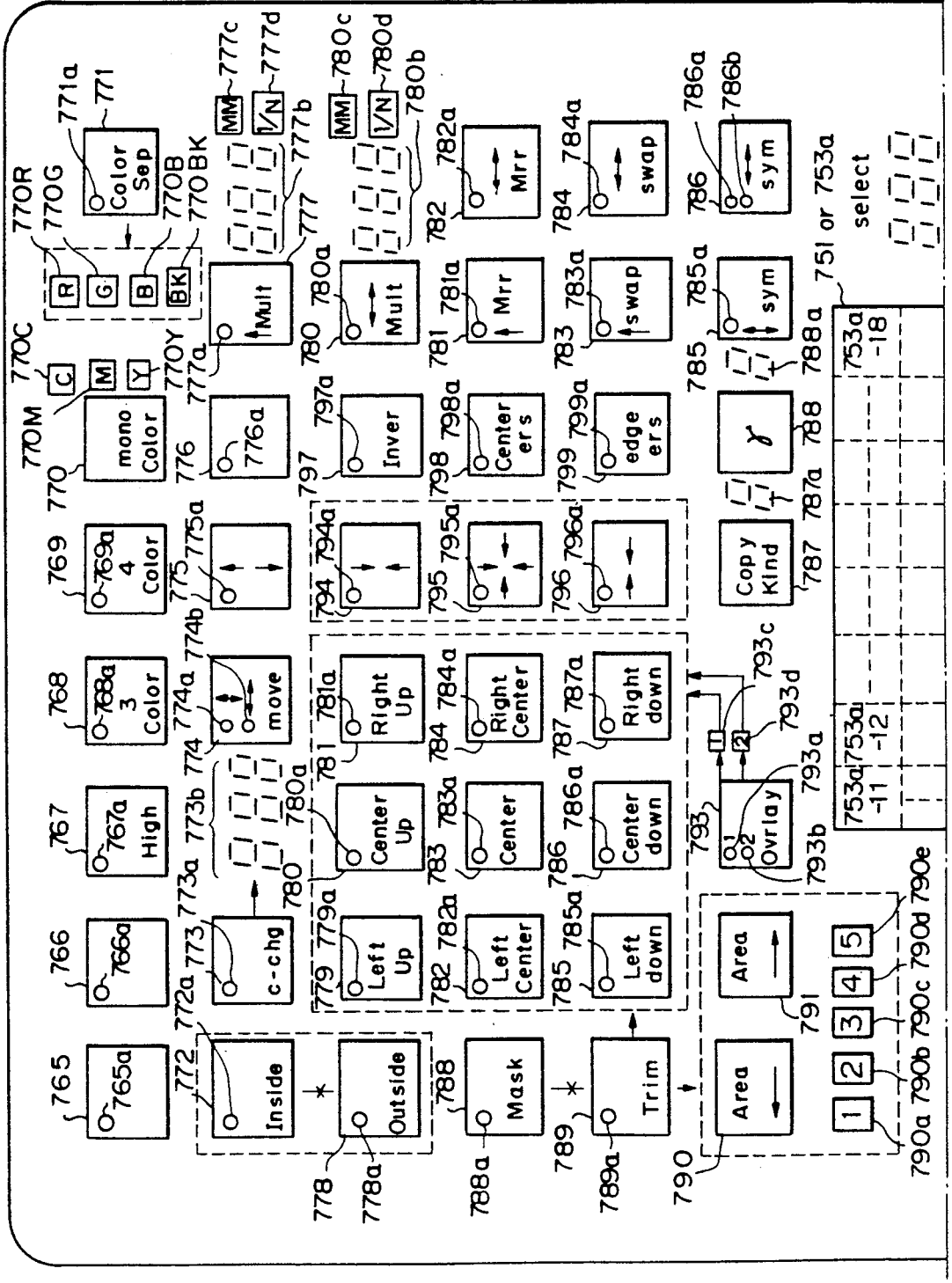

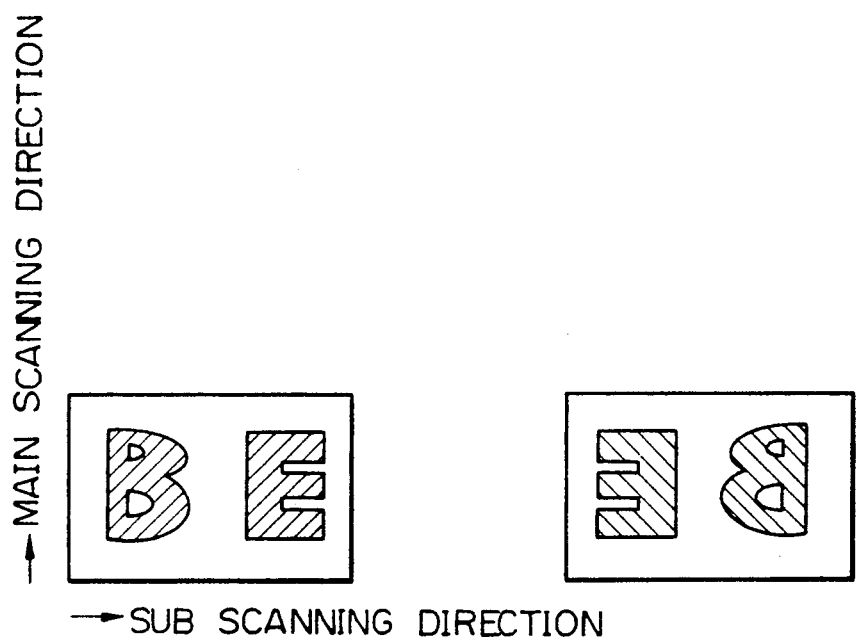
Fig.30 (a) ORIGINAL   Fig.30 (b) COPY

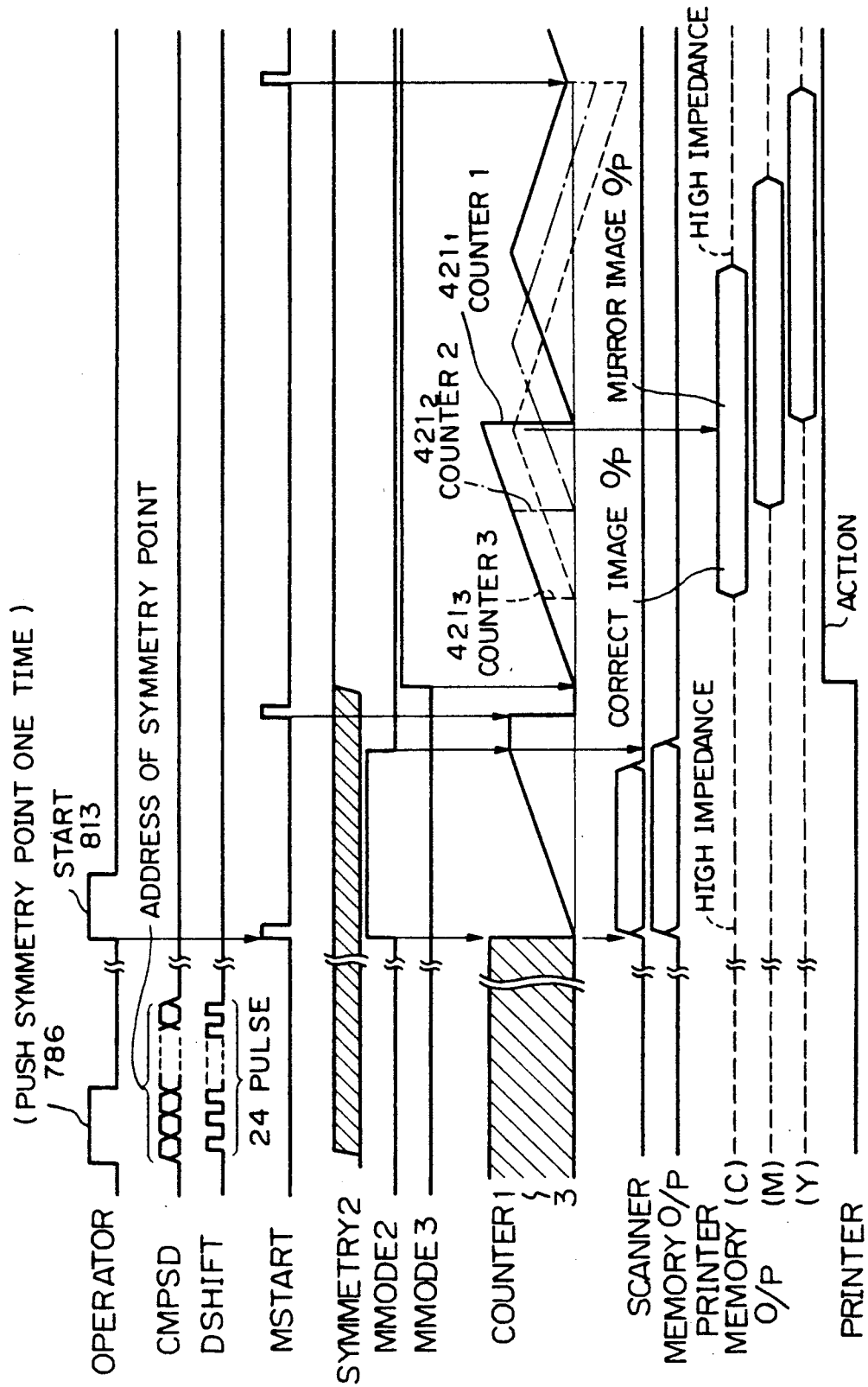

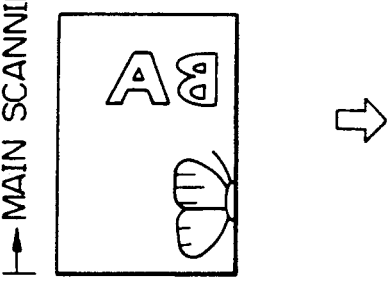
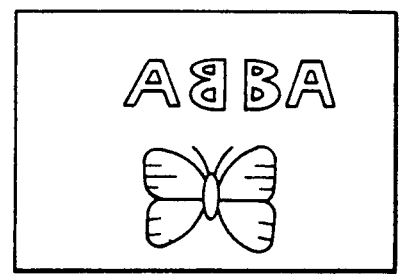
Fig. 32 (a) ORIGINAL                Fig. 32 (b) COPY
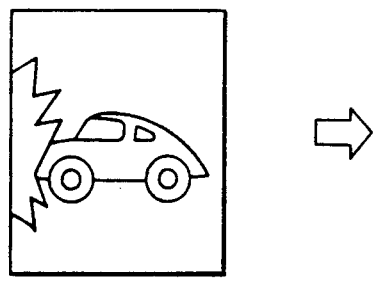
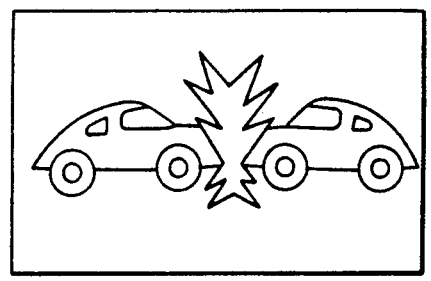
Fig. 33 (a) ORIGINAL                Fig. 33 (b) COPY

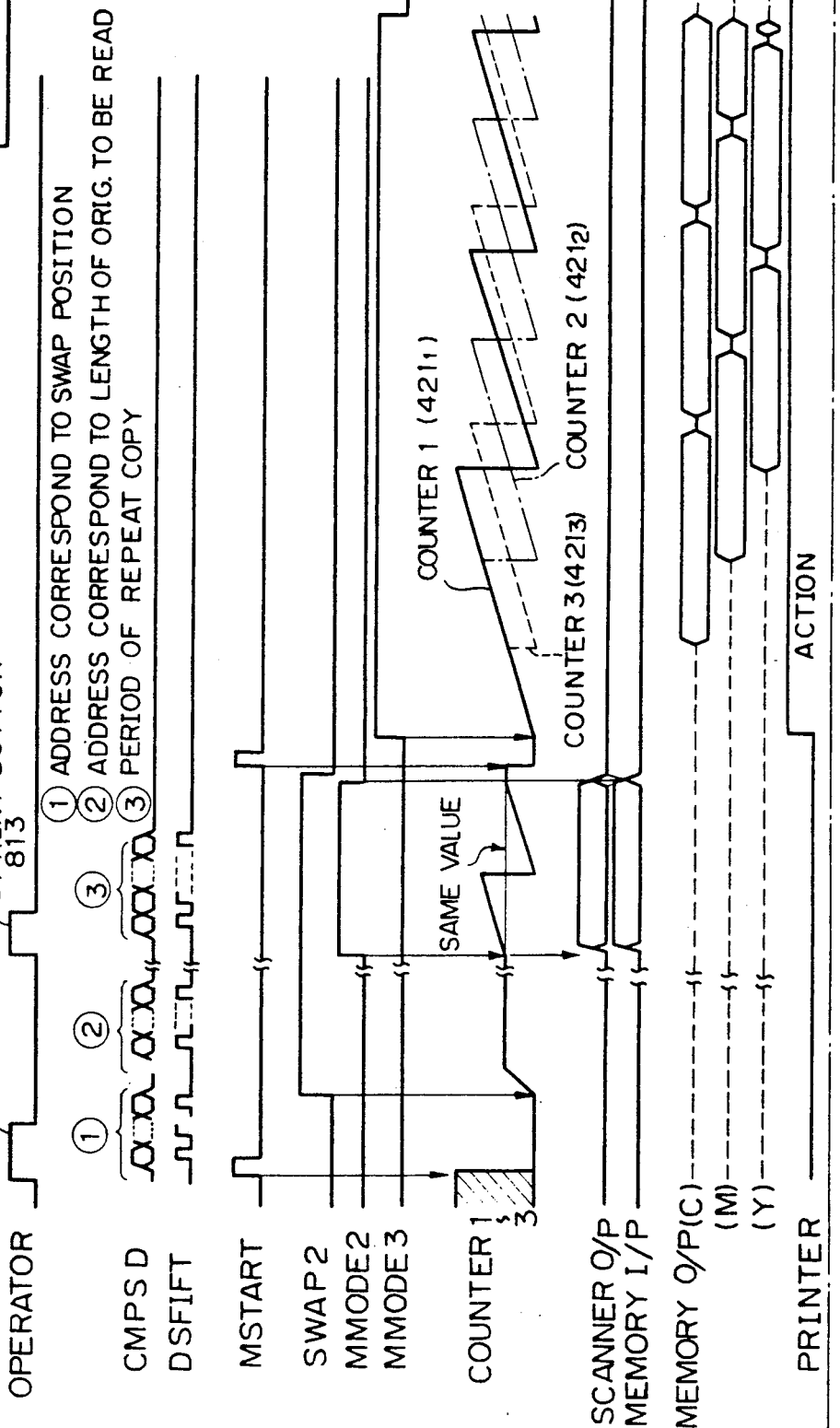

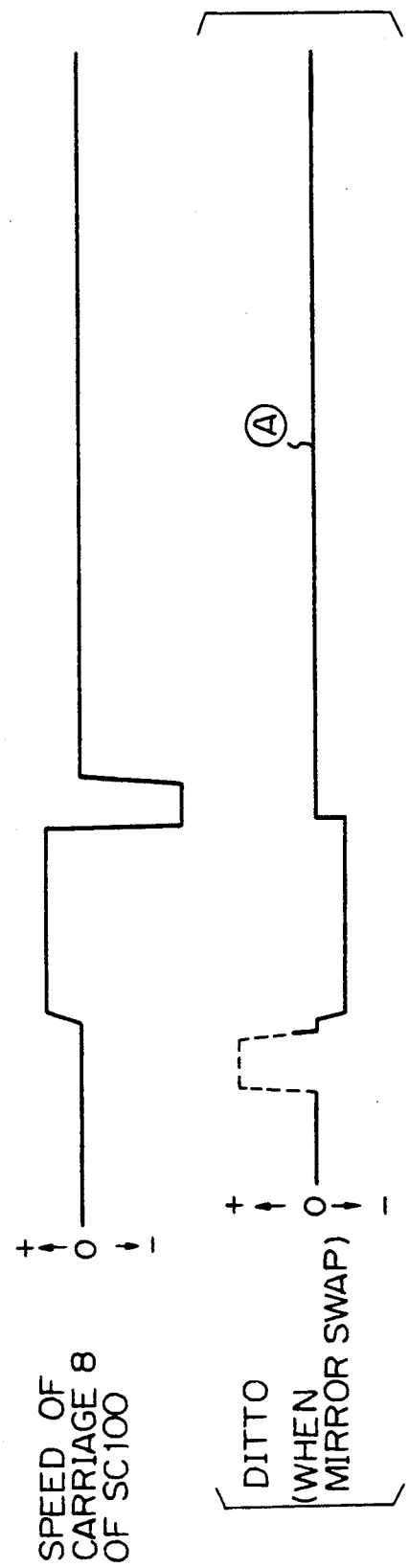

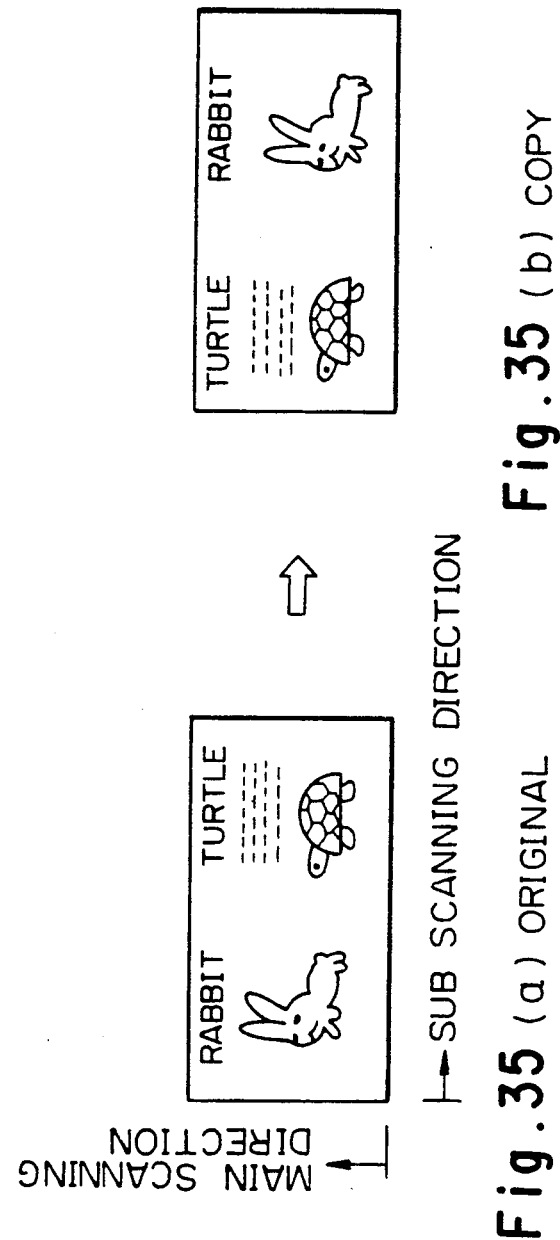

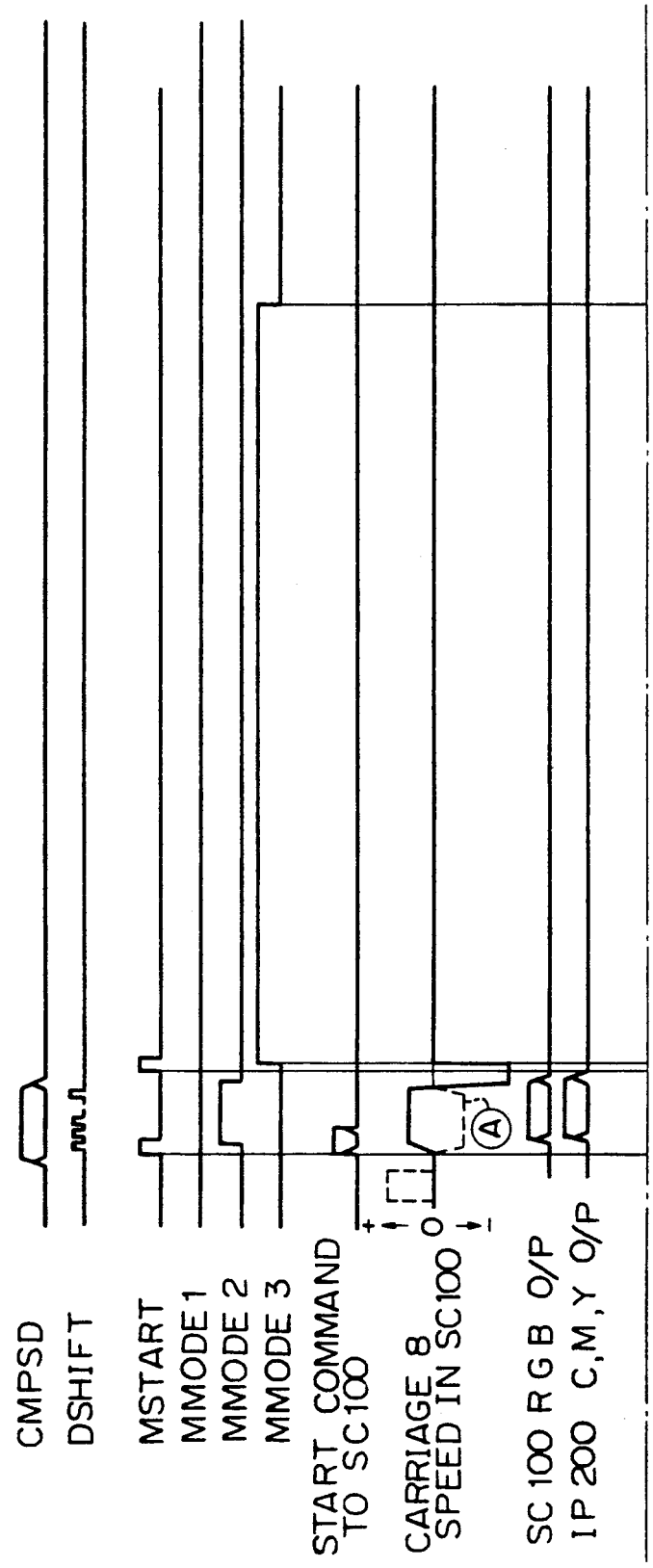

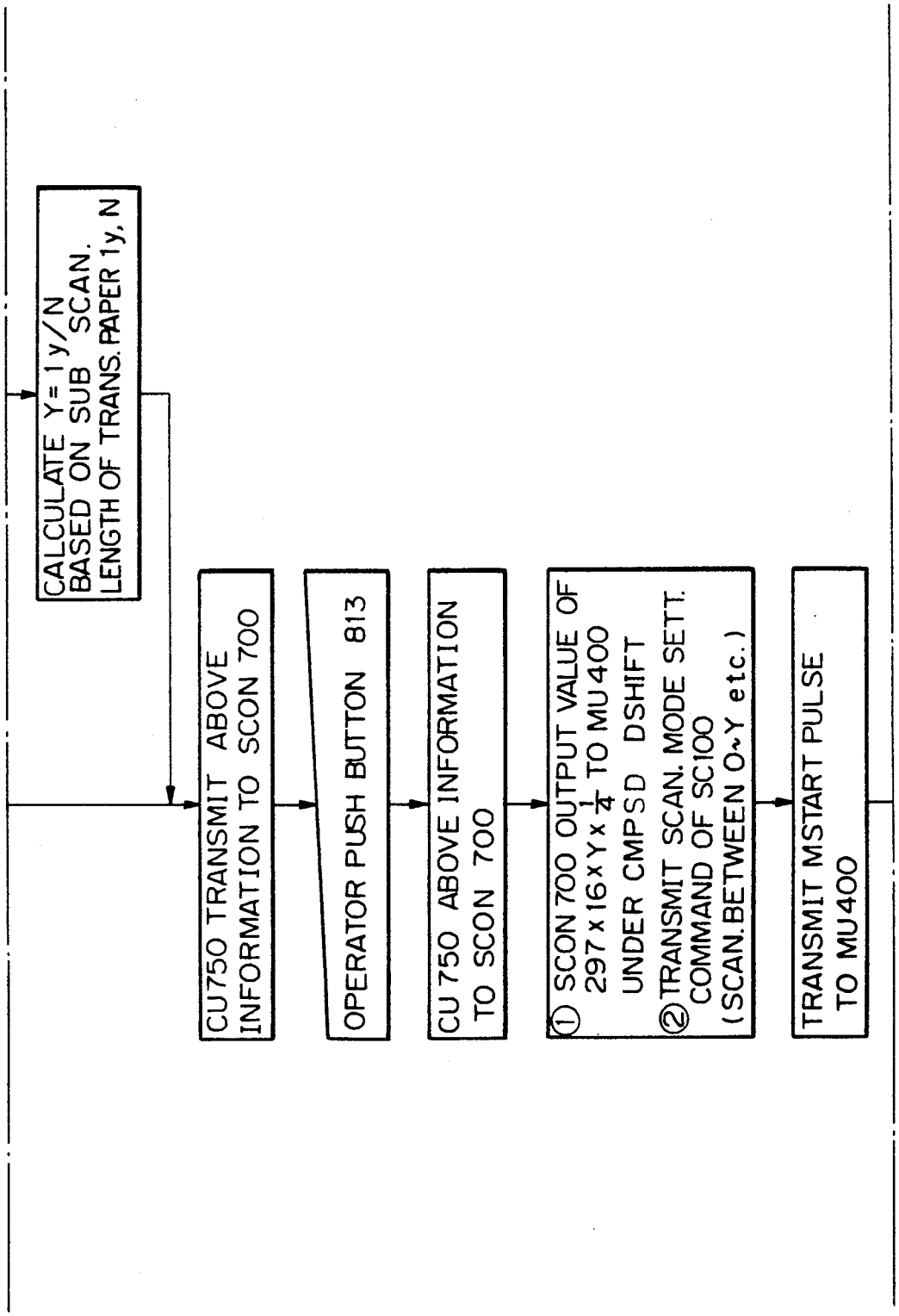

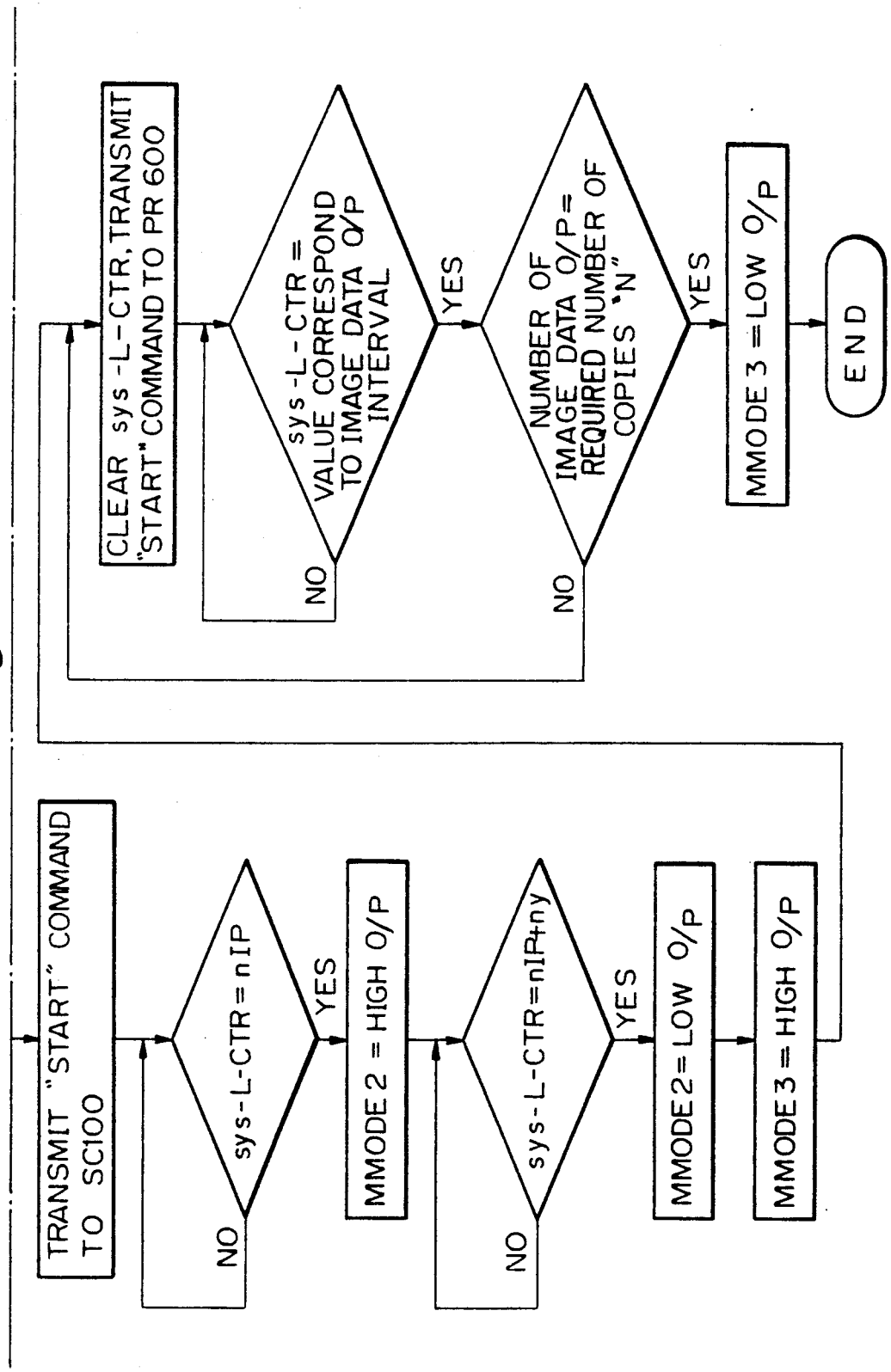

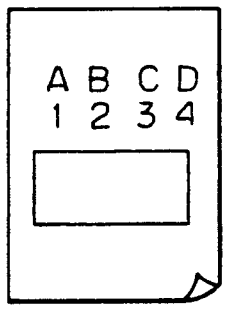
Fig.38 (a) ORIGINAL
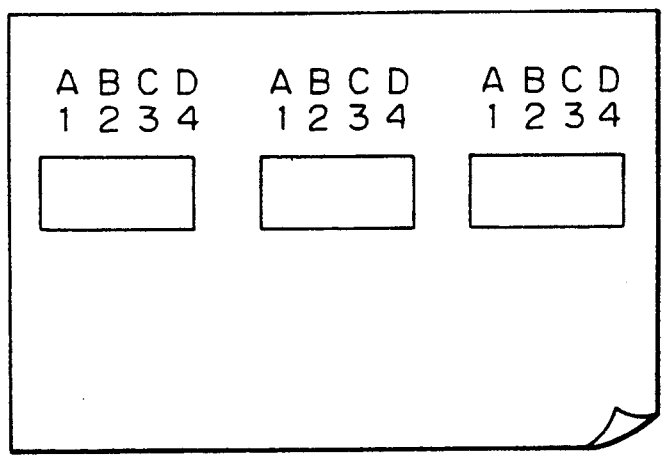
Fig.38 (b) COPY

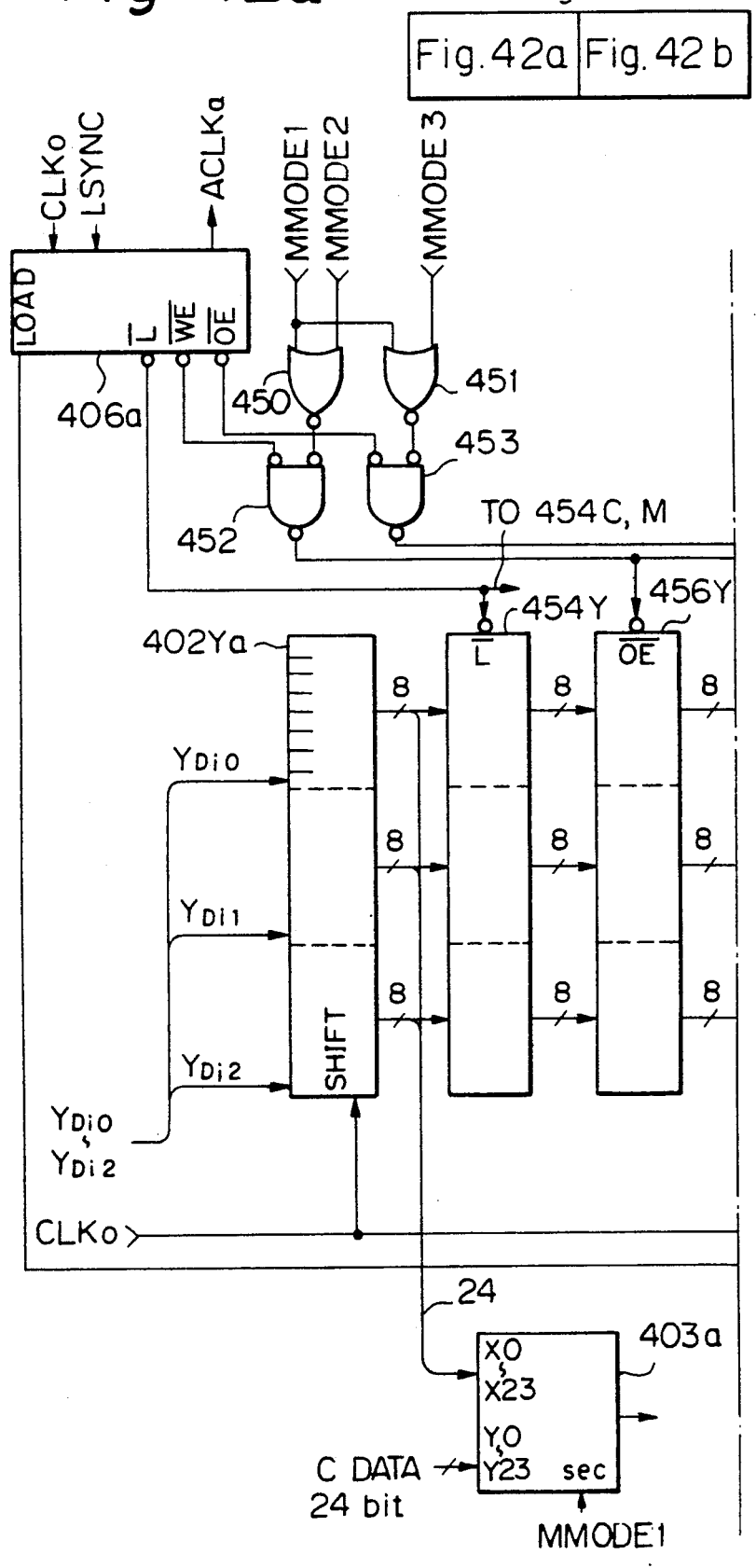

DIGITAL COLOR COPIER WITH COLOR SEPARATION PROCESSING

This is a division of application Ser. No. 07/222,705, filed on July 21, 1988, now U.S. Pat. No. 5,003,382.

BACKGROUND OF THE INVENTION

The present invention concerns a digital copying machine adapted to apply color separation to an image of an original, and to apply digital signal processing and reproducing the image.

Various types of so-called digital color copying machines capable of reproducing color original documents have been proposed so far. The digital color copying machines of this kind include those having recording means (image preparing station) for 4 colors (for example, cyan C, magenta M, yellow Y, Black BK; or red R, green G, blue B and black BK) and those having recording means for 3 colors (for example, cyan C, magenta M, yellow Y; or red R, green G and blue B).

In the copying machine having 4-color recording means, toner consumption and fixing energy are reduced by applying UCR (under-color-removal) and BP (black printing) thereby replacing the common amount of C, M and Y with BK toners. There are other types of copying machines in which signals for respective colors obtained from an original are supplied to corresponding color recording means at different delay times respectively and a color copy is obtained by a one-way path of recording paper.

While, on the other hand, those copying machines having 3-color recording means have a merit of causing less reduction in the saturation since UCR or BP processing described above is not conducted.

In any of the color copying machines described above, a single color or 2-color copy mode is of course possible in addition to the full color copy mode.

It is possible to add a 3-color mode function to those copying machines having 4-color recording means described above and select a 4-color copy mode and a 3-color copy mode. However, in those copying machines adapted to select the 4-color copy mode and the 3-color copy mode, there is no difference in the copy producing speed and, thus, in the efficiency of the copying work.

In addition, there are those systems of providing one page memory (so called frame memory) for storing signals for a plurality of colors but they have a problem in that the copy producing speed is reduced when only one sheet of copy is prepared from one sheet of original, although it is advantageous to prepare a plurality of copies from one sheet of original.

Heretofore, in the case of preparing a kind (a sheet) of synthesis copy print from two kinds (two sheets) of original, printing is at first conducted to a first original, which is then placed in an intermediate tray and the printed copy is sent again from the tray to the recording station, where printing is conducted from a second original.

For preparing a plurality of (N) sheets of synthesis copies by such a copying machine, it requires procedures of conducting print cycles for N times with the first original, placing the printed copies in the intermediate tray and then applying printing cycles for N times on one identical transfer paper. Accordingly, there is a drawback that a copying time twice as long as the usual case is required in the synthesis mode.

In the conventional copying machine for preparing a mirror image copy from an image of an original, scanning with an original reading means is made in the direction opposite to the ordinary scanning direction (positive image copy). In a case where the scanning direction of such an original reading means is made switchable, the structure of the control system becomes extremely complicated for correctly controlling the position of the original reading means and mechanical control for the speed.

Furthermore, if the size of an original is smaller than that of a platen, there is a method of setting the original at the same position as that for the positive image copy and a method of setting it on the opposite side of the positive image copy. Although the former case can provide desirable workability to an operator, detection means for the original length has to be disposed for detecting the scanning start position. On the other hand, the latter has a drawback that the operator tends to cause error in setting the original.

By the way, it at some time be required, in the copying operation, for a printed copy in which images on the left and right are exchanged with each other with respect to an optional position in the sub-scanning direction.

In a conventional copying machine, complicated procedures are necessary, for example, for conducting copying by placing an original on a platen such that one-half of the original is closed and the other half of the original is reproduced on a copy sheet, and then placing the original on the platen while closing the other remaining half of the original such that one-half of the original is reproduced on the copy.

It may be considered possible to constitute a digital copying machine of a type having one page memory (so-called frame memory) such that a left-to-right exchange copy can be prepared as described above. However, addition of the frame memory to a digital color copying machine having four image preparing stations with the aim of left-to-right exchange of an original image brings about a problem such as remarkable increases in cost.

A copy machine having a function such as preparing a copy symmetrical with respect to the sub-scanning direction has not yet been proposed. It may be considered that a digital copying machine or digital color copying machine having one page memory (so-called frame memory) can be constituted so as to obtain such a symmetric copy. However, addition of a frame memory for the exclusive use of a symmetric copy to a 4-full color digital copying machine having four image preparation station (recording means) provides a remarkable defect that the cost is increased significantly.

In any of the color copying machines described above, a single color or 2-color copy mode is of course possible in addition to the full color copy mode.

By the way, in the reproducing operation using a copying machine, there is an increasing demand for various forms of copies and one example of such requirement is the preparation of a copy in which a plurality of images from one original are disposed side by side on one identical transfer paper (hereinafter simply referred to as a multi-image copy).

It may be considered that such a multi-image copy may be prepared, for example, by recycling transfer paper as a recording medium by a required number of images, and preparing images while successively shifting the phase between the transfer paper and the original while simultaneously scanning the original for a number of times corresponding to the recycling times of the transfer paper. However, this method has the drawback that the copy producing time is considerably increased.

While, on the other hand, it is also possible to constitute that such image signals from an original are stored in a frame memory and the image signals are supplied from the frame memory to the image preparing station (recording means) for a plurality of times thereby preparing a multi-image copy. However, additional disposition of a frame memory for a multi-image copy to a full color copying machine having a plurality of image preparing stations and having a delay means to each of a plurality of image preparing stations has the drawback of remarkably increasing the cost of the reproducing machine.

SUMMARY OF THE INVENTION

A first object of the present invention is to overcome the foregoing drawbacks in the prior art and provide a digital color copying machine having an ordinary copy mode for preparing a kind of print copy from a kind of an original and a synthesis copy mode of preparing a kind for print copy from two kinds of originals in which the copy producing speed (CPM) is high in both of the modes and has a plurality of image preparing stations (generally for BK, C, M and Y in total four) and memory means for supplying a plurality of color signals generated at an identical timing with delay times different from each other to a plurality of image preparing stations, wherein a high copy producing speed can be obtained also in the synthesis copy mode without an additional provision of a memory device.

According to the present invention, the above mentioned first object is achieved by a first digital color copying machine having an ordinary copy mode in which one kind of printed copy is prepared from one kind of original and having a synthesis copy mode in which one kind of printed copy is prepared from two kinds of originals, which comprises:

a) a reading means for reading an original image of an original with color separation and outputting image signals based on the original image, the image signals are less by one in number than recording color components, b) a processing means for processing the image signals into recording informations, the recording informations being identical in number with the recording color components, c) a memory means having a first output means, a store means and a second output means, the first output means outputting the processed recording informations respectively with delay by a predetermined number of picture elements on the every recording color component, the store means storing recording color informations selected from the processed recording informations, the recording color informations being less by one in number than the recording color components, the second output means for outputting from the store means the stored recording color informations respectively with delay by a predetermined number of picture elements on the every recording color component, the processed recording informations being delivered to the memory means from the processing means, d) a plurality of first recording means for recording different colors on a recording medium based on the recording color informations delivered from the first output means or the second output means, the different colors corresponding to the recording color informations respectively, e) a second recording means for recording a single color on the recording medium based on one of the recording informations from the processing means, f) a first instruction means for instructing a setting of any one of the ordinary copy mode and the synthesis copy mode, g) a second instruction means for instructing a start of the machine, h) a first actuating means for actuating the reading means, the processing means, the store means, the first output means, the first recording means and the second recording means depending on a start instruction from the second instruction means, when said ordinary copy mode is set by the first instruction means, i) a second actuating means for actuating said reading means, the processing means and the memory means depending on a first start instruction from said second instruction means, when the synthesis copy mode is set by the first instruction means, and j) a third actuating means for actuating the reading means, said processing means and said second recording means for the single color, and actuating the reading means, said processing means, said store means and said first recording means for the different colors depending on a second start instruction from a second instruction means, when said synthesis copy mode is set by the first instruction means.

According to above mentioned first digital color copying machine of the present invention, it is possible to provide a digital color copying machine having excellent functions as compared with the prior art such as:

(1) both an ordinary copy and synthesis copy can be obtained at high efficiency, (2) highly efficient synthesis functions can be obtained substantially at the same cost for that of the usual digital color copying machine, (3) since only one image preparing process is necessary for one sheet of synthesis copy, wear of the machine and energy consumption are reduced and transfer paper has only to be transported once, to improve the reliability, (4) a synthesis copy of a first original and a plurality of second originals can be prepared efficiently, etc.

A second object of the present invention is to overcome the foregoing drawbacks in the prior art and provide a digital color copying machine at a reduced cost having a 4-full color mode and a 3-full color mode in which the copy producing speed can particularly be improved in the 3-full color mode.

According to the present invention, the above mentioned second object is achieved by a second digital color copying machine having a fundamental copy mode in which read scannings of an original for N times for preparing N (N =1,2, 3. . .) sheets of copies are conducted and having a high speed copy mode in which a read scanning of the original for once for preparing N sheets of copies is conducted, comprising;

a) a reading means for reading an original image of an original with color separation and outputting image signals based on the original image, the image signals are less by one in number less than recording color components,
b) a processing means for processing the image signals into recording informations, said recording informations are identical in number with the recording color components,
c) a memory means having a first output means, a store means and a second output means,
   the first output means for outputting the processed recording informations respectively with delay by a predetermined number of picture elements on the every recording color component,
   the store means for storing recording color informations selected from the processed recording informations, the recording color informations being less by one in number than the recording informations,
   the second output means for outputting from the store means the stored recording color informations respectively with delay by a predetermined number of picture elements on the every recording color component,
   the processed recording informations being delivered to the memory means from the processing means,
d) a plurality of first recording means for recording different colors on a recording medium based on the recording color informations delivered from the first output means or the second output means, the different colors corresponding to the recording color informations respectively,
e) a second recording means for recording a single color on the recording medium based one of the recording informations from the processing means,
f) an instruction means for instructing a setting of any one of the fundamental copy mode and the high speed copy mode,
g) a first acturating means for actuating for N times the reading means, the processing means, the store means, said first output means, the first recording means and the second recording means when the fundamental copy mode is set by the first instruction means,
h) a second actuating means for actuating the reading means, said processing means and said memory means when said high speed copy mode is set by the instruction means, and
i) a third actuating means for actuating the reading means, the processing means, the store means, the second output means and the first recording means for the different colors and actuating for (N−1) times the second output means and the first recording means, when the high speed mode is set by the first instruction means.

According to above mentioned second digital color copying machine of the present invention, it is possible to provide a digital color copying machine of excellent function as compared with the prior art in a digital color copying machine having a 4-full color copy mode and a 3-full color copy mode such that:
(1) the copy producing speed can remarkably be improved in 3-full color copy mode,
(2) high speed copy mode can be realized with no remarkable increase in the cost,
(3) since the operation cycles of the original reading means is less, the reliability can be improved and consumption of energy can be reduced in the high speed copy mode,
(4) since reading by the original reading means is only for once in the high speed copy mode, image fluctuation during reproduction due to the fluctuation in the output of an image pick-up device (sensor) can be removed, etc.

A third object of the present invention is to provide a digital color copying machine at a reduced cost having a copy mode for supplying a plurality of color signals generated at an identical time to a plurality of image preparing stations (recording means) at delay times different with each other respectively, and a mirror image copy mode for recording a plurality of color signals and preparing an image while reading the data of the stored color signals in the direction opposite to that for the storing and at different phases.

According to the present invention, the above mentioned third object is achieved by a third digital color copying machine having a fundamental copy mode and a mirror image copy mode in which a printed image is reversed relative to a sub-scanning direction to a printed image, comprising;
a) a reading means for reading an original image of an original with color separation and outputting image signals based on the original image, the image signals are less by one in number less than recording color components,
b) a processing means for processing the image signals into recording informations, the recording informations are identical in number with the recording color components,
c) a memory means having a first output means, a store means and a second output means,
   the first output means for outputting the processed recording informations respectively with delay by a predetermined number of picture elements on the every recording color component,
   the store means for storing recording color informations selected from the processed recording informations, the recording color informations being less by one in number than the recording informations,
   the second output means for outputting the outputting from the store means the stored recording color informations respectively with delay by a predetermined number of picture elements on the every recording color component,
   the processed recording informations being delivered to the memory means from the processing means,
d) a plurality of first recording means for recording different colors on a recording medium based on the recording color informations delivered from the first output means or the second output means, the different colors corresponding to the recording color informations respectively,
e) a second recording means for recording a single color on the recording medium based one of the recording informations from the processing means,
f) an instruction means for instructing a setting of any one of the fundamental copy modes and the mirror image copy mode,
g) a first actuating means for actuating the reading means, the processing means, the store means, the first output means, first recording means and the second recording means when the fundamental copy mode is set by the first instruction means,
h) a second actuating means for actuating the reading means, the processing means and the memory means when the mirror image copy mode is set by the instruction means, the reading means being actuated such that the addressing is conducted along a sub-scanning direction, and i) a third actuating means for actuating the reading means, the processing means, the store means, the first output means and the first recording means for the different colors, when the mirror image copy mode is set by the first instruction means, the first output means being actuated such that the addressing is conducted along the other sub-scanning direction opposite to the one sub-scanning direction.

According to above mentioned third digital color copying machine of the present invention, a digital color copying machine having a excellent function as compared with the conventional art can be provided such that:

(1) mirroring copy in the sub-scanning direction can be obtained by adding simple memory control means and control softwares to delay memory means of a digital color copying machine of a type having four recording means, (2) since original reading means is scanned only once for preparing a plurality of sheets of mirroring copies, energy consumption and abrasion in the structural portions can be reduced, (3) the position at which the original is placed on a platen is quite the same as that for a normal image copy and there is no requirement for a pre-scanning means, etc. for the detection of the original length, (4) it requires no additional functions for highly accurate scanning control in both forward and backward directions to the document reading means and, accordingly, document reading means employed so far can be utilized, etc.

A fourth object of the present invention is to provide a digital color copying machine having image preparing stations for plurality of colors (for instance, C, M, Y and BK) and memory means for supplying a plurality of color signals obtained by color separation an original image to image preparing stations at delay times different with each other, in which a left-to-right image swap copying function (hereinafter referred to as sub-scanning direction swap copy mode) can be realized by mere addition of simple circuits and softwares.

According to the present invention, the above mentioned fourth object is achieved by a fourth digital color copying machine having a fundamental copy move and having an image swap copy mode in which both side images along a sub-scanning direction are swapped with each other, comprising;

a) a reading means for reading an original image of an original with color separation and outputting image signals based on the original image, the image signals are less by one in number less than recording color components, b) a processing means for processing the image signals into recording informations, the recording informations are identical in number with the recording color components, c) a memory means having a first output means, a store means and a second output means, the first output means for outputting the processed recording informations respectively with delay by a predetermined number of picture elements on the every recording color component, the store means for storing recording color informations selected from the processed recording informations, the recording color informations being less by in number than the recording informations, the second output means for outputting from the store means the stored recording color informations respectively with delay by a predetermined number of picture elements on the every recording color component, the processed recording informations being delivered to the memory means from the processing means, d) a plurality of first recording means for recording different colors on a recording médium based on the recording color informations delivered from the first output means or the second output means, the different colors corresponding to the recording color components respectively, e) a second recording means for recording a single color on the recording medium based one of the recording informations from the processing means, f) an instruction means for instructing a setting of any one of the fundamental copy mode and the image swap copy mode, g) a first actuating means for actuating the reading means, the processing means, the store means, the first output means, the first recording means and the second recording means when the fundamental copy mode is set by the first instruction means, h) a second actuating means for actuating the reading means, the processing means and the memory means, when the image swap copy mode is set by the instruction means, and i) a third actuating means for actuating the reading means, the processing means, the store means and the first recording means for the different colors, when the image swap copy mode is set by the first instruction means, the first out means being actuated such that the addressing along a sub-scanning direction is different from that of the reading means.

According to above mentioned fourth digital color copying machine of the present invention, it is possible to easily prepare a copy in which images on the left and right of an original are swapped with respect to an optional position in the sub-scanning direction by merely adding simple circuits and softwares to a copying machine having a plurality of image preparing stations (recording means) and signal delaying memories and, accordingly, a digital color copying machine having an excellent function as compared with the prior art can be provided.

A fifth object of the present invention is to provide a digital color copying machine at a reduced cost capable of preparing an image of a copy in which an image identical with the original image of an original (or an image magnified variably from the original image) is situated to the upstream in the sub-scanning direction of the copy paper, while a mirrored image in the sub-scanning direction of the original image is situated side by side to the down stream thereof, or in which a mirrored image from the original image in the sub-scanning direction is situated to the upstream, while an image identical with the original image is situated side by side to the down stream.

According to the present invention, the above mentioned fifth object is achieved by a fifth digital color copying machine having a foundamental copy mode and having a sub-scanning direction symmetric copy mode in which a printed image is symmetric along sub-scanning direction symmetric copy comprising;

a) a reading means for reading an original image of an original with color separation and outputting image signals based on the original image, the image signals are less by one in number less than recording color components, b) a processing means for processing the image signals into recording informations, the recording informations are identical in number with the recording color components, c) a memory means having a first output means, a store means and a second output means, the first output means for outputting the processed recording informations respectively with delay by a predetermined number of picture elements on the every recording color component, the store means for storing recording color informations selected from the processed recording informations, the recording color informations being less by one in number than the recording informations, the second output means for outputting from the store means the stored recording color informations respectively with delay by a predetermined number of picture elements on the every recording color component, the processed recording informations being delivered to the memory means from the processing means, d) a changing means for changing an addressing direction of the first output means along a sub-scanning direction, e) a plurality of first recording means for recording different colors on a recording medium based on the recording color informations delivered from the first output means or the second ouput means, the different colors corresponding to the recording color informations respectively, f) a second recording means for recording a single color on the recording medium based one of the recording informations from the processing means, g) an instruction means for instructing a setting of any one of said fundamental copy mode and the sub-scanning direction symmetric copy mode, h) a first actuating means for actuating the reading means, the processing means, the store means, the first output means, the first recording means and the second recording means, when the sub-scanning direction symmetric copy mode is set by the first instruction means, i) a second actuating means for actuating the reading means, the processing means and the memory means, when the sub-scanning direction symmetric copy mode is set by the instruction means, and j) a third actuating means for actuating the reading means, the processing means, the store means, second output means, the first recording means and the changing means for the different colors, after the actuation of the third actuating means, when the sub-scanning direction symmetric copy mode is set by the first instruction means.

According to the above mentioned fifth digital color copying machine of the present invention, a left-to-right symmetric copy in the sub-scanning direction can easily be prepared by merely adding simple circuits and softwares to a copying machine having a plurality of image preparing stations (recording means) and delay memory means and a digital color copying machine of excellent function as compared with the conventional art can be provided.

A sixth object of the present invention is to provide a digital color copying machine having image preparation stations for a plurality of colors (for example, C, M, Y and BK) and memory means for supplying a plurality of color signals obtained by color separation of original images of an original are supplied to the image preparation stations at delay times different from each other, wherein a multi-image copy in which a plurality of original images of one original are disposed side by side on one identical transfer paper by using signals of the original image obtained from only one original scanning.

According to the present invention, the above mentioned sixth object is achieved by a sixth digital color copying machine having a fundamental copy mode and having a multi image copy mode in which a plurality of printed images arranged along a sub-scanning direction are prepared, comprising;

a) a reading means for reading an original image of an original with color separation and outputting image signals based on the original image, the image signals are less by one in number less than recording color components, b) a processing means for processing the image signals into recording informations, the recording informations are identical in number with the recording color components, c) a memory means having a first output means, a store means and a second output means, the first output means for outputting the processed recording informations respectively with delay by a predetermined number of picture elements on the every recording color component, the store means for storing recording color informations selected from the processed recording informations, the recording color informations being less by one in number than the recording informations, the second output means for outputting from the store means the stored recording color informations respectively with delay by a predetermined number of picture elements on the every recording color component, the processed recording informations being delivered to the memory means from the processing means, d) a changing means for changing an addressing director of the first output means, e) a plurality of first recording means for recording different colors on a recording medium based on the recording color informations delivered from the first output means or the second output means, the different colors corresponding to the recording color informations respectively, f) a second recording means for recording a single color on the recording medium based one of the recording informations from the processing means, g) an instruction means for instructing a setting of any one of the fundamental copy mode and the multi-image copy mode, h) a first actuating means for actuating the reading means, the processing means, the store means, the first output means, the first recording means and the second recording means depending on a start instruction from second instruction means, when the fundamental copy mode is set by the first instruction means, i) a second actuating means for actuating the reading means, the processing means and the memory means, when the multi-image copy mode is set by the instruction means, and j) a third actuating means for actuating reading means, the processing means, said store means, said second output means and the first recording means for the different colors, and actuating for a plurality times the second output means and the first recording means, when the multi-image copy mode is set by the first instruction means.

According to above mentioned sixth digital color copying machine of the present invention, it is possible to provide a multi-image copy function by using the memory means without additionally disposing a frame memory and increasing the cost. Further, it is possible to reduce the mechanical abrasion or electrical power function by increasing the copy forming rate since the original scanning has only to be made once upon preparing the multi-image copy, thereby enabling to provide a digital color copying machine of excellent function as compared with the prior art.

DESCRIPTION OF THE ACCOMPANYING DRAWINGS

FIGS. 2a-2d are system block diagrams of FIG. 1;

FIGS. 3a-3c are detailed block diagrams for the image processor;

FIGS. 8a-8f are block diagrams for the memory unit;

FIGS. 19a and 19b are addressing timing charts at memory mode 3;

FIG. 23 is a block diagram for the console unit;

FIGS. 24a and 24b are a view for the arrangement of buttons and displays on the console unit;

FIG. 30 is an explanatory view for the copy in the sub-scanning direction mirroring copy mode;

FIG. 31 is a timing chart in the symmetric copy mode in the sub-scanning direction;

FIG. 32 and FIG. 33 are explanatory views for the symmetric copy in the sub-scanning direction;

FIGS. 34a and 34b are timing charts for the swap copy mode in the sub-scanning direction;

FIGS. 35a and 35b are explanatory views for preparing a copy by the swap copy mode in the sub-scanning direction;

FIGS. 36a and 36b are timing charts for the multi-image copy mode in the sub-scanning direction;

FIGS. 37a-37c are a flow chart for obtaining the multi-image copy in the sub-scanning direction;

FIGS. 38a and 38b are explanatory views for preparing a copy by the multi image mode in the sub-scanning direction;

FIGS. 42a and 42b are block diagrams in the case of using SRAM as the memory device of the memory unit;

DESCRIPTION OF THE PREFERRED EMBODIMENTS

Figure 1:
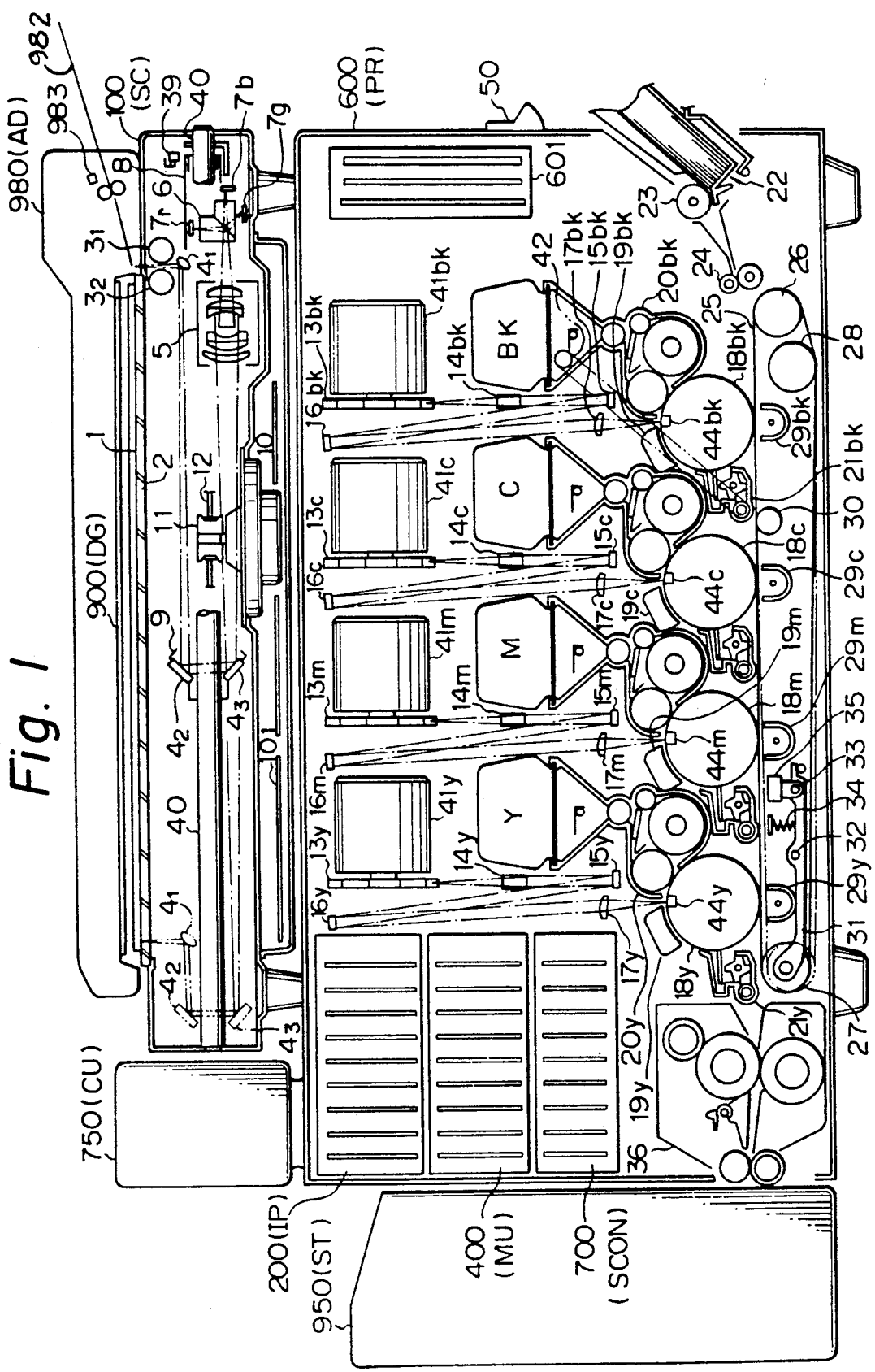
FIG. 1 is an entire constitutional view of a digital color copying machine according to one embodiment of the present invention.

The present invention is to be described by way of preferred embodiments referring to the drawings.

FIG. 1 is a view for the constitution of the digital color copying machine for explaining one embodiment according to the present invention, in which are shown a scanner unit 100 (hereinafter referred to as SC), an image processor 200 (hereinafter referred to as IP), a memory unit 400 (hereinafter referred to as MU), a printer unit 600 (hereinafter referred to as PR), a system controller 700 (hereinafter referred to as SCON), a console unit 750 (hereinafter referred to as CU), a digitizer tablet 900 (hereinafter referred to as DG), a sorter unit 950 (hereinafter referred to as ST), and an ADF unit 980 (hereinafter referred to as AD).

Figure 2B:
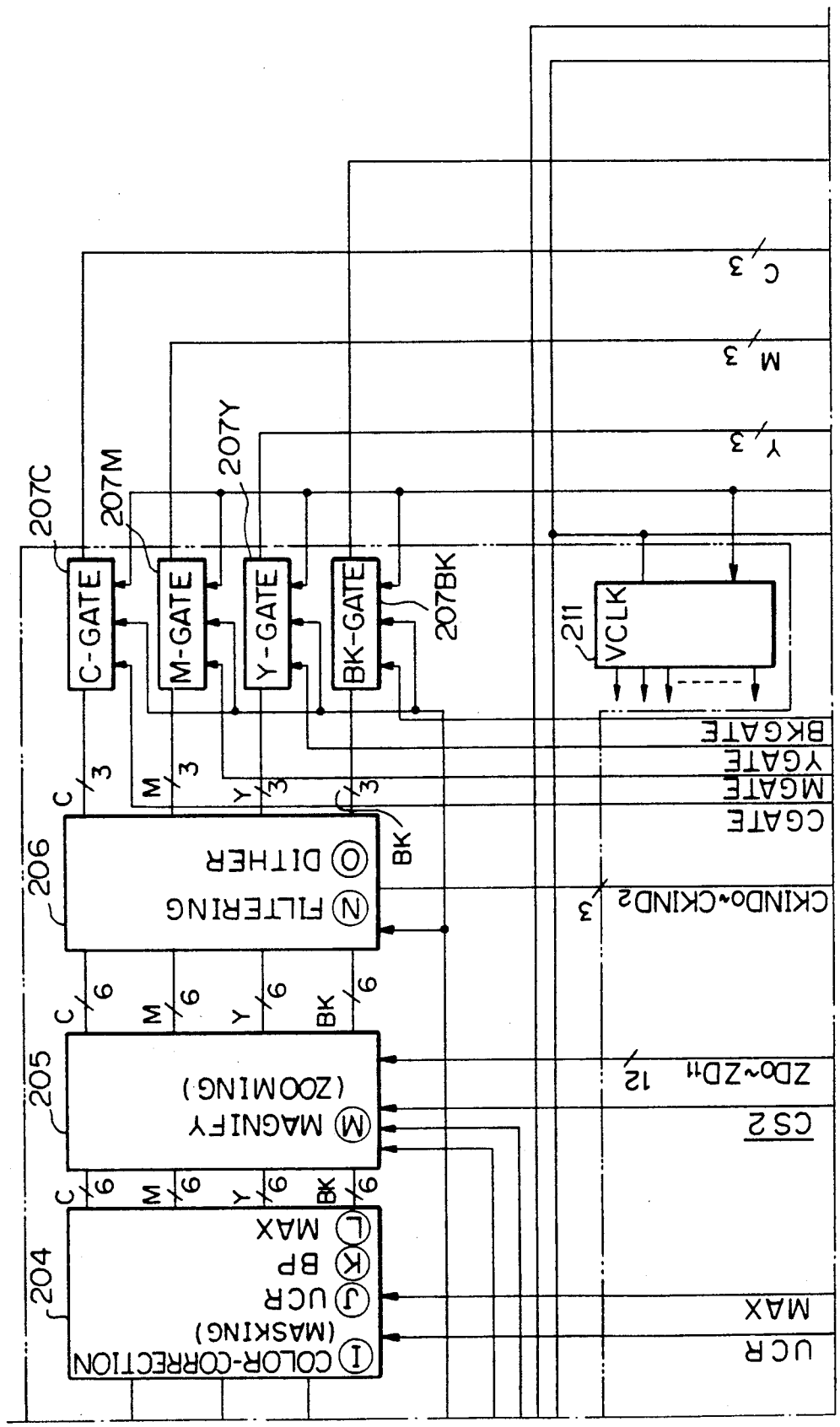
Figure 2C:
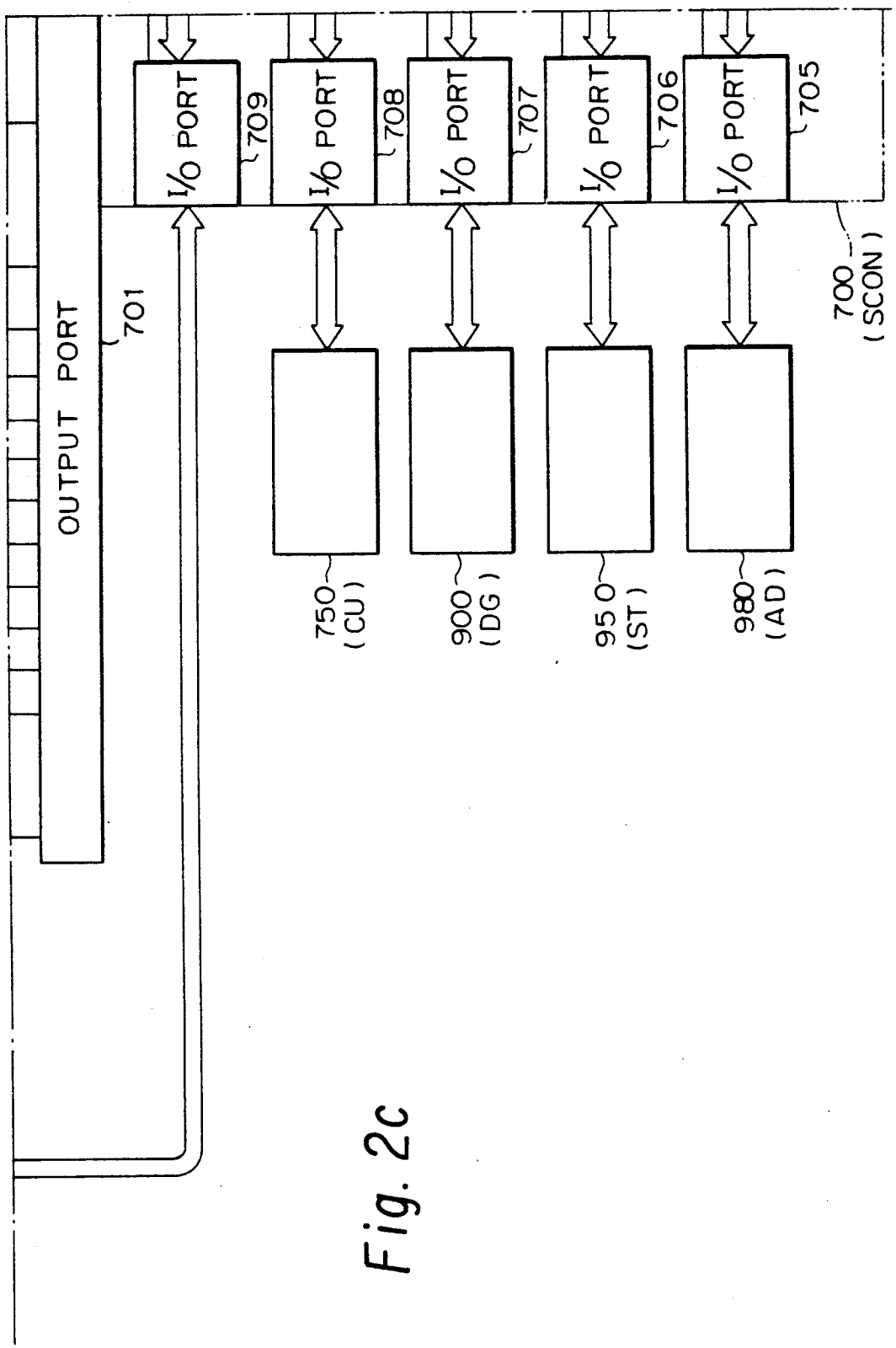
Figure 2D:
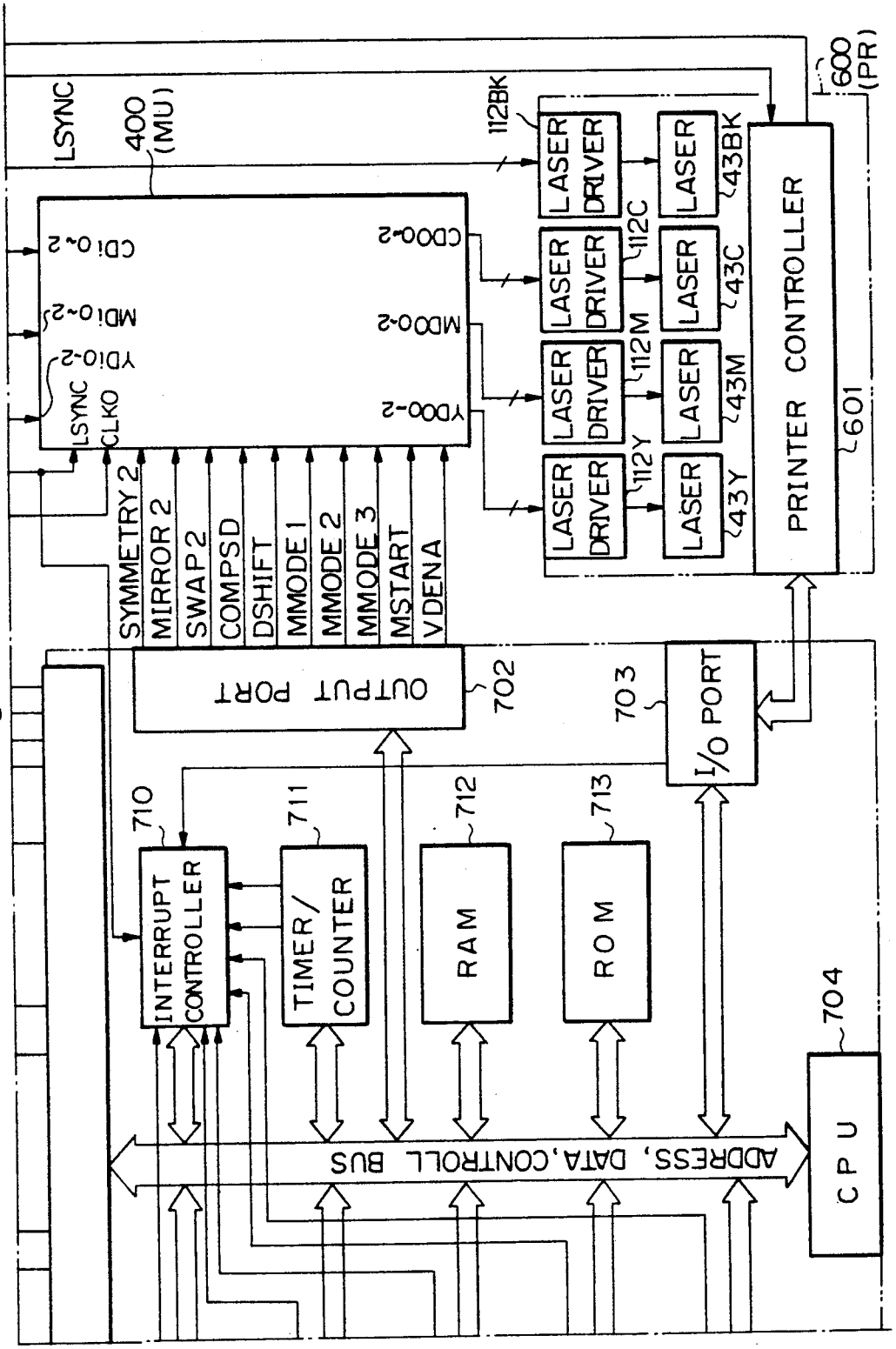

FIG. 2 is a system block diagram for the digital color copying machine shown in FIG. 1.

In FIG. 2, the constituents identical with those in FIG. 1 carry the identical reference numerals.

In FIG. 1 and FIG. 2, the name of colors are shown by C for cyan, M for magenta, Y for yellow, R for red, G for green, B for blue and BK for black.

In FIG. 2, the logic circuit is considered as operating under the positive logic in which a high voltage is described as High or 1, while a low voltage is described as Low or 0. Each of the gates is referred to as below:

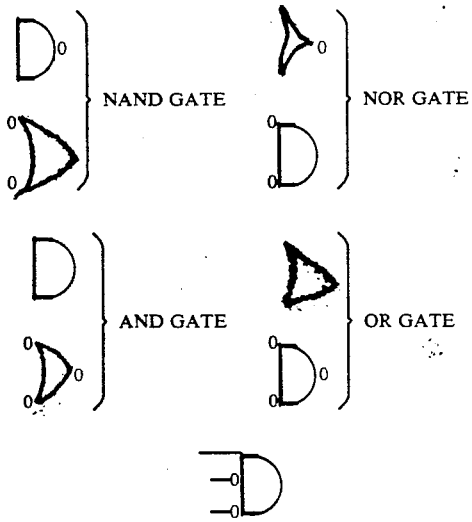

simply as gate. In addition, exclusive or

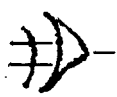

is referred to as XOR.

For the constitution of the present invention, explanation is to be made for the outline of the operation of the essential portion, that is, SC 100, IP 200, MU 400, PR 600, SCON 700 and CU 750.

(1) System controller (SCON) 700

This unit conducts the entire control for the digital color copying machine system according to the present invention, which is a stored program type computer.

For instance, each of the elements can be constituted as below:

CPU704 ... intel 8086 made
RAM 712 ... μ PD 43256×4, by Nippon Electric Co. (128 Kbyte)
ROM (PROM) 713 ... intel 27512×10 made (640 Kbyte)
Interrupt controller 710 ... intel 8259×3 made; cascade connection (22 input)
Timer/counter 711 ... intel 8254×3, made (9 timer/counter)
Printer interface 703 ... intel 8255 made (MODE 2) (parallel type)
Scanner interface 709 ... Ditto
Console interface 708 ... intel 8251 made (serial communication type I/O)
Image processor interface 701 ... intel 8255 (MODE-0)×3,
Memory unit interface 702 ... intel 8255,
Digitizer tablet interface 707 ... intel 8251 (serial communication type I/O),
Sorter interface 706 ... Ditto
AKF interface 705 ... Ditto.

There are also disposed a clock generator, a control signal, a decoder, etc., although not illustrated.

(1-1) Interface to SC 100

There are also a 8 bit bilateral data line and several control lines.

Commands to SC 100 are referred to as SC commands and include the followings.

Scan mode setting (setting for forward direction, backward direction, forward and backward direction)
Scan area setting
Scan start
Scan stop, etc.
Information from SC 100 can include:
Scanner status (during warm-up, ready, occurrence of error, - - - etc).

Further, upon receiving data and upon completion of data sending, a signal is automatically inputted into the interrupt controller 710 to execute an interrupt service routine automatically.

(1-2) Interface to PR 600

This is the same as the interface to SC 100 from physical point of view.

Commands to PR 600 are referred to as PR commands and include the followings:

Color mode setting (4 colors, 3 colors, each mono color in full color, C, M, Y, R, G, B)
Setting for the number of print copy
Print start, etc.
Information from PR 600 can include:
Printer status (during warm-up, ready state, occurrence of error, kind of error, completion of print, size of transfer paper, lack of consumption parts (toner, oil, etc.) ... )
LSYNC ... synchronization signal for laser beam scanning direction (the direction is referred to as main scanning and the direction substantially in perpendicular thereto is referred to as sub-scanning), One pulse is generated on every start of one main scanning. The synchronization signal is supplied also to IP 200, SC 100 and is MU 400 and used for maintaining the operation timing for the entire system. The signal pulse may be generated, not from PR 600, but from SCON 700, IP 200, or like other device and supplied to other portions. Further, the signal is inputted to the interrupt controller 710 and subjected to real time processing.

(1-3) Interface to IP 200

This is the interface used exclusively for output.

$\gamma_0$ to $\gamma_2$ ... setting for the characteristics (density characteristics) of a copy relative to an original document (8 group)
MIRROR 1 ... indication for preparing a mirrored image copy in the main scanning direction.
SWAP I ... indication for preparing an image exchanged-copy in the main scanning direction.
LEFT/RIGHT ... indication for the direction of preparing an image moved copy in the main scanning direction.
INVERSE ... indication for preparing density-inversed copy.
OUT/$\overline{\text{IN}}$ ... indication as to if the region processing (blanking, partial color conversion, partial image quality processing selection) is for the inside or outside.
$A_5$–$A_9$ ... address comparator data (upper 5 bit) of for image processing and image moving RAM
$D_0$–$D_{11}$ ... data (12 bit) of image processing and image moving RAM
$\overline{\text{CS 1}}$ ... chip select (enable) of region processing and image moving RAM
CLR ... clear pulse for address counter (lower 6 bit) of region processing and image moving RAM and clear pulse for address counter of variable magnification RAM $\overline{WR}$ ... writing pulse for the two types of RAMs described above ALL ... indication not conduction region processing (if applied entirely)

$CH_{GC0}$ to $CH_{GC5}$ ... indication for the content of color change

UCR ... indication as to if UCR (under-color-removal) is executed or not

MAX ... indication of extracting, among C, M, Y signals after preparation of complimentary color and color compensation, a signal corresponding to the highest density and sending the signal to all of C, M, Y, BK signal lines (variable magnification in the next step (13) of IP 200 described later)

$\overline{CS\,2}$ ... chip select (enable) for variable magnification RAM $ZD_0$ to $ZD_{11}$ ... data (12 bit) for variable magnification RAM $CKIND_0$ to $CKIND_2$ ... selection for 8 types of image processing CGATE ... indication as to if cyan data is sent or not MGATE ... indication as to if magenta data is sent or not YGATE ... indication as to if yellow data is sent or not BKGATE ... indication as to if black data is sent or not (1-4) Interface to MU 400

This is the interface exclusively used for output

SYMMETRY 2 ... indication for preparing symmetric copy in the sub-scanning direction MIRROR 2 ... indication for preparing a mirror image copy in the sub-scanning direction SWAP 2 ... indication for preparing a swap copy in the subscanning direction COMPSD ... serial data of input data resistor for 3 sets of 24 bit comparators at the inside of MU 400

DSHIFT ... shift pulse of the resistor (shift resistor) described above

MMODE 1 ... indication for operating MU 400 under the usual FIFO (First-in-First-Out) mode MMODE 2 ... indication for operating MU 400 under the write mode MMODE 3 ... indication for operating MU 400 under the read mode MSTART ... indication for resetting the address counter for memory of MU 400

VDENA ... indication as to if the count-up of the address counter for memory of MU 400 is executed or not.

(1-5) Interface to CU 750

(Input) Receiving key-in information from each of key boards. When data is received from CU 750, since the serial communication type I/O port 708 generates an interrupt signal to the interrupt controller 710, it can rapidly cope with information change in CU 750.

(Output) Outputting data to be displayed to the console (1-6) Interface to AG 900

(Input) Receiving XY coordinate data (Output) Sending buzzer data and display lamp I/O port 707 generates an interrupt signal to the interrupt controller 710 upon receiving a signal and upon sending a signal in the asynchronized serial communication manner.

(1-7) Interface to ST 950

Hardwares are the same as (1-6) above, content of communication are omitted.

(1-8) Interface to AD 980

Hardwares are the same as in (1-6) above, content of communication are omitted.

(2) Scanner unit (SC) 100

Referring at first to FIG. 1, an original 1 is placed on a platen (contact glass) 2 and illuminated by original illumination fluorescent lamps $3_1$, $3_2$. The reflection light is reflected at a movable first mirror $4_1$, a movable second mirror $4_2$ and a movable third mirror $4_3$ and enters through a focussing lens 5 into a dichroic prism 6 when it is spectralized into lights of three wave length, that is, red (R), green (G) and blue (B).

The spectralized lights enter into CCD 7r, 7g and 7b, i.e., solid state image pick-up devices respectively. That is, red light enters CCD 7r, the green light enters CCD 7g and the blue light enters CCD 7b.

The fluorescent lamps $3_1$, $3_2$ and the first mirror $4_1$ are mounted on a first carriage 8 while the second mirror $4_2$ and the third mirror $4_3$ are mounted on a second carriage 9. As the carriage 9 moves at one-half of the speed of the carriage 8, the optical path length from the original 1 to CCE is kept constant and the carriages 8, 9 are scanned from the right to the left upon reading an original image. The carriage 8 is coupled to a carriage drive wire 12 wound around a carriage drive pulley 11 secured to the shaft of a carriage drive motor 10, and the wire 12 is wound around a moving pulley (not illustrated) on the carriage 9. Thus, carriages 8, 9 move forwardly (original image reading scanning) and backwardly (returning or the original image read scanning in the backwarding direction) while the carriage 9 moves at one-half of the speed of the carriage 8.

When the carriage 8 is at its home position shown in FIG. 1, the carriage 8 is detected by a home position sensor 39 which is a reflection type photosensor. When the carriage 8 is driven leftwardly to get out of the home position during exposure scanning, the sensor 39 is put to a not-light receiving state (carriage not detected) and, when the carriage 8 returns to the home position by the returning movement, the sensor 39 changes to the light receiving state (carriage detected), and the carriage 8 is stopped when the sensor 39 changes from the not-light receiving state to the light receiving state.

Referring then to FIGS. 2, the outputs of the CCD 7r, CCD 7g and 7b are converted into 8 bit digital values in A/D converters 102r, 102g and 102b, and then sent in the form of 256 level density signals as R, G, B signals to IP 200. The values are 255 for white and 0 for black.

Further, control for SC 100 is conducted by the scanner controller 101. The scanner controller 101 comprises a stored program system computer having CCDE driver, motor driver, various kinds of input ports, I/F to SCON 700, etc.

(3) Image processor (IP) 200

Block 201

(A) γ-compensation

Compensation is applied such that the gradation in the document and the copy is linear in accordance with gradation characteristics of reading density in SC 100 and the gradation characteristics of printing density in PR 600.

(B) γ-change

Processing is conducted for preparing a copy of γ characteristics different from the original, for example, high-lighted copy, high contrast copy, etc.

(A) is a special case for (B). One of 8 types characteristics including (A) is selected by 3 bit signals from SCON 700 and R, G and B are outputted respectively at 8 bit to the next block.

Figure 3B:
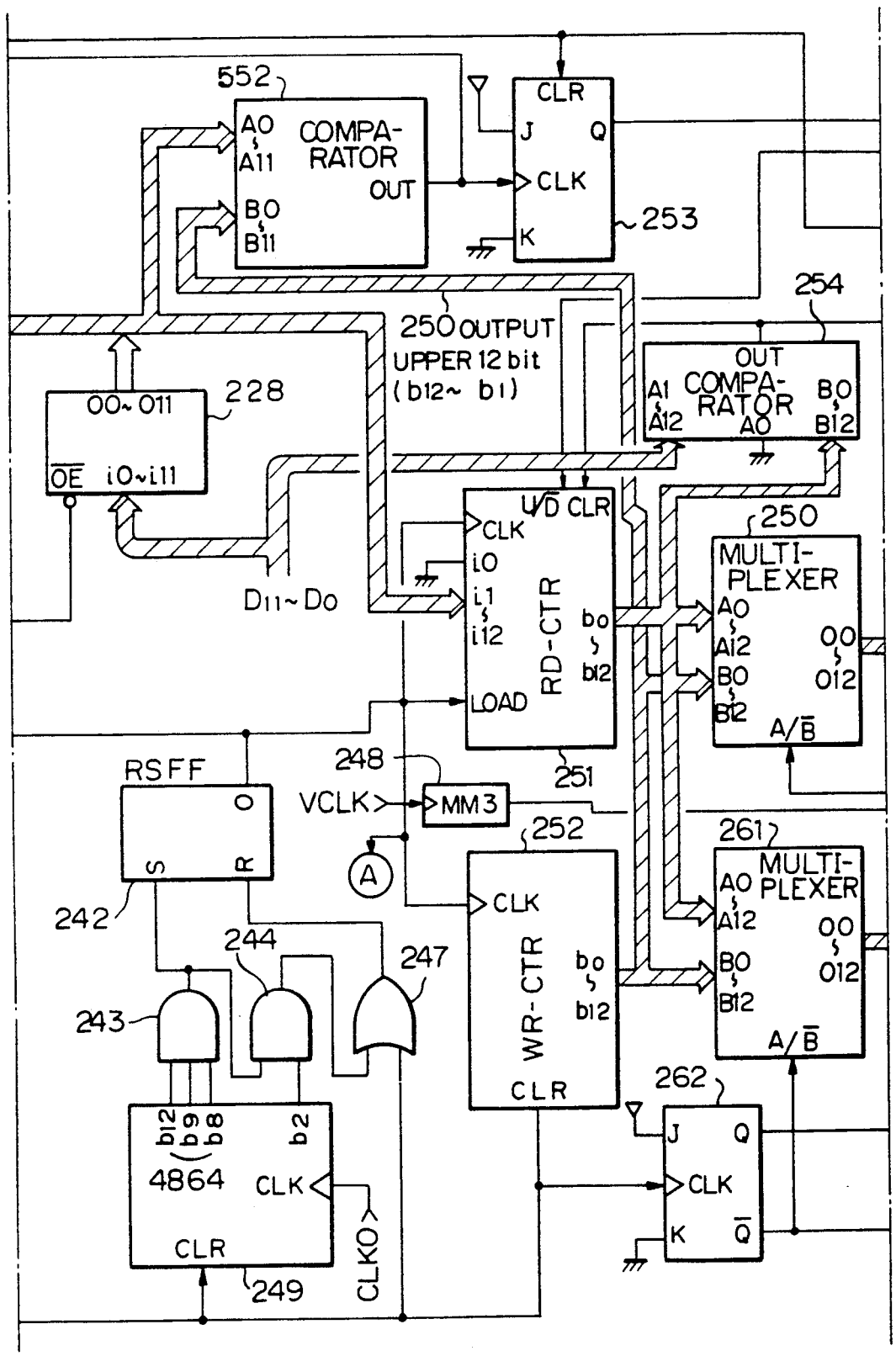
Figure 3C:
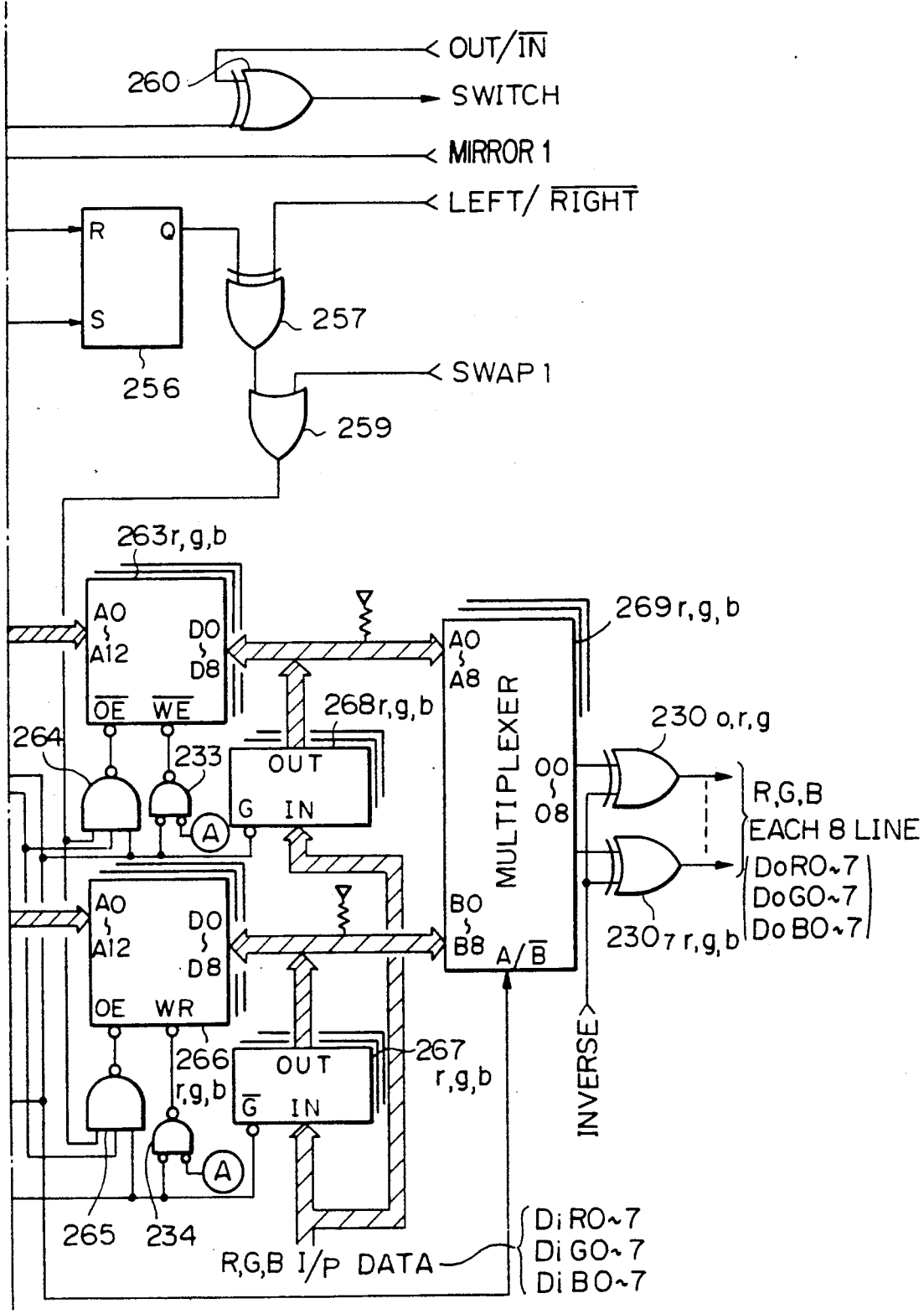

Block 202 (detailed in FIG. 3)

(C) Mirroring-1 (MIRROR 1)

If MIRROR 1 signal from SCON 700 is High, the picture element data are outputted while inverting the arrangement in the main scanning direction.

(D) SWAP-1 (SWAP 1)

(D) SWAP-1 (SWAP 1)

If the SWAP 1 signal from SCON 700 is High, appropriate data is loaded into RAM 224 shown in FIG. 3 and when $A_6$-$A_{11}$ is given from SCON 700 in accordance with the counted value of LSYNC during scanning, the images in the main scanning direction are swapped.

(E) SHIFT-1

If adequate data is previously loaded into RAM 224 and when $A_6$-$A_{11}$ is given from SCON in accordance with the counted value of LSYNC during scanning, images are moved by an identical amount for the entire portion or in such an amount as varying depending on the position in the sub-scanning direction. The moving direction is determined due to High/Low of the LEFT/$\overline{RIGHT}$ signal from SCON 700.

(F) SWITCH OUTPUT

If adequate data is previously loaded into RAM 224 and when $A_6$-$A_{11}$ is given from SCON in accordance with the counted value of LSYNC during scanning, the block 202 outputs SWITCH signal at High and Low levels alternately.

The output is given to the block 207C, M, Y, BK for partially blanking the image (trimming), given to the block 206 for partially changing the image quality processing, or given to the block 203 for partial color change.

(G) INVERSE

When the INVERSE signal from SCON 700 is High, each bit in respective 8 bits of R, G and B is outputted under inversion. Accordingly, a negative image copy is obtained.

Detailed description is to be made for the block 202 while referring to FIGS. 3, 4, 5 and 6.

FIG. 3 is a circuit diagram for the IP 200. The IP 200 has two sets of RAMs (263 $r$, $g$, $b$ and 266 $r$, $g$, $b$) for each of the colors for image data input/output. These RAMs are each of a 8192 words×8 bits type. These RAMs are used as toggle buffer memories, that is, when one of the RAMs receives image data (writing to memory; memory write), the other of the RAMs outputs the data (read from memory: memory reading). Switching for read/write is conducted by the inversion of JK flip-flop 262 on every one LSYNC.

Figure 6B:
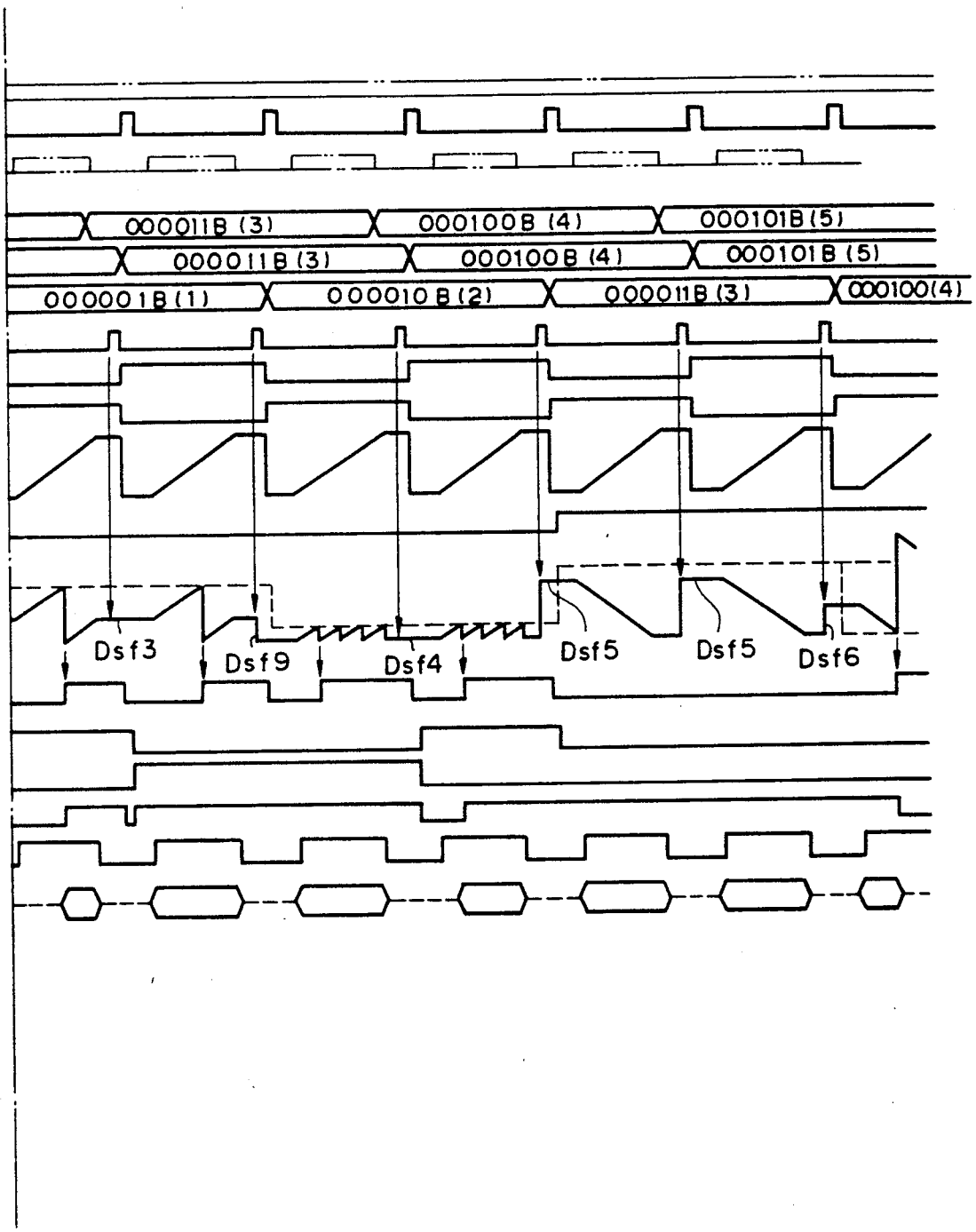
FIGS. 6a and 6b are operation timing charts for the block 202 in FIG. 2.
Figure 6A:
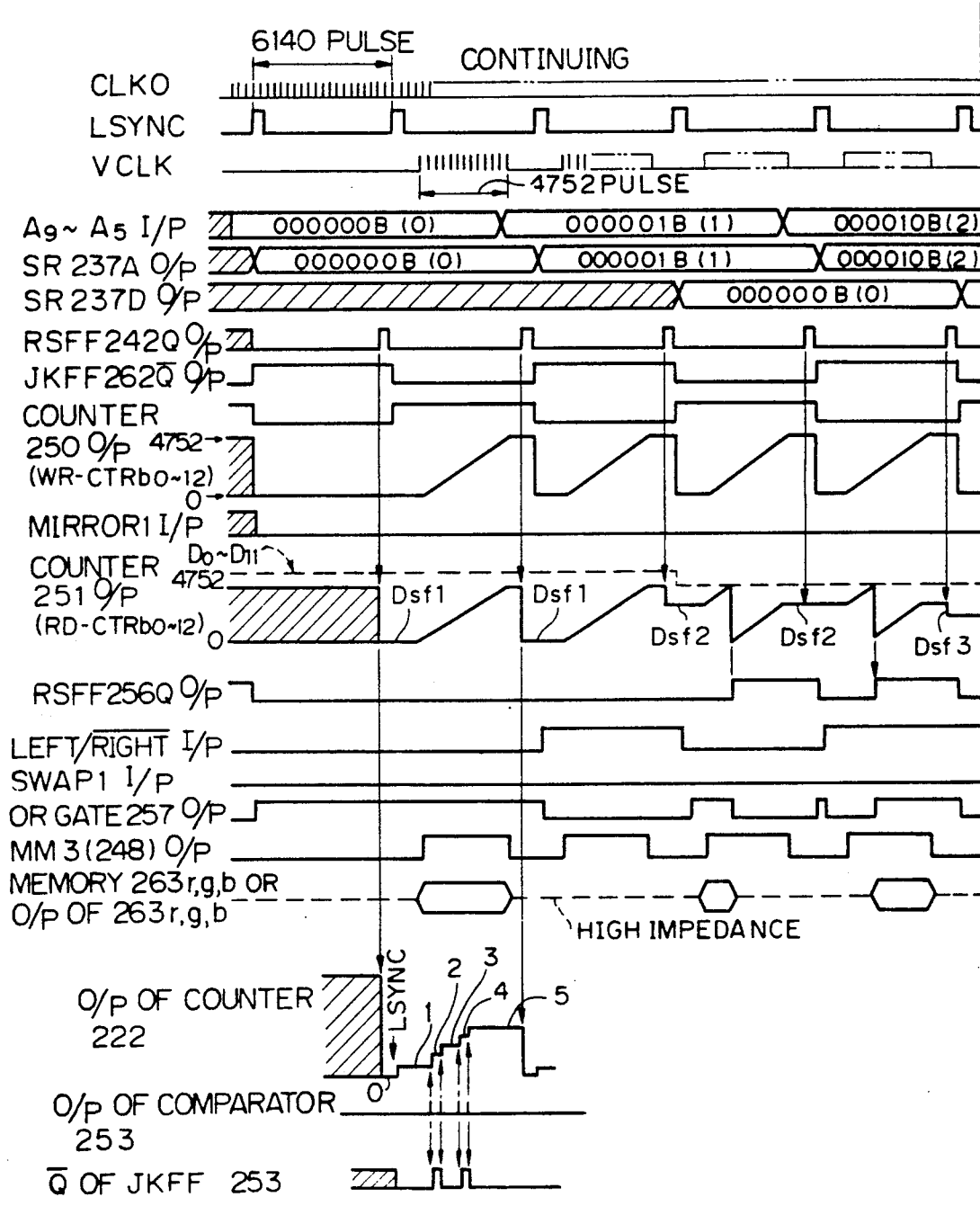

FIG. 6 is a timing chart for the operation of the image processor IP. When the Q output from JKFF 262 goes High at the first LSYNC, one input of OR gate 234 goes Low and, when VCLK rises (pulses generated from 211 in FIG. 2 synchronized with picture element data. Since there are 4752 picture elements in one main scanning line, 4752 shot of pulses are also generated between the successive LSYNCs. The rising portion of the pulses situates at the intermediate of one picture element data), a rising pulse is applied to the $\overline{WR}$ terminal of RAM 266$r$, RAM 266$g$ and RAM 266$b$ to write the picture element data. In this case, the address is determined by the output from the memory write counter (WR-CTR) 252.

Since VCLK is inputted also to CLK of the counter 252, the image data are written successively in the higher address direction.

On the side of the RAM 263$r$, 263$g$, 263$b$, since one input of OR gate 233 is High, $\overline{WR}$ is not actuated. On the other hand, if one of three inputs to NAND gate 264 that is connected to the output of OR gate 259 is High, $\overline{OE}$ input becomes Low to conduct output enable, that is, memory reading. MM3 243 is a retriggerable monomulti vibrator and, since the output pulse width is set somewhat longer than the VCLK period, it gives High output continuously during generation of VCLK as shown in FIG. 6.

Further, since the $\overline{G}$ input of bus drivers 268$r$, 268$g$, 268$b$ is High, the output is in a High impedance state and A input side is selected for the multiplexer 269 $r$, $g$, $b$ and, after all, it is outputted to the next block 203 by way of XOR gates 230 $o$, $r$, $g$, $b$ to 2307 $r$, $g$, $b$.

XOR gate is used for inversing the data when the INVERSE signal input is High, that is, for conducting negative-positive inversion.

The memory read counter RD-CTR 251 is a presettable UP/DOWN counter which can optionally set the start of the addressing and the addressing direction. 250 and 261 represent multiplexers for switching the address input to each of RAMs that output A when A/B input is High and output B when the A/B input is Low. When the output from JKFF 262 is inversed at the next LSYNC, RAM 266$r$, $g$, $b$ operates in the read mode, while RAM 263$r$, $g$, $g$ operates in the write mode. These operations are repeated hereinafter.

Explanation is to be made for RAM 224 and its associated constitution.

RAM 224 is constituted with 1024 WORD×12 bit and, in one set utilizing 32 sets each with 32 words, 31 words can be set for the preset data (1 word) and SWITCH output changing comparation data of RD-CTR 251.

Figure 4:
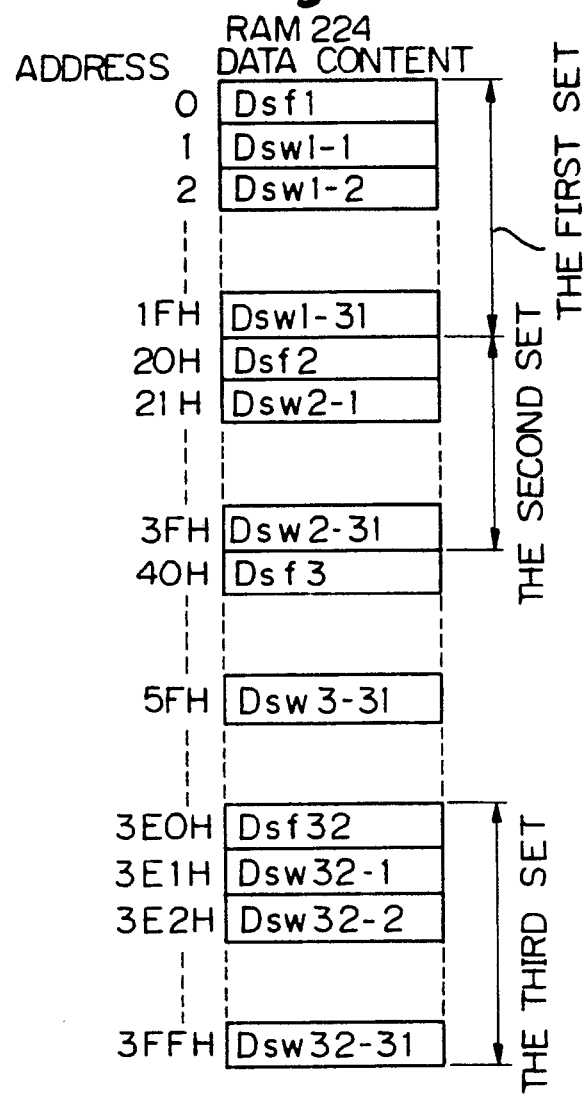
FIG. 4 is an explanatory view for the address data of the memory.

FIG. 4 is an explanatory view for the address data in RAM 224 in which DSF$_x$ is for presetting RD-CTR 251 and DSW$_{x-1\ to\ 31}$ is for SWITCH data.

Figure 5:
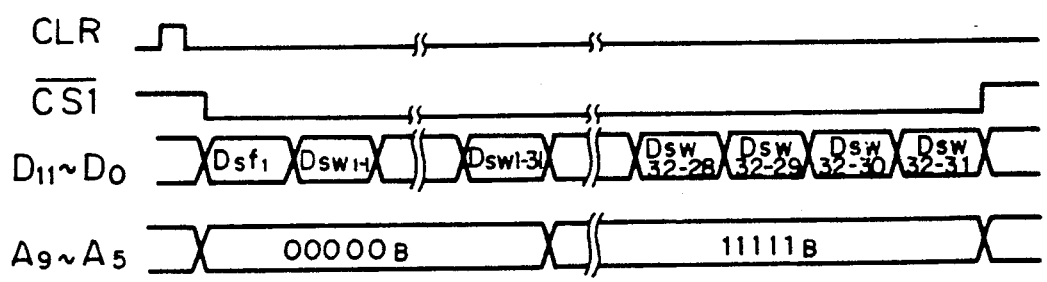
FIG. 5 is a write cycle timing chart for the memory.

FIG. 5 is a timing chart for the write cycle of RAM 224, and the data writing to the RAM 224 is conducted as shown in the drawing. The upper 5 bits of the address (A9 to A5) are written by the input from SCON 700, whereas the lower 5 bits require no input from SCON since the counter 222 is incremented on every $1\overline{WR}$ pulse (from SCON 700) and turns 00000$_B$ next to 11111$_B$.

Further, in a case where all of the data are not required to be written, for instance, Dsfl, Dsfl-1 and Dswl-2 are written, but Dswl-3 to Dswl-31 are not necessary, it is necessary to output CLR by one pulse from SCON 700 before writing the next Dsf2 to clear the counter 222.

228, 225 represent bus drivers and 239 represents a multiplexer. At $\overline{CS1}$=Low, the bus drivers 228, 225 are enabled for output and the output of the multiplexer 239 turns to High impedance, in which A9 to A5, D11 to D0 signals from SCON 700 can correctly be given to RAM 224.

Writing to RAM 224 has been conducted before the copying operation.

Then, explanation is to be made for the reading of RAM 224 by referring FIG. 6. Reading from RAM is conducted when the image data are sent from SC 100.

It is assumed that CS1, $\overline{WR}$ are kept High and CLR remains Low.

A9 are A5 are sent from SCON 700 at an appropriate timing as the upper bit address upon memory reading.

$D_{11}$ to $D_0$ are sent from SCON 700 as not for the memory but for one of the comparative inputs of a comparator 254.

Further, it is assumed that $OSW_{x-1}$ to $DSW_{x-31}$ in RAM 224 are stored from the lower address in the order of smaller values.

It is assumed that $A_9$ to $A_5$ are adequately given from LSYNC one step before the effective image data are started to be sent from SC 100.

A 4-stage shift register 237 is disposed for giving $A_9$ to $A_5$ data provided from SCON 700 to $A_9$ to $A_5$ of RAM 224 while delaying the value of LSYNC by three. Further, not delayed data are also used. The selection is conducted by the multiplexer 239.

A 13 bit counter 249 is counted-up by $CLK_0$ which is continuous pulses (same period as VCLK).

When all of $b_{12}$, $b_9$, $b_8$ of the counter become High, the output of the AND gate 244 is High to turn the Q output from RSFF 242 to High and the multiplexer 239 gives A input, that is, $A_9$ to $A_5$ input before delay to RAM 224.

Then, when the output $b_2$ of the counter 249 becomes High, RSFF 242 is reset and the multiplexer 239 gives the address data on the side B, that is, the data delayed by three LSYNCs again to RAM 224.

RSFF 242 is reset also by LSYNC.

That is, $b_{12}$, $b_9$, $b_8$=High at 4864th shot of $CLK_0$ from SYNC, while $b_{12}$, $b_9$, $b_8$=High and $b_2$=High at 4871th shot.

The value is set so that it takes a value after the completion of the effective main running.

Accordingly, RAM 224 is accessed by the address data delayed by three LSYNCs during effective image section and the read data thereof forms A input of the comparator 252. The B input of the comparator 552 is connected to the upper 12 bit ($b_{12}$ to $b_1$) of the RD-CKR 251. The comparator 552 outputs OUT=High only when the A and B inputs correspond with each other.

Accordingly, unless the DSW data are identical, it issues High output only for one VCLK pulse. The output pulse is transferred also to the CLK input of the counter 222 to increment it.

The increment is conducted by LSYNC and the clearance is conducted by Q=High in RSFF 242.

Accordingly, the meaningful A input of the comparator is started from the read data of the lower bit address ($A_4$ to $A_0$) of RAM 224 not at 0 but 1 and the RAM address is incremented on every coincidence output of the comparator 552 and new RAM data is compared with the output from WR-CTR 252. The OUT terminal of the comparator 552 is connected also to CLK input of JKFF 253 to toggle it on every coincidence output.

The output from JKFF 253 is inputted by way of XOR gate 260 to OR gate 212 in FIG. 2 as the SWITCH output.

The XOR gate 260 is used for merely inverting the output from the JKFF 253.

Then, when RSFF 242 issues High output, that is, when RAM 224 is accessed by the data of $A_9$ to $A_5$ from SCON 700 before delay, since the output from the AND gate 223 is High and the counter 222 is cleared, the lower 5 bit ($A_4$ to $A_0$) are 0 and the value at the top for each of the sets in FIG. 4, that is, the value for $DSW_x$ is read.

During this output, LOAD input of RD-CTR 251 becomes High, and the read data of the memory are preset to the upper 12 bits ($i_{12}$ to $i_1$) of RD-CTR 251.

In FIG. 6, output from the counter 222 shows the case where the comparator 552 outputs coincidence signals for four times.

Further, Dsf1 to Dsf6 in the output from the counter 251 shows that the top address for the first set to the sixth set in RAM 224 are preset to the counter 251.

During image processing in the image processor IP 200, $D_{11}$ to $D_0$ do not act on RAM 224 but are effective to the comparator 224 as the A input, while the other B input is connected to the output of RD-CTR 251. The comparator 254 issues High output only when A and B correspond with each other. In this instance, RSFF 256 is set (Q turns High), while RD-CTR 251 is cleared.

The Q output from RSFF 256 is sent by way of XOR gate 257 and OR gate 259 and inputted to NAND gates 264, 265. Accordingly, when SNAP 1=High and only one of Q input and LEFT/RIGHT input of RSFF 256 is high, the output from RAM as the object of reading (either one of 268 r, g, b or 266 r, g, b) is enabled. That is, image data are outputted to the next block 203. If it is not enabled (OE input=High), since the RAM output is at a High impedance and, accordingly, pulled-up, they are all High (=255) and equal with white data.

FIG. 6 shows these operations for each of the cases.

Upon reading RAM 224, $A_9$ to $A_5$ before delay and $A_9$ to $A_5$ after delay by three LSYNCs are used, because the image data processed by RD-CTR 251 may possibly cause three LSYNCs delay until they are processed in the block 207 C, M, Y and BK where blanking is conducted and because the SWITCH output described above is utilized here. That is, they are used for taking a synchronization for the image processing in the sub-scanning direction.

Block 203

(H) Color Change

Optional color signals of R, G, B are changed to specific levels by 6 bit signals of $CCHG_0$-$CCHG_5$ from SCON 700. That is, a copy print of a color different from that of the original is prepared.

Block 204

(I) Color Compensation

Color reproduction of a color copy can be attained by reading an original by a scanner, applying color separation for picture elements with R (red), G (green) and B (blue), applying complimentary color conversion into complimentary colors of these color signals, that is, into signals of C (cyan), M (magenta) and Y (yellow) for independently absorbing wavelengths of R, G and B, and then printing with toner or ink of three colors or four colors obtained by adding BK (black) required for removing under color described later.

If dots for respective colors are overlaid and printed on one identical position, each of the dots can be represented by a subtractive mixing color. However, it is also possible to conduct printing at screen angles different on every color in order to eliminate color moire, which can be deviced by a daiser pattern described in (O). In this case, eight colors, that is, C, M, Y, three secondary colors R, G, B, K prepared by over-laying three secondary colors R, G and B, and W (white) of paper appear at random in one picture element and it has been well-known that the color reproduction in this case can be represented by a Neugebauer's equation forecasting the reproduced color from the dot area for each of the colors in the color mixing state.

By the way, color material for C, M and Y has no ideal spectral reflection characteristics but has unnecessary ingredients of absorbing color called sub-absorption, in which different colors are reproduced depending on the way of overlapping the respective color materials.

Accordingly, if toner or ink having such sub-absorption is merely used as it is for the complimentary colors of R, G and B, color becomes turbid failing to reproduce colors as desired. In view of the above, it requires a so-called color compensation in view of the color reproduction while removing the effect of sub-absorption and conducting color reproduction faithful to the original.

The most simplest way of color compensation is a linear masking based on a 3×3 matrix and, assuming Dr, Dg, Db as the density for R, G and B, it can be represented as:

$$\begin{bmatrix} C \\ M \\ Y \end{bmatrix} = \begin{bmatrix} a_{11} a_{12} a_{13} \\ a_{21} a_{22} a_{23} \\ a_{31} a_{32} a_{33} \end{bmatrix} \begin{bmatrix} Dr \\ Dg \\ Db \end{bmatrix}$$

and the ingredients for the coefficient matrix can be determined from the spectral characteristics of the color material.

If no sufficient compensation can be obtained by this method, color reproduction of a higher accuracy can be obtained by applying a non-linear masking taking the secondary term such as $Dr^2$, Dr-Dg, etc. also into consideration. In this embodiment, non-linear masking is employed.

The color compensation in the block 204 is adapted as such a system of previously storing the result of the compensation calculation as 8 bit data (for each color) in the ROM and connecting the input data to the address line of ROM (24 bit), thereby obtaining a result (read memory).

(J) UCR (Under-Color-Removal)

(K) BP (Black Printing)

When reproducing black with three colors, that is, C, M and Y, lack of the density occurs in the high density area mainly due to the effect of the surface reflection. Processing applied for preventing such a trouble, reducing the ink or toner consumption, or decreasing the fixing energy is called under-color-removal (UCR) in which a gray ingredient, that is, an equal amount of C, M and Y ingredients is removed from a certain color, or as black printing in which printing is applied with a black toner or ink in an amount equal to that of the removed gray color.

The UCR ratio can optionally be selected and, if it is 100%, there is merit that the toner consumption is reduced most.

100% UCR processing is conducted when UCR signal from SCON 700 is High, and C, M, Y and BK are outputted each with 6 bits.

When UCR signal is Low, UCR processing is not conducted at all and BK output is 0.

(L) Max (Max density extraction output)

When MAX signal from SCON 700 is High, the minimum value of input R, G, B signals from the block 203, that is, signal corresponding to the highest density in the original is extracted and the upper 6 bits for the complimentary number of the value are outputted to the next block 205 quite in the same manner as 6 bit data each for C, M, Y and BK. In this case, the processings (I)-(K) described above are stopped.

If MAX signal=Low, the function (L) is stopped and the processings (I)-(K) are functioned.

Block 205

(M) Zooming processing

Before zooming processing (that is, before SC scanning), it is necessary to store zooming data to zooming data RAM in the block 205. The data is calculated by SCON 700 depending on the zooming rate (25% to 400%, at 1% step), and the processing is attained by repeating the cycle of "to output value for $ZD_0$ to $ZD_{11}$ and to generate one $\overline{WR}$ pulse", while maintaining $\overline{CS2}$ = Low. The amount of the data thus stored is 1 word (=12 bit)×400 and the image data C, M and Y each at 6 bits are automatically applied with zooming processing and then outputted to the next block 206.

Block 206

Eight types of (N) filtering and (O) daiser processings are selected by 3 bit data of ($CKND_0$ to $CKND_2$) from SCON 700.

If $CKND_0 - CKND_2$ = 0 : entire smoothing filtration

. +64 level daiser processing.

.

.

= 8 : dot image area and letter, line images area are automatically separated; dot image area is applied with smoothing filtration processing +64 level daiser processing. Letter and line image area is applied with sharpening filtration +2 level daiser processing.

(N) Filtration processing

1: Moire removal processing with dot original

When an original with the dot space frequency $f_0$ is sampled at a periodical pitch $f_1$, passed through a daiser filter with frequency $f_2$ and outputted from a printer with the dot frequency $f_3$, beats such as $f_0$ to $f_1$ or $f_0$ to $f_2$, that is, moire results.

In view of the above, a smoothing filtration is applied.

The filter in this embodiment is designed as:

$$\frac{1}{10} \begin{bmatrix} 111 \\ 121 \\ 111 \end{bmatrix}$$

2: Image sharpening (MTF compensation) processing

It is well known that overshoot is formed at both shoulders of blurred edges to improve the sharpness, that is, MTF by reducing, from original frequency f, a constant multiple of Laplacian $\nabla^2 f$, which is the secondary differentiation.

The Laplacian filter includes typically such as:

$$\begin{bmatrix} 0 & -1 & 0 \\ -1 & 4 & -1 \\ 0 & -1 & 0 \end{bmatrix}$$

In this case, while differentiation is applied only in the X, Y directions, since blurring results in the form of the rotational symmetry, a more ideal result can be obtained by applying the calculation in the direction of 45°, or many directions by making the matrix size greater. Accordingly, a 5×5 matrix size is used in this embodiment.

(O) Daiser Processing

The gradation of the density required for a color copy is determined as 64 gradations. However, with the present recording technics, that is, electronic photography, thermal transfer, ink jetting, etc., it is almost impossible to express the gradation with 1 dot, and gradation of utmost several levels can be expressed by the dot size or the modification of the dot density.

In view of the above, an area gradation method such as density pattern method or daiser method is often employed. In the density pattern method, a plurality of output dots are corresponded to one input data, whereas one output dot is corresponded to the one input data in the daiser method, and higher resolution power is obtained naturally by the daiser method although the number of gradation is the same between both of the cases. In this embodiment, the daiser method is used and in combination with 8 level modification in the above mentioned one dot. The method is usually referred to as a multi-value daiser method.

In the daiser method, constitution of a threshold matrix plays an important role for the reproducibility of the gradation and the resolution power in the daiser method and it is typically classified generally into the following two types.

(a) Dot centralized type (typical example: Fattening type)

(b) Dot dispersed type (typical example: Bayer type).

Furthermore, it is also possible to set all of the threshold values quite in the same way within the threshold value matrix, that is, substantially binarizing them.

In this embodiment, one of various threshold matrixes is selected depending on CKIN $D_0$ to $CKINA_2$ signals from SCON 700, each 6 bit input for the input signals C, M, Y and BK is processed into each 3 bit of C, M, Y and BK and then outputted to the next block.

Block 207C, 207M, 207Y, 207BK

By the combination of each signals of CGATE, MGATE, YGATE, BKGATE from SCON 700, AREA signal from the block 202 and ALL signal from SCON 700, function as a gate whether the image data is transferred to the MU 400 or not (correspond to the transfer of white data).

Figure 7:
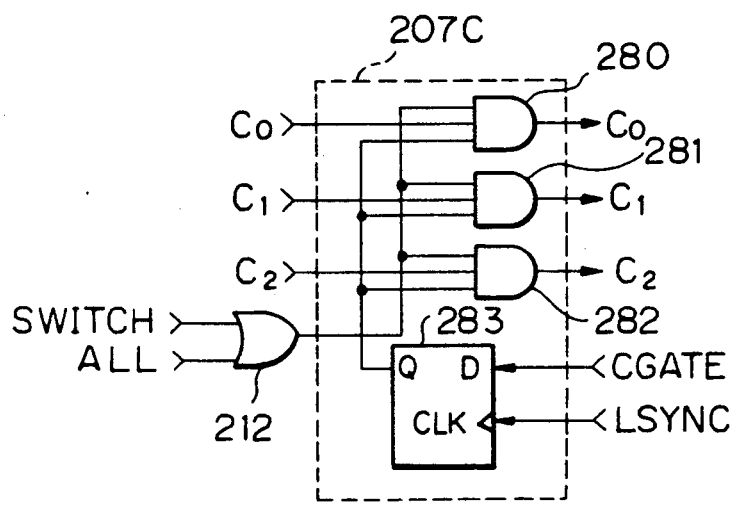
FIG. 7 is a detailed circuit diagram for the block 207C in FIG. 2.
Figure 8B:
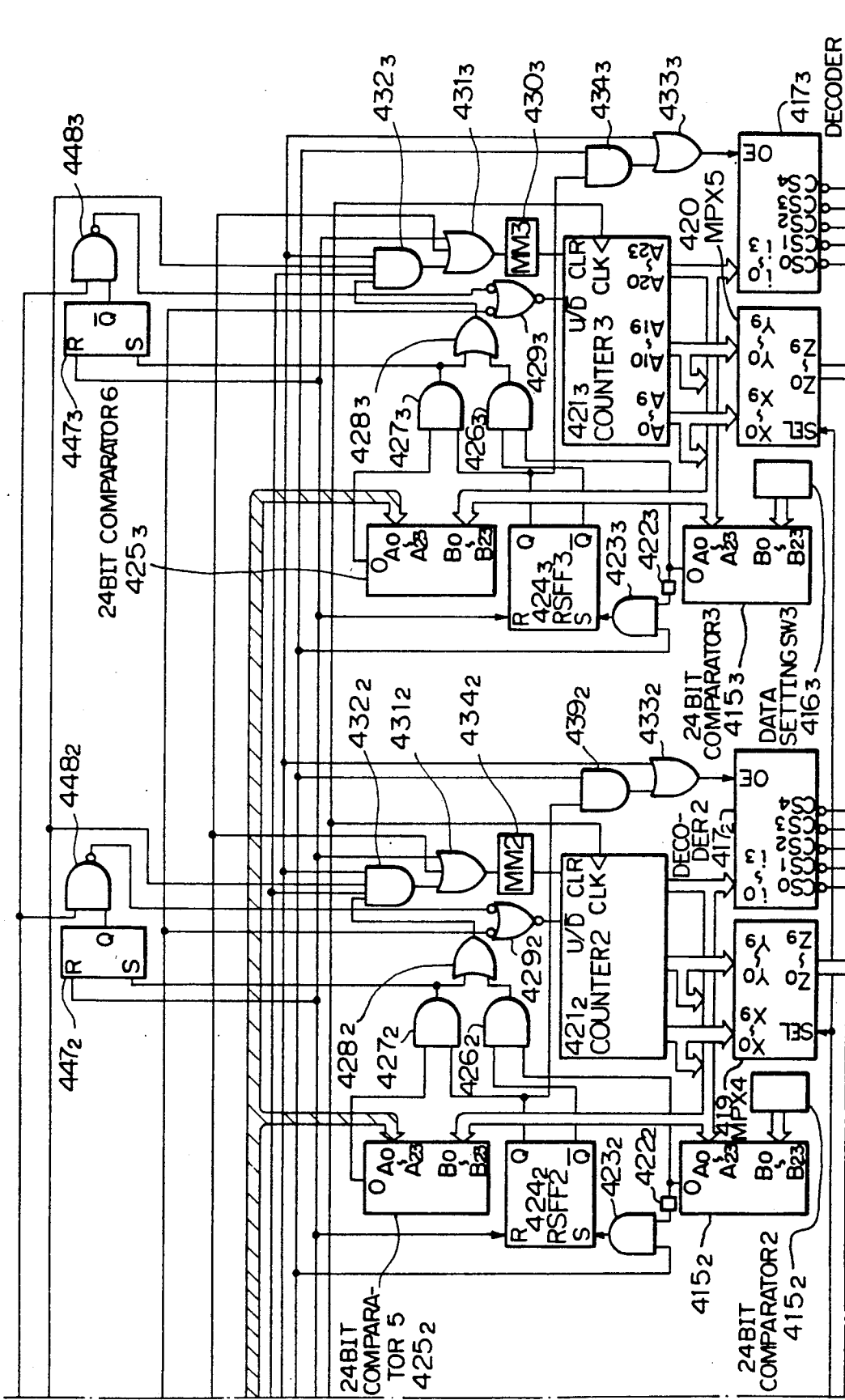
Figure 8C:
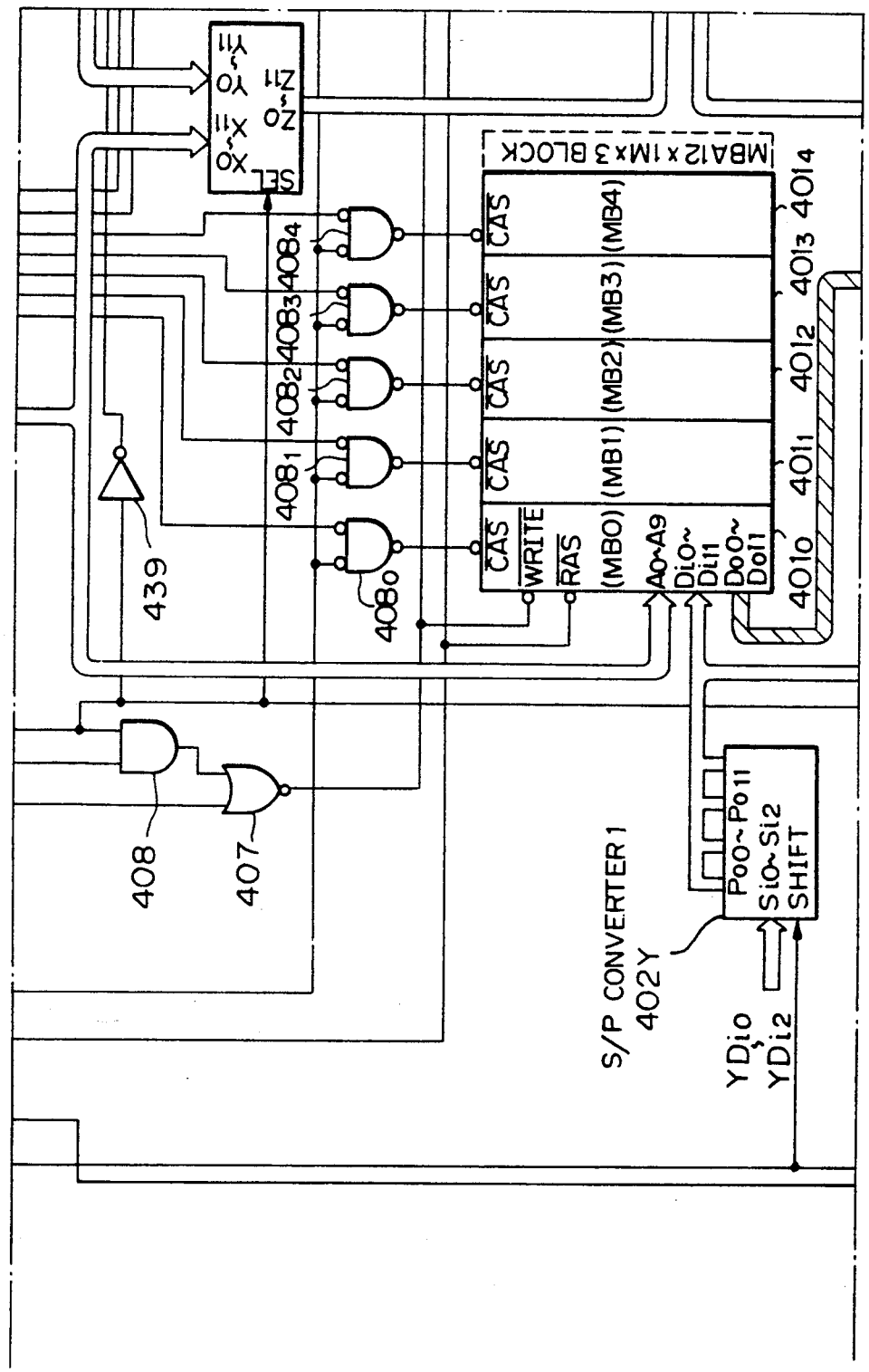
Figure 8D:
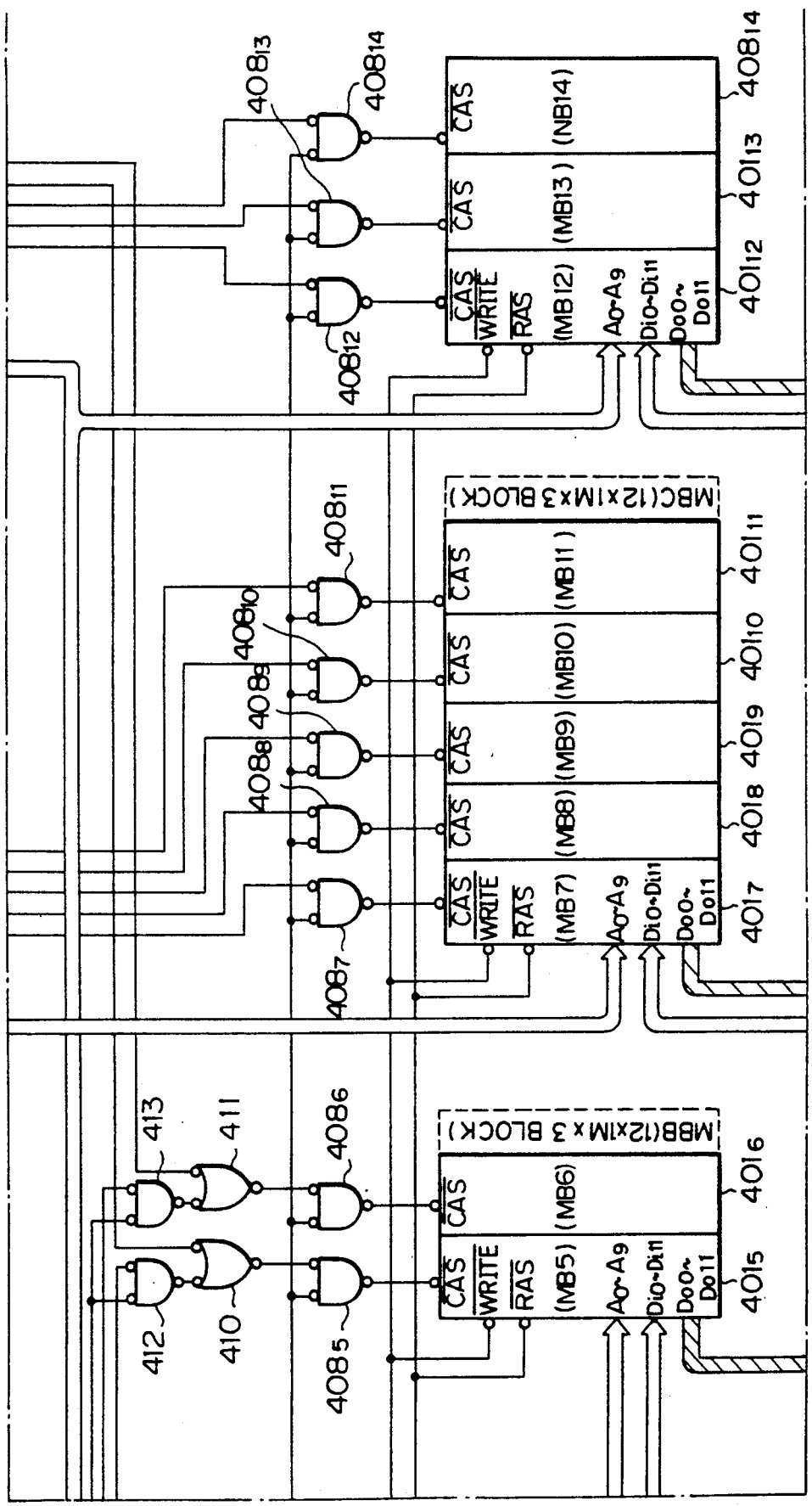
Figure 8E:
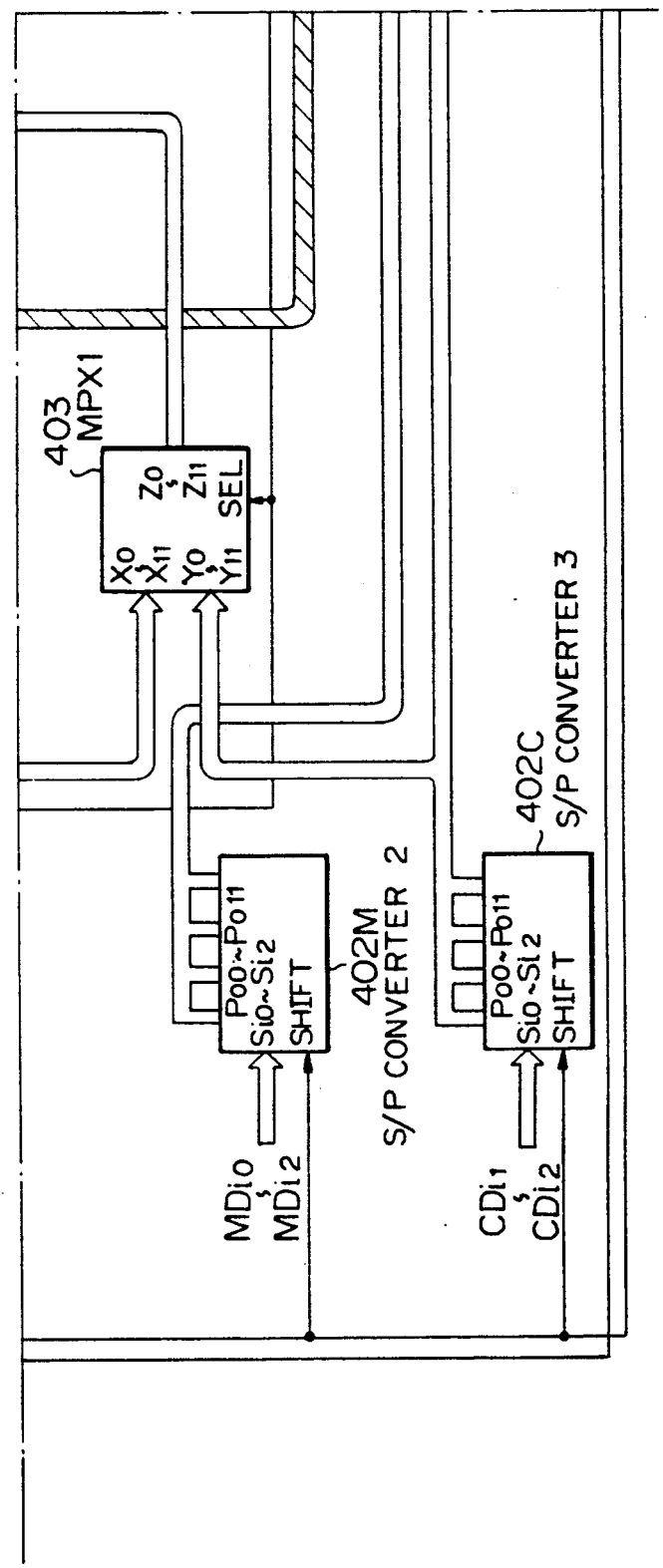
Figure 8F:
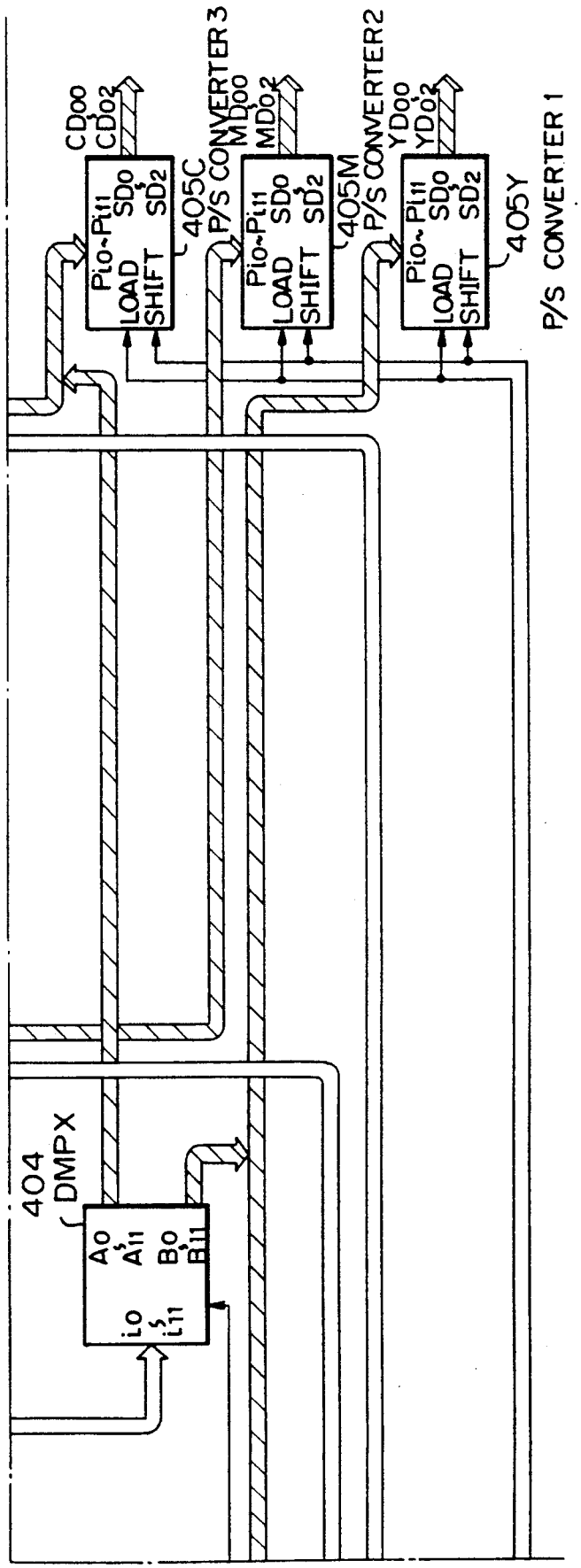

Details of the circuit are shown in FIG. 7.

Among 3 bit values for each of the colors from the block 206:

7:1 picture element is at the minimum density (blank)
6 to 1:1 picture element is at the intermediate density
0:1 picture element is at the highest density.

(4) Memory Unit (MU) 400

FIG. 8 is a block diagram for MU 400 and the MU 400 has the following three mode functions.

Memory Mode 1:

It operates as a delay circuit for outputting the image data for C, M, Y each with a delay for a predetermined time and it can also be a FIFO (First-In, First-Out) memory.

Delay is made by the picture elements corresponding to the length from the BK photosensitive member 44$bk$ in PR 600 to C, M, Y photosensitive members 44$c$, 44$m$ and 44$y$ (FIG. 1). Specifically, since the length is 110 mm till the photosensitive member 44$c$, 220 mm till 44$m$, 330 mm till 44$y$, the picture element density is 16 dot/mm and the effective image width in the main scanning direction is 297 mm, each of the data from IP 200 is delayed by:

C data: $16 \times 110 \times 16 \times 297 = 8,363,520$ picture elements
M data: $15 \times 220 \times 16 \times 297 = 16,727,040$ picture elements
Y data: $16 \times 330 \times 16 \times 297 = 25,090,560$ picture elements
and then outputted from PR 600.

The mode is operated when MMODE 1 signal from SCON 700 is High.

Memory Mode 2:

C, M, Y data from IP 200 are written into the memory. In this case, data are not outputted to PR 600 (although they may be outputted). The mode is operated when MMODE 2 signal from SCON 700 is High.

Memory Mode 3:

Data stored in the memory mode 2 are outputted to PR 600. M and Y data are respectively delayed relative to C data:

M: 8,363,520 picture elements
Y: 16,727,040 picture elements
and then outputted.

This mode is operated when MMODE 3 signal from SCON 700 is High.

Figure 9:
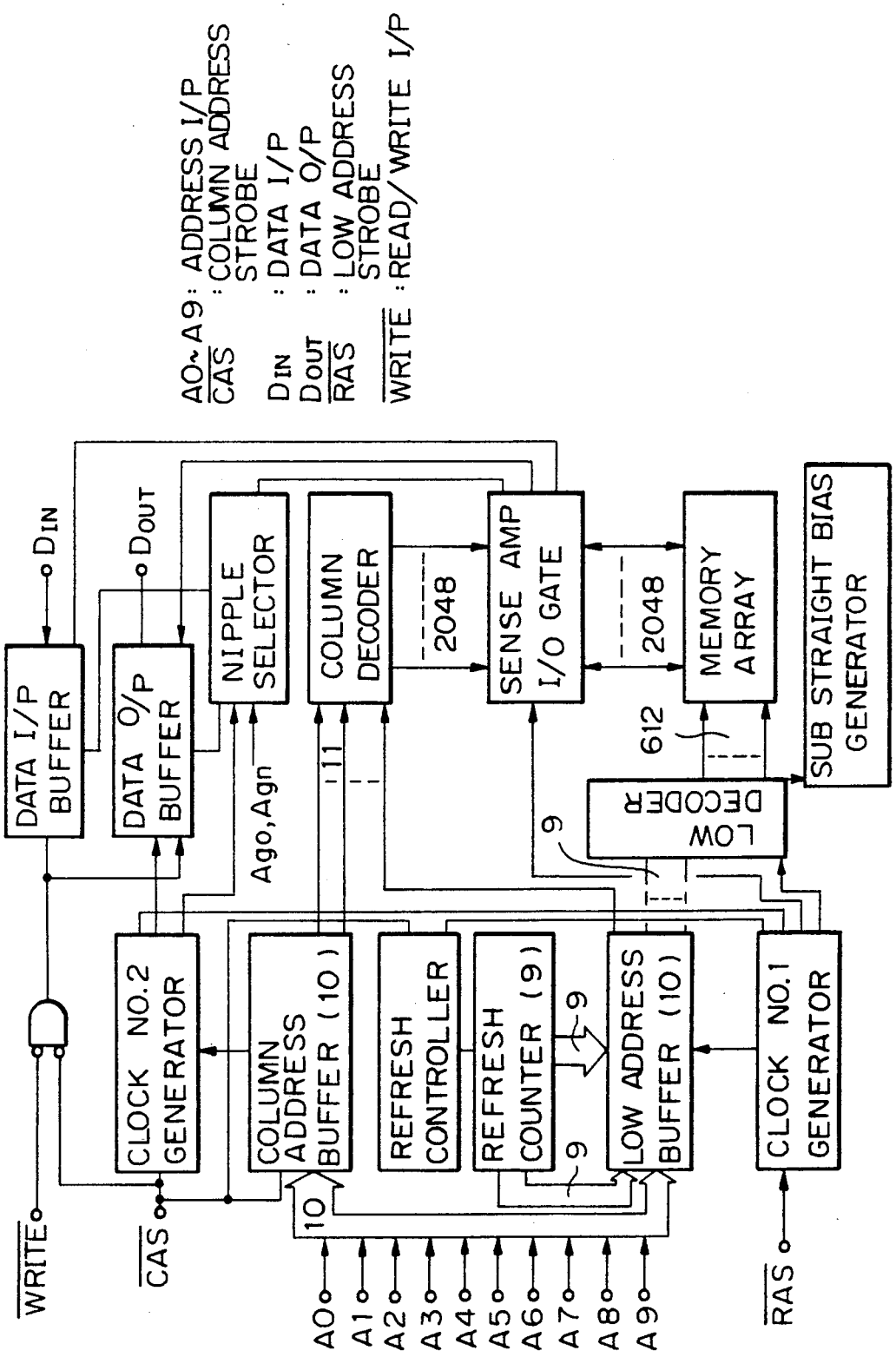
FIG. 9 is a view for the constitution of a memory block of the memory unit is FIG. 8.

$401_0$–$401_{14}$ in FIG. 8 represent memory blocks which are operated as a 1,048,576 word $\times$ 12 bit RAM by combining 12 sets of 1,048,576 word $\times$ 1 bit RAMs shown in FIG. 9. The operation timing chart of 1M DRAM in FIG. 9 is shown in FIGS. 10, 11, 12, 13 in which meanings of symbols in the drawings and time are as described below.

| Symbol | Item | (nsec) MIN. | (nsec) MAX. |
|---|---|---|---|
| $t_{RC}$ | Random read, write cycle time | 190 | |
| $t_{RWC}$ | Read write cycle time | 220 | |
| $t_{NC}$ | Nibble mode cycle time | 40 | |
| $t_{NRMW}$ | Nibble mode read write cycle time | 65 | |
| $t_{RAC}$ | $\overline{RAS}$ access time | | 100 |
| $t_{CAC}$ | $\overline{CAS}$ access time | | 35 |
| $t_M$ | Column address access time | | 50 |
| $t_{NCAC}$ | Nibble mode access time | | 20 |
| $t_{CLZ}$ | Output low impedance time from $\overline{CAS}$ low | 5 | |
| $t_{OFF}$ | Output buffer turn off delay time | 0 | 30 |
| $t_T$ | Rising and falling time | 3 | 50 |
| $t_{RP}$ | $\overline{RAS}$ precharge time | 80 | |
| $t_{RAS}$ | $\overline{RAS}$ pulse width | 100 | 10,000 |
| $t_{RSH}$ | $\overline{RAS}$ hold time | 35 | |
| $t_{CSH}$ | $\overline{CAS}$ hold time | 100 | |
| $t_{CAB}$ | $\overline{CAS}$ pulse width | 35 | 10,000 |
| $t_{RCD}$ | $\overline{RAS}$-$\overline{CAS}$ delay time | 25 | 65 |
| $t_{RAD}$ | $\overline{RAS}$ column address delay time | 20 | 50 |
| $t_{CRP}$ | $\overline{CAS}$-$\overline{RAS}$ precharge time | 10 | |
| $t_{CPN}$ | $\overline{CAS}$ precharge time | 15 | |
| $t_{ASR}$ | Low address set-up time | 0 | |
| $t_{RAH}$ | Low address hold time | 15 | |
| $t_{ASC}$ | Column address set-up time | 0 | |
| $t_{CAH}$ | Column address hold time | 20 | |
| $t_{AR}$ | Column address hold time ($\overline{RAS}$ base) | 75 | |
| $t_{RAL}$ | Column address RAS read time | 50 | |
| $t_{RCS}$ | Read command set-up time | 0 | |
| $t_{RCH}$ | Read command hold time ($\overline{CAS}$ base) | 0 | |
| $t_{RRH}$ | Read command hold time ($\overline{RAS}$ base) | 0 | |
| $t_{RWL}$ | Write command $\overline{RAS}$ read time | 25 | |
| $t_{CWL}$ | Write command $\overline{CAS}$ read time | 25 | |
| $t_{DS}$ | Data input set-up time | 0 | |
| $t_{DH}$ | Data input hold time | 20 | |

-continued

| Symbol | Item | (nsec) MIN. | (nsec) MAX. |
|---|---|---|---|
| $t_{DHR}$ | Data input hold time ($\overline{RAS}$ base) | 75 | |
| $t_{WCS}$ | Write command set-up time | 0 | |
| $t_{CWD}$ | $\overline{CAS}$-$\overline{WRITE}$ delay time | 35 | |
| $t_{RWD}$ | $\overline{RAS}$-$\overline{WRITE}$ delay time | 100 | |
| $t_{AWD}$ | Column address $\overline{WRITE}$ delay time | 50 | |
| $t_{CAS}$ | $\overline{CAS}$ set-up time ($\overline{CAS}$ before $\overline{RAS}$) | 10 | |
| $t_{CHR}$ | $\overline{CAS}$ hold time ($\overline{CAS}$ before $\overline{RAS}$) | 30 | |
| $t_{RFC}$ | $\overline{RAS}$ precharge $\overline{CAS}$ active time | 0 | |
| $t_{CPT}$ | $\overline{CAS}$ precharge time ($\overline{CAS}$ before $\overline{RAS}$ counter test) | 50 | |

The memory block MC 400 corresponds to three modes of MU400 and the following one mode.
Memory mode 1→memory read write cycle
Memory mode 2→memory write cycle
Memory mode 3→memory read cycle
Other than above→memory refresh cycle.

Also in the memory modes 1 to 3, the memory block in which the $\overline{CAS}$ input is High automatically conducts memory refresh cycle. The explanation to the circuit for the refresh is omitted for avoiding the complexity of the description. The explanation is also omitted for timing chart (FIG. 27).

Figure 14A:
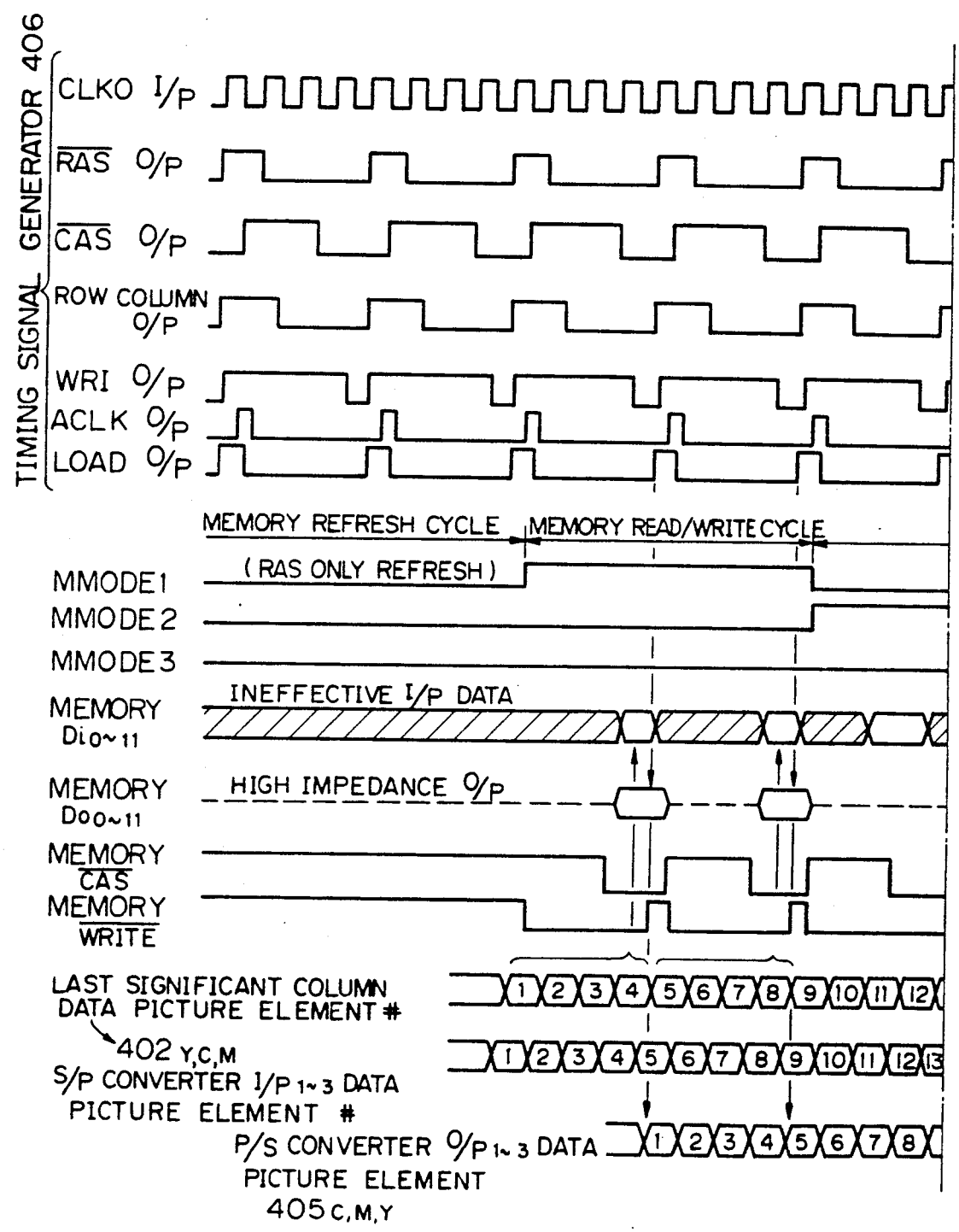
FIGS. 14a and 14b are timing charts for the timing signal generator of the memory unit and related portions.
Figure 14B:
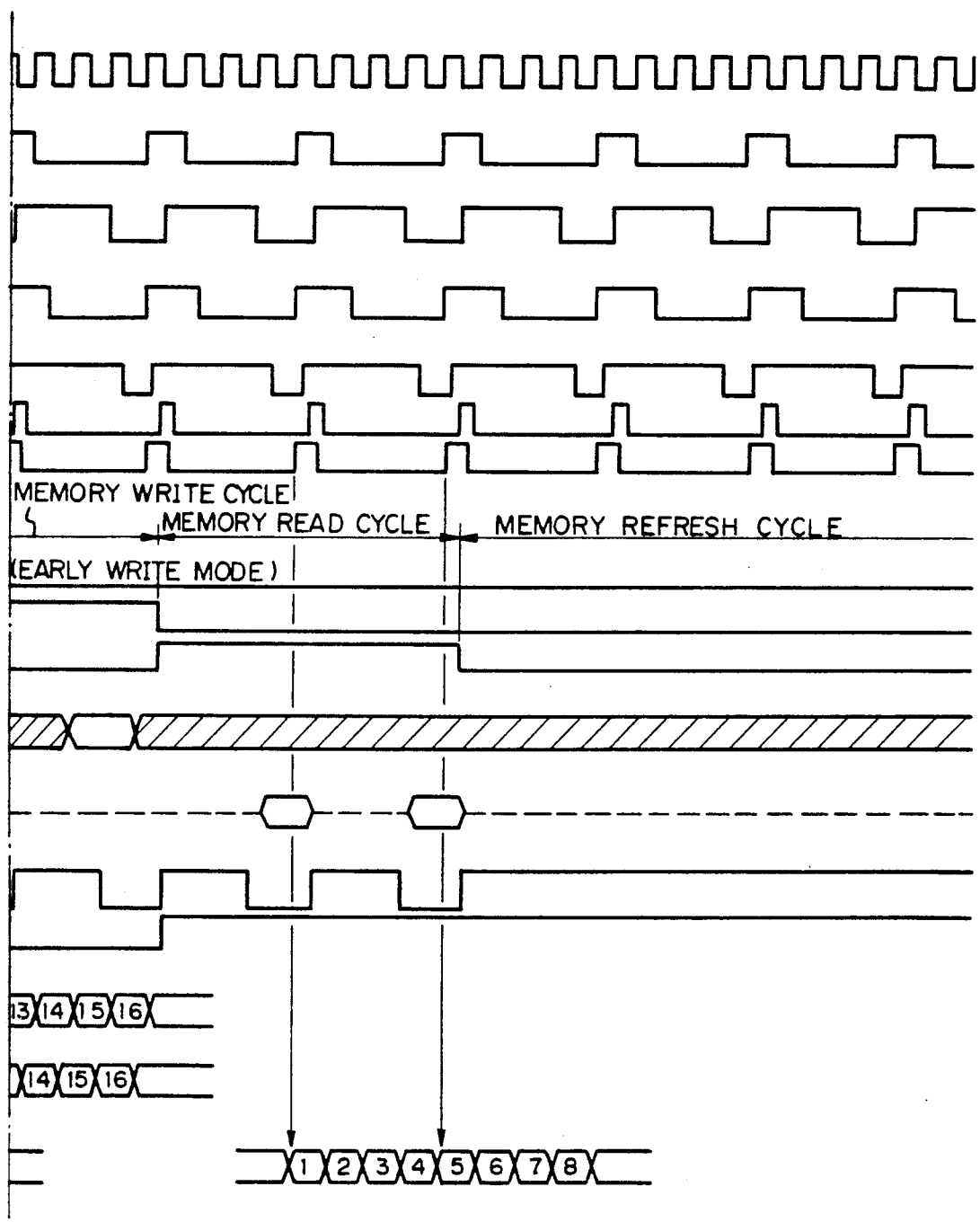

The memory control signals are generated by the output from the timing signal generator 406 (FIG. 8) or combination of other signals. The state is shown in FIG. 14. The chart illustrates the timing of the memory and the mode is not changed in such a short period of time in the preparation of copy.

CLKO is continuous pulses with a frequency equal to the input rate of one picture element, which are generated by a control signal generator 211 in IP 200 and supplied to MU 400. The frequency is 7 Mhz.

Figure 15:
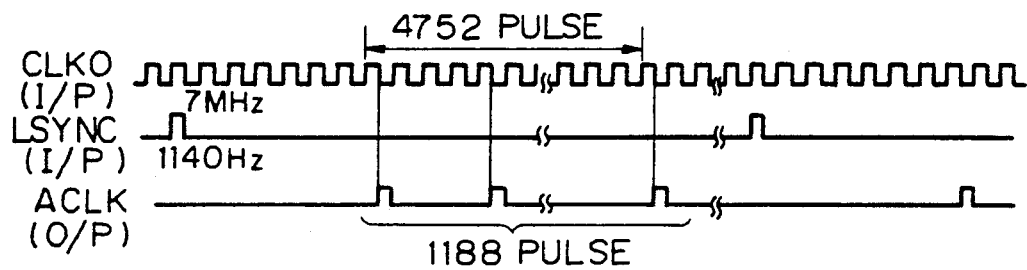
FIG. 15 is a timing chart for ACLK in the memory unit.

Output $\overline{RAS}$, $\overline{CAS}$, ROW/COLUMN, $WR_1$, LOAD of the timing signal generator 406 are continuous pulses with the frequency one-fourth of that of CLKO and High, Low duty and phase are different from each other as shown in FIG. 14. The address clock ACLK is also a pulse with one-fourth the frequency of that of CLKO. Continuous generation of pulses by the number of $\frac{1}{4}$ of the effective picture elements in the main scanning (16×297 mm=4742 picture element/4), keeping the state of Low until the input of the next LSYNC and generation of 1188 shots of pulses again are repeated. The state is shown in FIG. 15. FIG. 14 shows the state in which ACLK is continuously generated.

OE (output enable) of the decoders 1 to 3 ($417_1$ to $417_3$) is complicated in the actual circuit, but it is assumed here for the simplicity of the explanation that the OE input is High when any one of MMODE 1, MMODE 2 and MMODE 3 is High.

Refresh

When all of MMODES 1 to 3 are Low, all of the outputs $\overline{CS0}$ to $\overline{CS6}$ from the decoders 1 to 3 ($417_1$ to $417_3$) are High. Accordingly, the output from OR gates $408_0$ to $408_{14}$ are High, all of the $\overline{CAS}$ inputs of the memory blocks $401_0$ to $408_{14}$ are High and only $\overline{RAS}$ is inputted and, accordingly, the operation enters into the refresh cycle in FIG. 13.

Read/Write

If the input of MMODE 1 is High, one of the output $\overline{CS0}$ to $\overline{CS6}$ of the decoder 1 ($407_1$) is Low. One of $\overline{CS0}$ to $\overline{CS4}$ of the decoder 2 ($407_2$) is Low. One of $\overline{CS0}$ to $\overline{CS2}$ of the decoder 3($417_3$) is Low and it is assumed that $\overline{CS3}$ and $\overline{CS4}$ are not Low (the reason is described later). Then, one of OR gates $408_{12}$ to $408_{14}$ corresponding to one Low output $\overline{CS}$ of the decoder 3 ($417_3$) issues low output when the $\overline{CAS}$ output of the timing signal generator 406 issues low output and a Low pulse is inputted to any one of $\overline{CAS}$ inputs of the memory blocks $(MB)_{12}$ to $(MB)_{14}$ ($401_{12}$ to $401_{14}$) as shown in FIG. 14. Since the $\overline{CAS}$ inputs of the remaining two blocks are still kept High, the refresh cycle remains as it is. In the same manner, the Low output $\overline{CAS}$ from the decoder 2 makes any one of $MB_7$ to $MB_{11}$ ($417_7$ to $417_{11}$) active and makes the remaining four blocks not active.

The Low output CS of the decoder 1 ($417_1$) makes any one of the inputs of OR gates $408_0$ to $408_4$, 412 and 413 Low and, when Low input is applied to OR gates $408_0$ to $408_4$, any one of $MB_0$ to $MB_4$ is inputted to OR gate 412 or 413, the input goes High while output goes Low of the inverter 439. Accordingly, since the output from AND gate 410 or 411 is turned Low and, after all, Low is inputted to one of terminals of OR gates $408_5$ or $408_6$ and, accordingly, $MB_5$ or $MB_6$ is made active, that is, only one of $MB_0$ to $MB_6$ is made as $\overline{CAS}$=Low, that is, active and the remaining 6 blocks are kept not active as they are.

Further, the multiplexer 2 (MPX2: 409) outputs $X_0$ to $X_{11}$ to $Z_0$ to $Z_{11}$ at SEL input=High, while outputs $Y_0$ to $Y_{11}$ at SEL input=Low. When MMODE 1=High, X is selected and $MB_5$ and $MB_6$ are addressed to the output value of the address counter 1 ($421_1$).

While on the other hand, the output from the AND gate 408 is identical with $WR_1$ output of the timing signal generator 406. The output from NOR gate 407 is the inverted value thereof and the pulse of "memory $\overline{WRITE}$" is applied to $\overline{WRITE}$ terminal of the memory block $MB_0$ to $MB_{14}$.

Further, the LOW/COLUMN output from the timing signal generator 406 forms the each SEL input for MPX3 (418), MPX4 (419), MPX5 (420) and X0 to X9 are outputted at SEL= High, while Y0 to Y9 are outputted at SE0=Low. Accordingly, the lower 10 bits of the address counters 1 to 3 ($421_1$ to $421_3$) are inputted as the ROW address of each of the memory blocks and the upper 10 bits are inputted as the COLUMN address.

Figure 10:
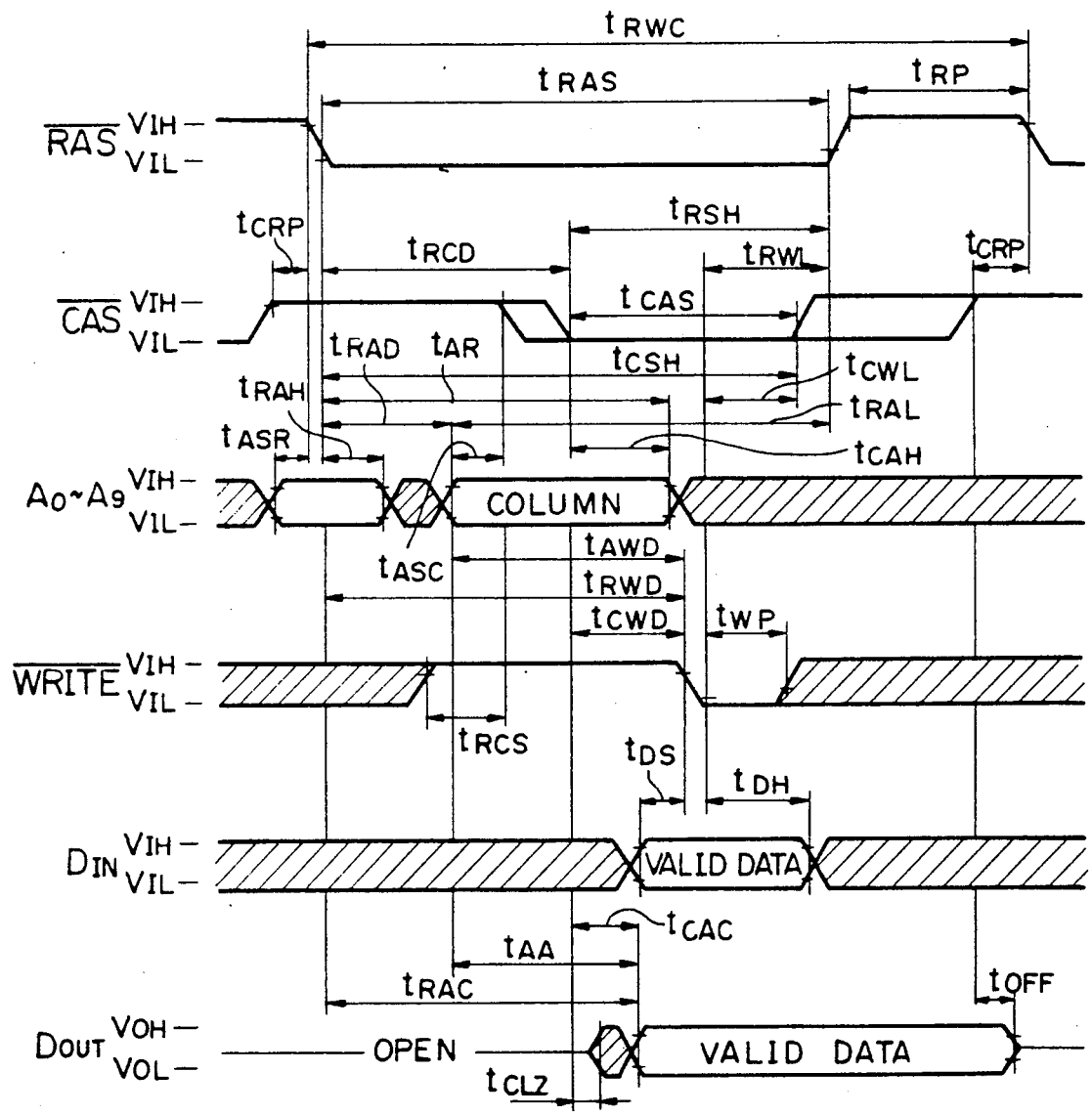
FIG. 10 is a timing chart for the read cycle in FIG. 9.

The operation timing for the $\overline{RAS}$, $\overline{CAS}$, $\overline{WRITE}$, $A_0$ to $A_9$ in the foregoing case agree with "read write cycle" described in FIG. 10 and data present so far within the RAM are outputted from $DO_0$ to $DO_{11}$ and new data $Di_0$ to $Di_{11}$ are written (stored).

WRITE

When MMODE 2 is High, the $\overline{CS}$ output from the decoders 1 to 3 ($417_1$ to $417_3$) turns Low only for one of $\overline{CS_0}$ to $\overline{CS_4}$ and $CS_5$ to $CS_6$ of $417_1$ does not turn Low (the reason is to be described later).

The output of the decoder 1 ($417_1$) makes one of $MB_0$ to $MB_4$ active and the output of the decoder 2 ($417_2$) makes one of $MB_7$ to $MB_{11}$ active.

The output of the decoder 3 ($417_3$) makes one of $MB_5$, $MB_6$, $MB_{12}$ to $MB_{14}$ active.

Further, since one of the inputs of NOR gate 407 is always High, that is, the output is always Low, $\overline{WRITE}$ input to $MB_0$ to $MB_{14}$ is always Low.

Since the SEL input of PMX2 (409) is Low, the value of the output from the address counter 3 ($421_3$) is inputted for the address input $A_0$ to $A_9$ of $MB_5$, $MB_6$.

Figure 11:
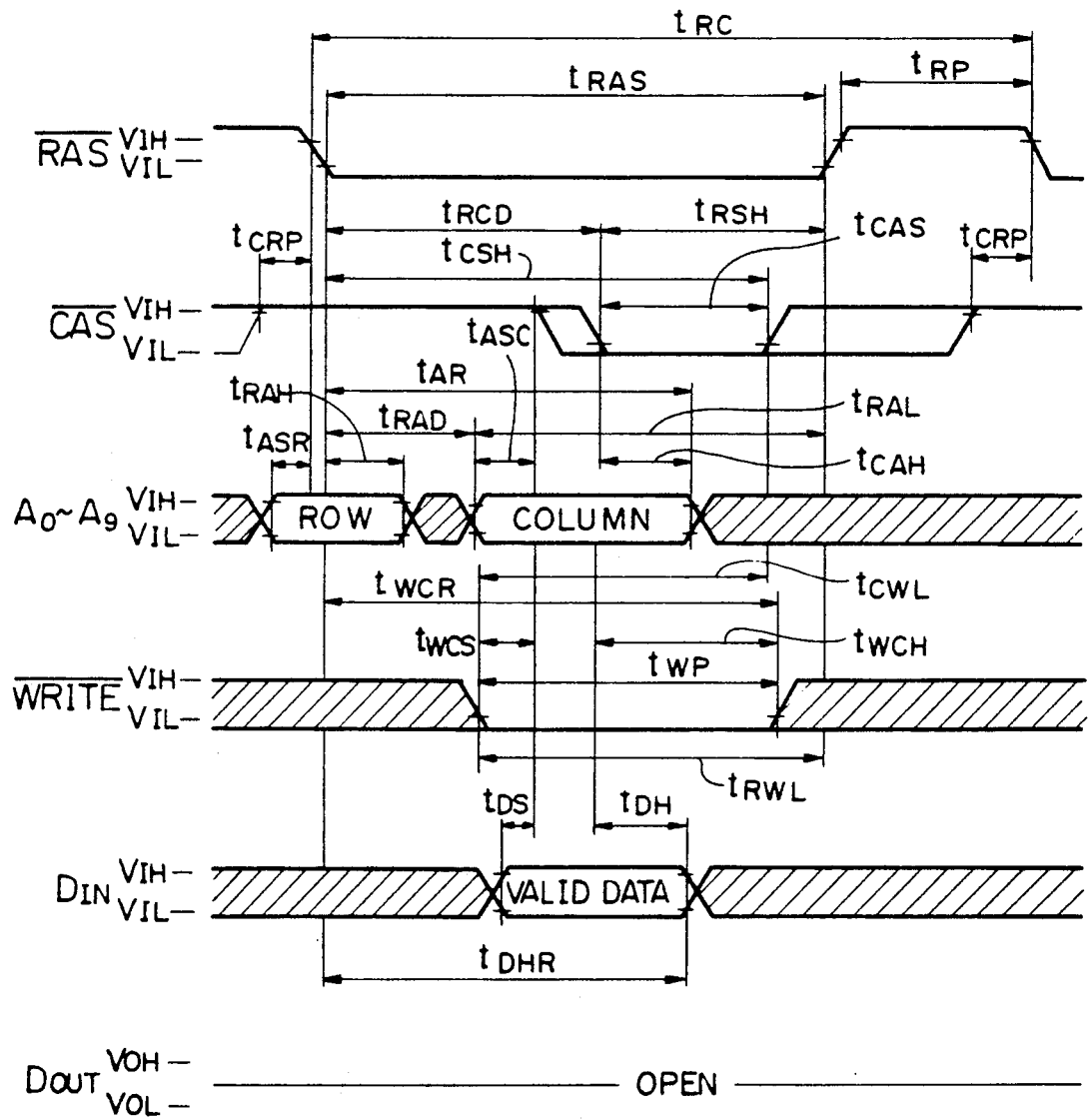
FIG. 11 is a timing chart for the write cycle in FIG. 9.

The operation timing for $\overline{RAS}$, $\overline{CAS}$, $\overline{WRITE}$, $A_0$ to $A_9$ in the foregoing cases corresponds with "write cycle" shown in FIG. 11, in which the output $DO_0$ to $DO_{11}$ are kept at high impedance as they are and the data applied to input terminals $Di_0$ to $Di_9$ are written.

Read

When MMODE 3 input is High (MMODE 1, 2 are Low), both of two inputs are Low, while the output is High for NOR gate 407. Accordingly, $\overline{WRITE}$ input for $MB_0$ to $MB_{14}$ are High. Other situations are the same as those in the case of "read".

Figure 12:
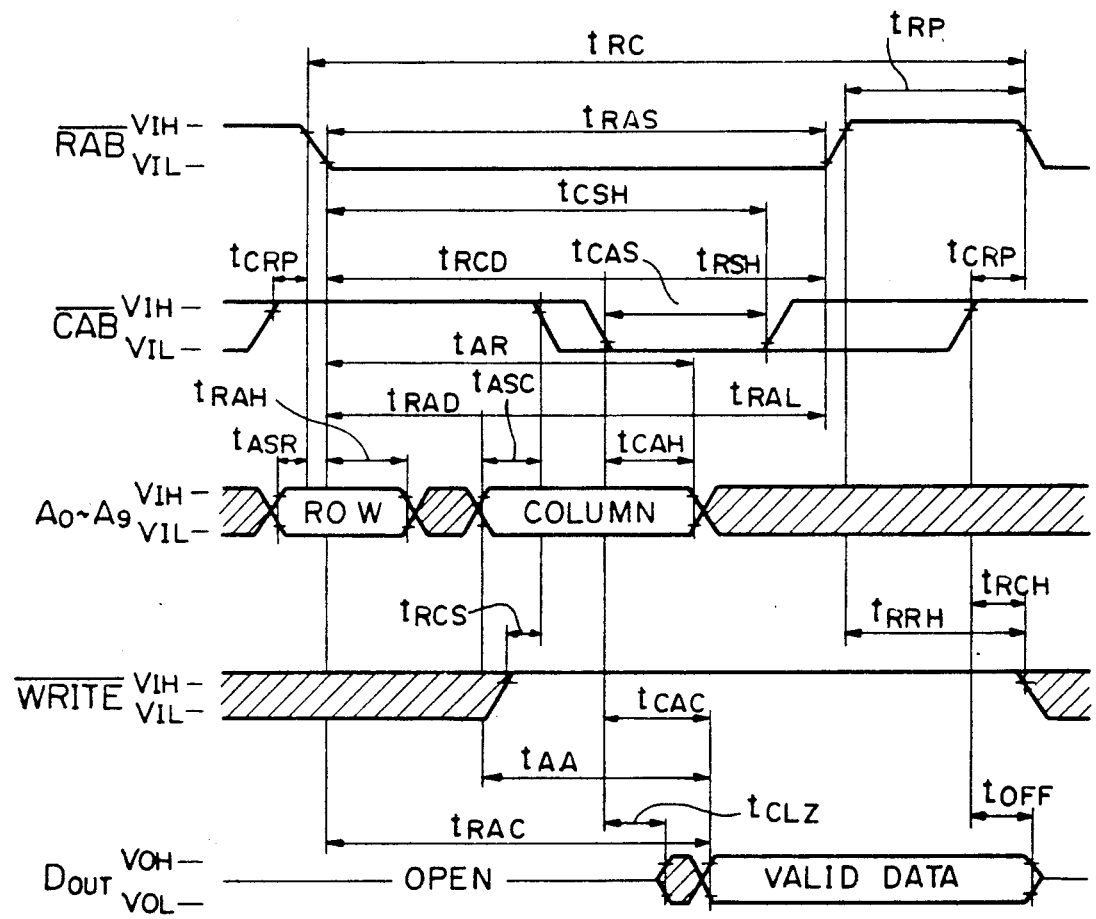
FIG. 12 is a timing chart for the read cycle in FIG. 9.
Figure 13:
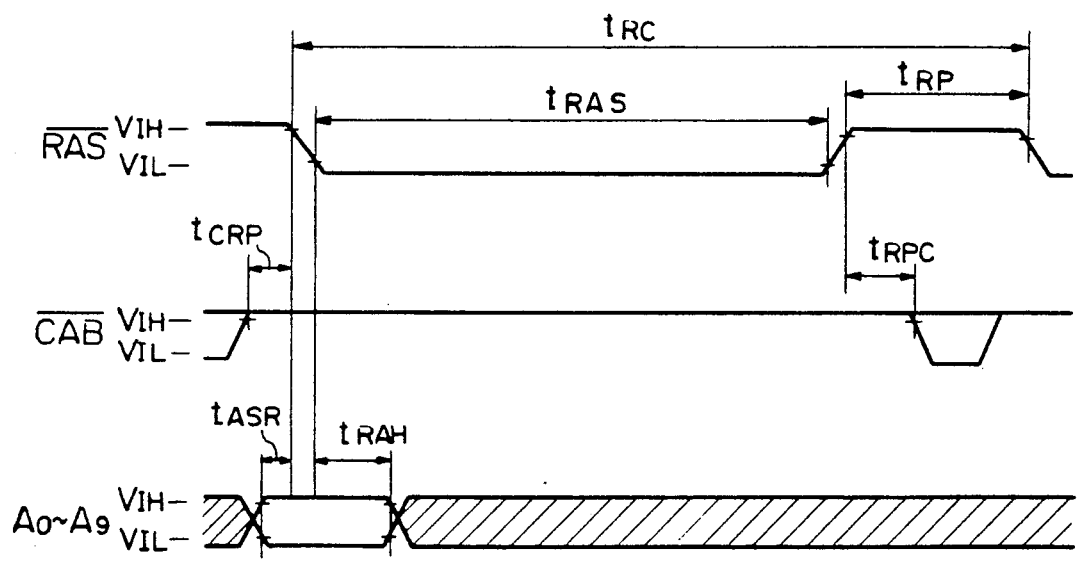
FIG. 13 is timing chart for the refresh cycle in FIG. 9.

In this case, the timing for $\overline{RAS}$, $\overline{CAS}$, $\overline{WRITE}$, $A_0$ to $A_9$ correspond with those of "read cycle" in FIG. 12, in which new data are not inputted (written) but data stored so far are outputted to the output terminals $DO_0$ to $DO_{11}$.

In the same manner as the input $A_0$ to $A_9$ of $MB_5$, $MB_6$ is given as the output value of the address counter 1 ($421_1$) at MMODE 1 (read/write mode), while as the output value of the address counter 4 ($421_3$) at MMODE 2 (write mode) and at MMODE 3 (read mode), the input data $Di_0$ to $Di_{11}$ and the output data $DO_0$ to $DO_{11}$ of $MB_5$, $MB_6$ are also changed depending on the mode. The input data is switched by MPX1 (403), while the output is switched by the demultiplexer DMPX (404).

MPX1 (403) outputs the input on the side of X at SEL=High, while it outputs the input on the side Y at SEL=Low. DMPX (404) outputs the side A at SEL=High, when the side B is at a high impedance. It outputs on the side B at SEL=Low in which the side A is at a high impedance.

While $402_Y$, $402_M$ and $402_C$ are serial/parallel converters that convert 3 bit × 4 data into 12 bit data.

Further, $405_Y$, $405_M$ and $405_C$ are parallel/serial converters which convert 12 bit data into 3 bit × 4 data. That is, the operation is quite opposite to that of $402_Y$, $402_M$ and $402_C$. These converters are necessary only for lowering the operation frequency of the memory or memory control circuit.

Since each SEL input for MPX1 (403) and DMPX (404) is directly connected to the MMODE 1 line, at MMODE 1=High;
the input data to $MB_5$, $MB_6$ are Y (yellow) data and the output from $MB_5$. $MB_6$ are also outputted as Y data,
at MMODE 2=High;
the input data to $MB_5$, $MB_6$ are C (cyan) data and the data of $CDi_0$, $CDi_3$ are written, and at MMODE 3=High;
data stored in $MB_5$, $MB_6$ are outputted as C data to $CD_0$ to $CD_2$.

Memory addressing at MMODE 1
In this case:
SYMETRY 2=Low
MIRROR 2=Low
SWAP 2=Low
MMODE 1=High
MMODE 2=Low
MMODE 3=Low
VDENA=High
are kept during operation.
Then, it is set as:
value for data setting SW1
($416_1$)=16×330×16×297×¼=6,272,640
value for data setting SW2
($416_2$)=16×220×16×297×¼=4,181,769
value for data setting SW3
($416_3$)=16×110×16×297×¼=2,090,880.

When one shot of MSTART pulse enters into all of the counters 1 to 3 ($421_1$ to $421_3$), all of them are cleared and they are incremented each by one upon every addition of ACLK from the timing signal generator 406 to the CLK terminal after passage of several gates (438,442, ----), and the lower 20 bits of the output, are applied by way of multiplexers 418, 419, 420 to the ROW COLUMN address of each of the memory blocks.

Figure 16:
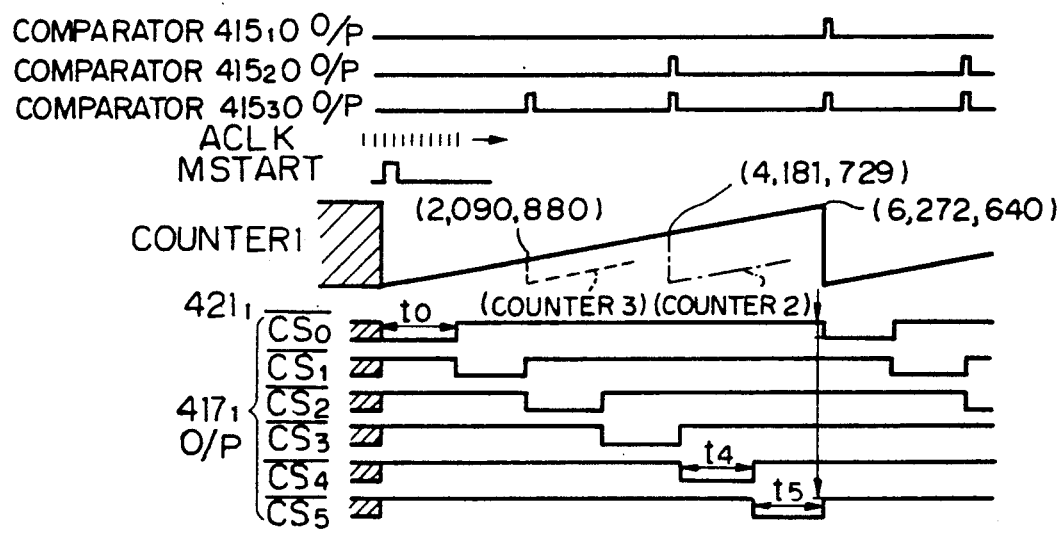
FIG. 16 is a timing chart for the counter at memory mode 1.

While on the other hand, the upper 4 bits output from the counters 1 to 3 are inputted to the decoders $417_1$ to $417_3$ and the decode signals are outputted to $\overline{CS_0}$ to $\overline{CS_6}$. The $\overline{CS}$ output is switched at $2^{20}=1,048,576$ unit. While on the other hand, the outputs from the counters 1 to 3 are connected to the A input for the comparators $415_1$ to $415_3$ and, when they correspond with data setting $SW_1$ to $SW_3$ respectively, the output 0 issues High. The output goes through AND gates $426_1$ to $426_3$, OR gates $428_1$ to $428_3$, AND gates $423_1$ to $423_3$, OR gates $431_1$ to $431_3$ and monomultivibrators $MM_1$ to $MM_3$ ($430_1$–$430_3$) and makes the CLR terminals for each of the counters 1 to 3 High for an extremely short period of time thereby clearing them. Then, the foregoing procedures are repeated. In this case, since the input on the left of AND gates $423_1$ to $423_3$ are always Low, output from AND gates $427_1$ to $427_3$ are always Low and the output from the comparators $425_1$ to $425_3$ do not contribute at all to the counter CLR. This is shown in FIG. 16.

In this case, $t0=t1=t2=t3=t4=\neq t5$. That is, there are parts not used in the memory block 6.

Figure 17:
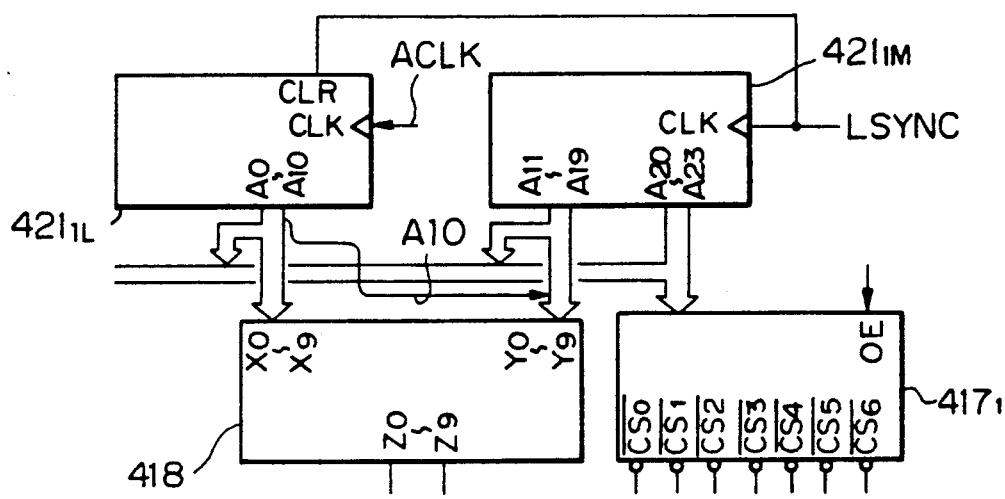
FIG. 17 is a view for another constitution of the counter.

In addition, since the memory block 7 is not accessed, it may be saved. However, the following problem may occur: that is "if counting error should occur during operation, etc. positional relationship for all of the picture element data is out of the order hereinafter. That is, the picture elements of the image are out of the order failing to prepare a correct copy". In view of the above, it is more desirable to adapt such that an error, if resulted to the count value in the operation, is kept within the relevant main scanning line and not continued to the succeeding main scanning line. In view of the above, the counter is constituted, for example, as shown in FIG. 17. That is, the counter is divided into lower 11 bits and upper 13 bits and adapted to be cleared on every LSYNC for the lower 10 bits. In this case, since the number of picture elements is 9752 in one scanning line and ACLK is 1188, there may occur a defect that considerable parts not used are resulted on every one scanning line for the memory.

In view of the above, it is desirable in such an memory address control circuit that the error range in the image data upon occurrence is narrow and the effective rate of using the memory is high. However, since this has no direct concerns with the present invention, detailed descriptions therefor are omitted. In this case, memory block is required by more one and $MB_6$ is also used.

It can be seen from above that the data to be read is always delayed when written only by the setting number since the read and write are conducted simultaneously and the addressing occurs at the frequency set for $SW_1$ to $SW_3$ ($416_1$ to $416_3$).

Addressing at memory mode 2

Figure 18:
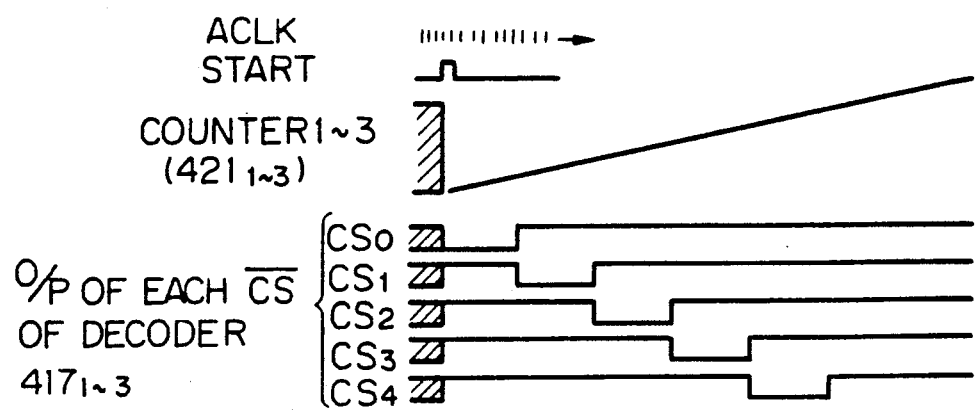
FIG. 18 is an addressing timing chart at memory mode 2.

When the counters 1 to 3 ($421_1$ to $421_3$) are used as the address counter, MMODE 2 and VDENA are kept high and others are kept Low in the memory mode 2 as in the case of the memory mode 1. In this case, since the output of the inverter 450 is Low and is inputted into the AND gates $432_1$ to $432_3$, gates $426_1$ to $426_3$ no longer output High. That is, since the counter is not cleared even if the comparators $415_1$ to $415_3$ issue coincidence output, each of the decoders is successively addressed from $CS_0$ to $CS_4$. Although $CS_5$ and succeeding CS are successively outputted, since there are no object RAM, they are not accessed. The timing is shown in FIG. 18.

Addressing at memory mode 3

Figure 19A:
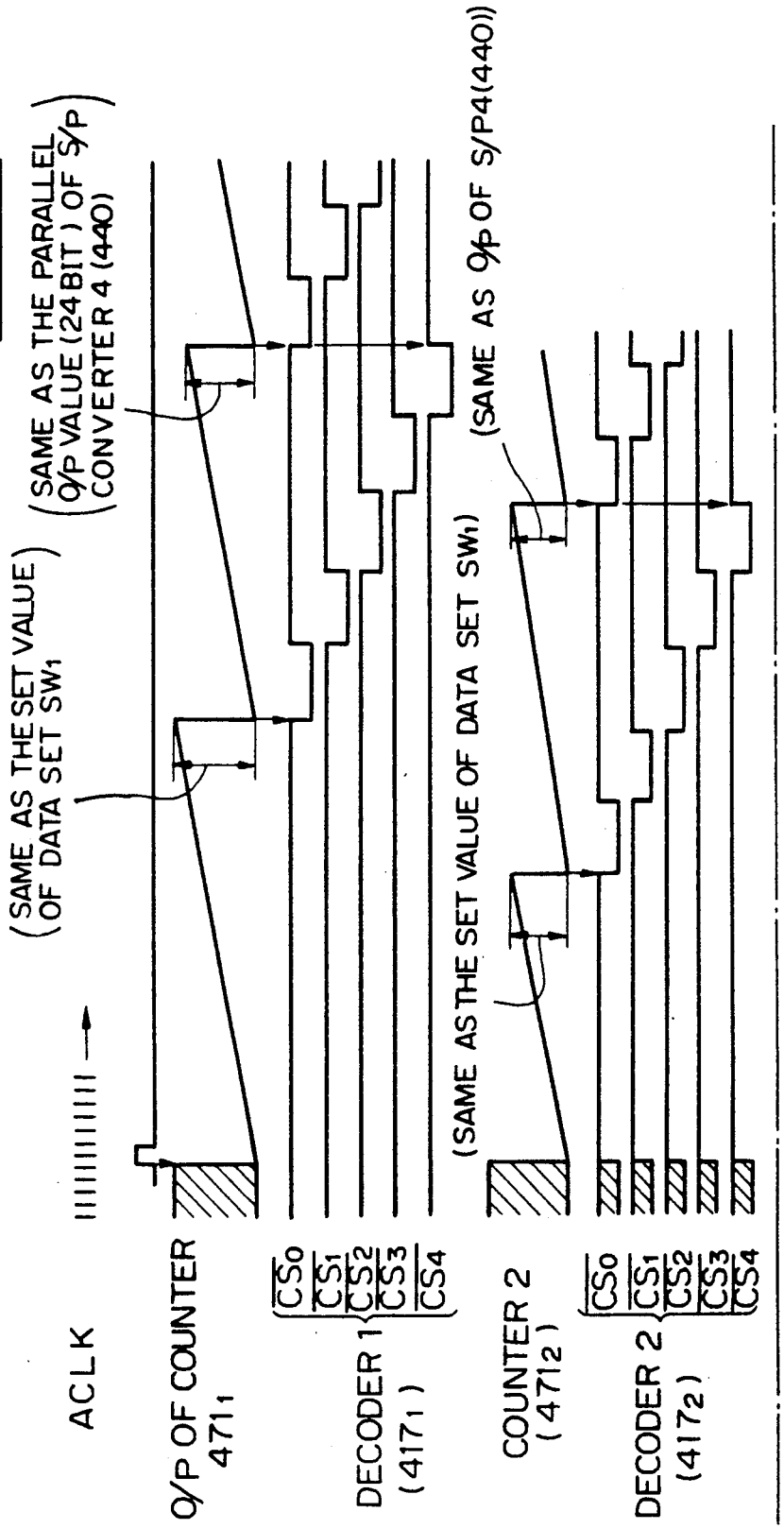

The counters 1 to 3 ($421_1$ to $421_3$) are used as the address counter in the same manner as in the modes 1, 2, in which VEDENA and MMODE 3 are kept High and others are kept Low. FIG. 19 shows the addressing timing chart at the memory mode 3 (MMODE 3). Upon input of one START pulse, each of the counters 1 to 3 is cleared and incremented along with the input of ACLK. Since RSFF1 is kept reset by the START pulse in this state, the Q output is kept Low and, accordingly, the outputs of AND gates $434_1$ to $434_3$ are kept Low.

Since the other input for OR gates $433_1$ to $433_3$ is also at Low, OE (output enable) of the decoder 1 to 3 are kept Low. Accordingly, all of CS outputs from the decoder 1 to 3 ($417_1$ to $417_3$) are High, that is, the memory is not made active but kept as it is in the refresh cycle. When each of the memories continues to count up and the input value for the address input of the 24 bit comparator 1 correspond with the data setting SW1 ($416_1$) (setting value: 6,272,640) at the counter 1, the comparator issues a high output at Q terminal, which goes through the delay line $422_1$, sets RSFF 1, makes the output of AND gate $426_1$ High, passing through OR gate $428_1$, AND gate $432_1$, OR gate $431_1$, monomulti vibrator $MM_1$ ($430_1$) and then momentarily makes CLR input to the counter 1 thereby clearing the same.

The Q output of RSFF1 is connected also to AND gate $434_1$ and the output from $434_1$ is High, the output from $433_1$ is also High from the setting of $RSFF_1$ (Q=High) and, accordingly, the output from the decoder $417_1$ is enabled from this instance, by which any one of $\overline{CS}$is outputted to start the access of the memory.

After setting $RFSS_1$, since the output from the comparator $425_1$ forms one input for the AND gate $427_1$, while the Q output from $RSFF_1$ forms the other input thereof, the counter 1 is cleared hereinafter over and over at any time when the setting value on the side A of the comparator $425_1$ (parallel output value from S/P convertor 440) and the output value of the counter 1 correspond with each other.

The subsequent operations are shown in FIG. 19.

Figure 20:
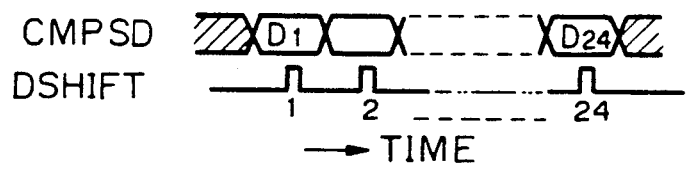
FIG. 20 is a timing chart for the data of the serial-parallel converter.

The serial/parallel convertor 440 sets the 24 bit output value by sending the CMPSD, DMMIFT data from $D_1$ to $D_{29}$ in synchronization with DSHIFT pulse from SCON 700 as shown by the timing in FIG. 20.

Further, all of the output terminals $DO_0$ to $DO_{11}$ of the memory are pulled-up to High. Accordingly, since the memory output is at a high impedance except for read enable, the value finally outputted to PR 400 is 111B (corresponding to blank).

In the foregoing explanation, the number of memories disposed is smaller by one than the number of the ingredient colors to be recorded. However, the memories may be disposed by a number equal to that of the color ingredients to be recorded. In this case, an effective constitution is obtained for making the reading position for each of the color ingredients identical (make regist).

(5) Printer Unit PR 600

Explanation is to be made for the printer unit (PR).

Referring to FIG. 2, output from CCD7r, CCD7g and CCD7b are applied under analog/digital conversion, applied with necessary processing and then converted into octanarized signals for activating recordings for 8 bit of black (BK), yellow (Y), magenta (M) and cyan (C) as recording color information.

Among the octanary signals, C, M, Y are passed through the memory unit MU 400 while BK is applied from IP 200 directly to the laser drivers $112bk$, $112y$, $112m$ and $112c$ of the printer unit PR 600 respectively and, when each of the laser drivers actuates the semiconductor lasers $113bk$, $117y$, $113m$ and $113c$, the laser beams modified with recording color signals (binary signals) are utted.

Referring again to FIG. 1, outputted laser beams are reflected at rotational polygonal mirrors $13bk$, $13y$, $13m$ and $13c$ respectively, passed through $f-\theta$ lenses $14bk$, $14y$, $14m$ and $14c$, reflected at the fourth mirrors $15bk$, $15y$, $15m$ and $15c$, and the fifth mirror $16bk$, $16y$, $16m$ and $16c$, passed through cylindrical lenses $17bk$, $17y$, $17m$ and $17c$ for compensating polygonal mirror surface fall and then irradiated under focusing on photosensitive drums $18bk$, $18y$, $18m$ and $18c$ respectively.

The rotational polygonal mirrors $13bk$, $13y$, $13m$ and $13c$ are secured to the rotational shafts of polygonal mirror drive motors $41bk$, $41y$, $41m$ and $41c$ and each of the motors rotates at a constant speed to rotationally drive the polygonal mirror at a polygonal velocity. By the rotation of the polygonal mirror, the laser beams are scanned in the direction perpendicular to the rotational direction (clockwise) of the photosensitive drum, that is, in the direction along the drum axis (hereinafter referred to as the main scanning direction).

Figure 21:
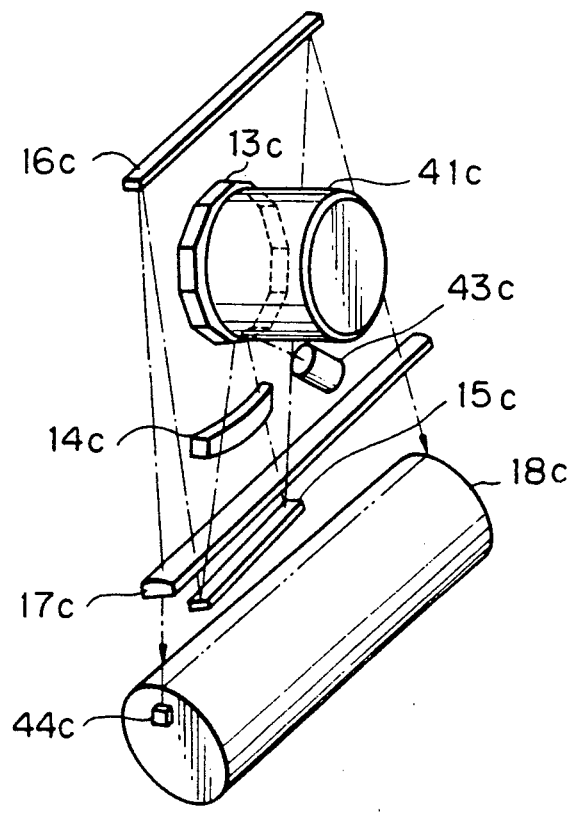
FIG. 21 is a detailed view for the laser scanning system.

FIG. 21 is a detailed view for the laser scanning system of a cyan color recording device in which $43c$ represents a semiconductor laser. A sensor $44c$ comprising a photoelectronic conversion element is disposed in such a relationship of receiving laser beams at one end of the laser scanning along the axis of the photosensitive drum $18c$ (dotted chain). The sensor $44c$ detects the laser beams and the starting point for 1 line scanning as a point at which the detected state changes from a detection to not-detection state. That is, the laser beam detection signals (pulse) of the sensor $44c$ are processed as the line synchronization pulse for the laser scanning. The constitution for the magenta recording device, yellow recording device and black recording device is the same as that for the cyan recording device shown in FIG. 21.

Referring again to FIG. 1, the surface of the lightsensitive drum is uniformly charged with charge corotrons $19bk$, $19y$, $19m$ and $19c$ connected to a high voltage generating device of negative charge (not illustrated). When laser beams modified with recording signals are irradiated on a uniformly charged surface of the lightsensitive material, electric charges on the surface of the lightsensitive material are reduced by being flown to the equipment grounding earth of the drum main body under the effect of photoconductive phenomenon. In this case, the laser lamp is not put on at the dense area of the original, while the laser lamp is put on at the pale area of the original. The potential at the portion corresponding to the dense area of the original is about $-800$ V, while the potential at the portion corresponding to the pale area of the original is about $-100$ V, at the surface of the lightsensitive drums 18bk, 18y, 18m and 18c, by which electrostatic latent images are formed depending on the density of the original. The electrostatic latent images are developed by a black developing unit 20bk, yellow developing unit 20m, magenta developing unit 20m and cyan developing unit 20c respectively, thereby forming black, yellow, magenta and cyan toner images to the surface of the lightsensitive drums 18bk, 18y, 18m and 18c respectively.

Toners in the developing unit are charged positively by stirring, the developing unit is biased to about $-200$V by a developing bias generator (not illustrated) and the surface potential of the lightsensitive material is deposited to a place at a potential higher than the developing bias, thereby forming toner images corresponding to the original.

While on the other hand, recording paper 267 contained in a transfer paper cassette 22 is delivered by the paper feeding operation of a roller 23 and then sent to a transfer belt 25 by a regist roller 24 at a predetermined timing. The recording paper carried on the transfer belt 25 is passed below the lightsensitive drums 18bk, 18y, 18m and 18c successively by the movement of the transfer belt 25 and, during passage through each of the lightsensitive drums 18bk, 18y, 18m and 18c, each of black, yellow, magenta and cyan toner images is successively transferred on the recording paper by the effect of transfer corotrons below the transfer belt. The transferred recording paper is then sent to a heat fixing unit 36 where the toners are secured to the recording paper, which are then discharged to a tray.

While on the other hand, residual toners on the surface of the lightsensitive material after transfer are removed with cleaner units 21bk, 21y, 21m and 21c.

The recording devices for respective colors are disposed each apart by 110 mm. Further, it is set such that the recording density is 16 dot/mm, the number of picture elements in one main scanning line is 4752 dots and the maximum number of picture elements in a sub-scanning direction is 6720 dots.

Explanation is to be made for the printer controller 601 and its operation. The printer controller comprises a microcomputer portion having an output port equipped with a driver for actuating each of the portions of the printer, input ports receiving input from sensors, an input/output interface with SCON 700, CPU, RAM, ROM, and interrupt controller, etc., as well as a picture element data writing high speed logic circuit interfaced with a part of the I/O portion.

When the system power source is turned on by a system power source switch 50, electric power is supplied also to PR 600 to conduct the following operations:

Temperature increase for the fixing unit 36.
Starting at the equi-speed rotation of the polygonal mirror
Home positioning for the carriage 8.
Generation of line synchronization clock (LSYNC) (1.44 KHz)
Generation of video synchronization clock (CLKO: higher than 7 MHz) (8.42 MHz)
Initialization for each of counters.

The line synchronization clocks are supplied to the polygonal mirror motor driver, IP 200, SC 100 and SCON 700, and the signal is used in the former as the reference signal for the phase locked loop (PLL) servo and controlled so that beam detection signals of the beam sensors 44bk, 44y, 44m and 44c as the feedback signals have the same frequency as that of the line synchronization clocks and it is in the predetermined phase relationship.

Since the detection signal (pulses) of the beam sensors 44bk, 44y, 44m and 44c are outputted on every color (every sensor), they are utilized as the signals for starting sychronization of laser beam main scanning. Although the frequency of the line sychronization signal and the detection signal for each of the beam sensors are identical being locked by a PLL. However, since phase difference may sometimes be caused to some extent, detection signals for each of the beam sensors are used instead of the line synchronization signal as the standard of the scanning. The video synchronization clock has a frequency of laser writing at 1 dot (1 picture element) unit and it is supplied to the writing high speed logic circuit or the laser drivers 112bk, 112c, 112m and 112y.

The writing high speed logic circuit includes:
(1) Two sets of image memories for one main scanning (used for input toggle buffer)
(2) Dot counter for each of writing BK, C, M and Y.

Figure 22A:
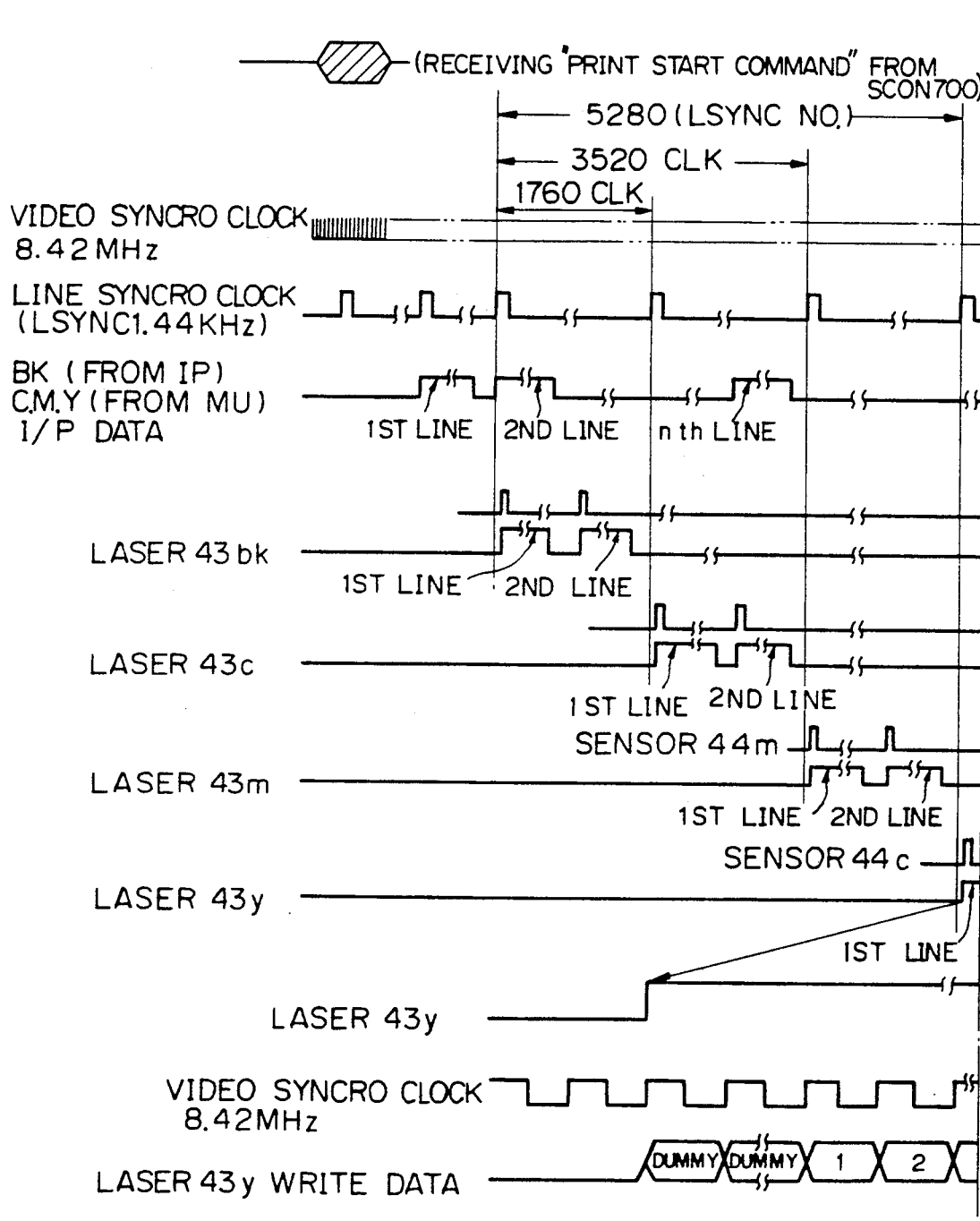
FIGS. 22a and 22b are timing charts for the writing in the printer unit.
Figure 22B:
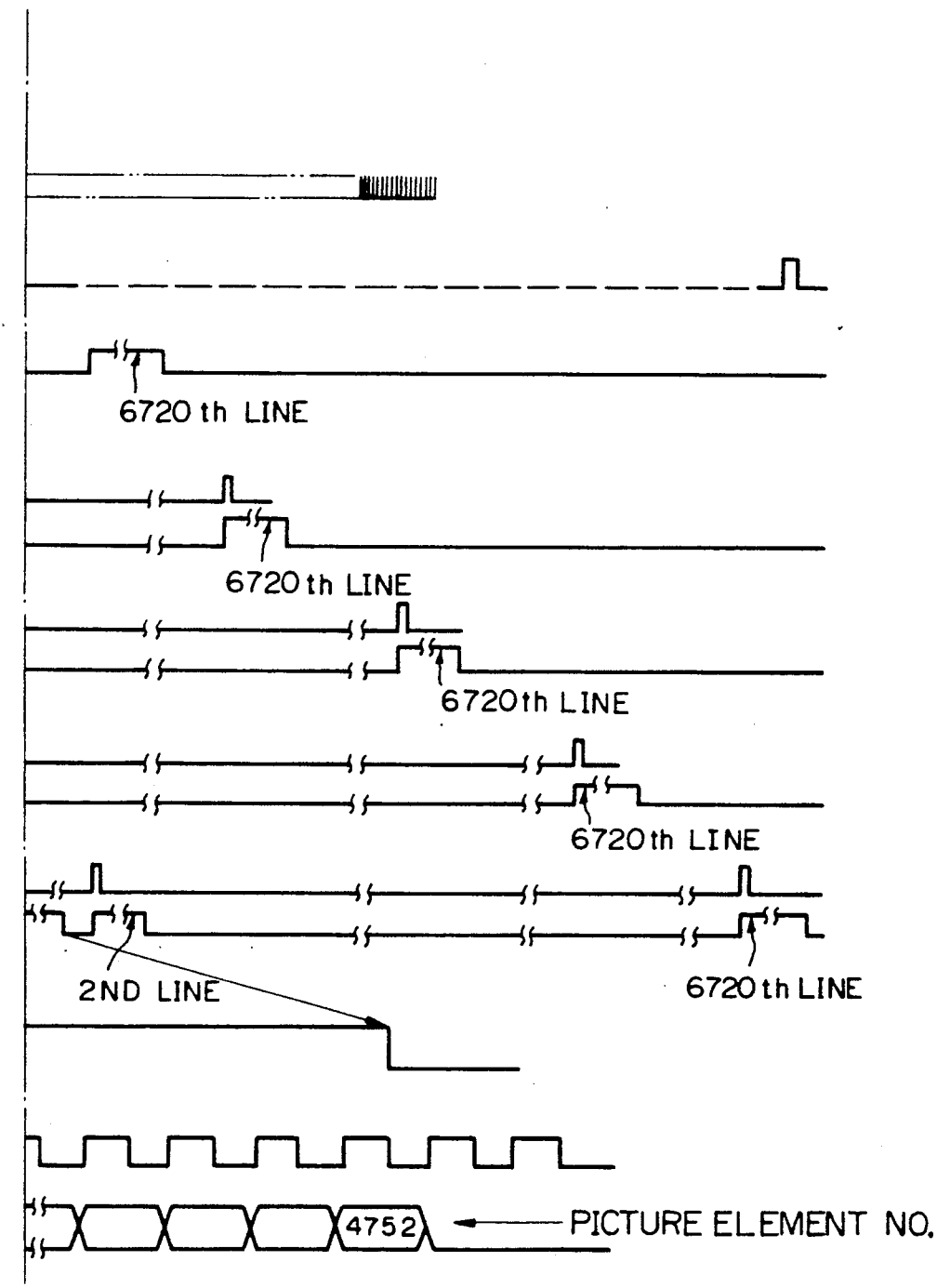

FIG. 22 is a timing chart for the printing cycle.

When the warming-up operation is completed, print enable state is attained, in which PR 600 sends "READY" status to SCON 700. The SCON 700 sends "PRINTER START" command to PR 400 when the states for all of other units are "OPERATION ENABLE" and when the copy button on the CU 750 is pressed.

When receiving this signal, the PR 600 inputs effective image data to laser drivers 112bk, 112c, 112m and 112y from the next LSYNC delayed by one main scanning line (for toggling buffer), and each of the drivers drives laser devices 43bk, 43c, 43m and 43y. The writing dot counters (BK, Y, M, C) are respectively cleared by the rise of the detection signals of the beam sensors and the counting up is conducted by the video synchronization signal.

During counting 1 to 400 in the dot counter, dummy data 401 to 5153 (4752) are writable value. The dummy data are used for adjusting the physical distance between each of the beam sensors 44bk, 44y, 44m and 44c and the light-sensitive drums 18bk, 18y, 18m and 18c. The writing data 7 to 0 are taken at the fall of the video synchronization signals.

First, second, - - -, 6720th in the timing chart (FIG. 22) are numbers of scanning lines for one main scanning line transferred on one identical position in the sub-scanning of the transfer paper.

Writing to the toggle buffer memory is conducted at a frequency for CLKO (7 MHz) supplied from IP 200, while reading of one of the toggle buffer memories is conducted at the cycle of the video synchronization signal (8.42 MHz).

The frequencies between both of them are made different because it is necessary to speed-up since the effective scanning range of the laser beam is about 70% of the rotational angle of the motor 41c due to the use of the polygonal 13c as shown in FIG. 21.

Furthermore, the microcomputer includes two sets of main scanning counters (LSYNC-CTR$_{1,2}$), in which one of the counters (CTR$_1$) is cleared by a "START PRINT" command from SCON 700, and incremented each by one on every input of LSYNC. LSYNC-CTR$_1$ outputs the following indications depending on the value to the laser driving circuits 112$_{bk}$, 112$_C$, 112$_M$ and 112$_Y$.

For 112$bk$: drive laser 43$_{bk}$ if LSYNC-CRT=1 to 6720 and not drive other than above For 112$c$: drive laser 43$c$ if LSYNC-CRT$_1$=1760 to 8479 and not drive other than above For 112$m$: drive laser 43$_m$ if LSYNC-CRT$_1$=3520 to 102,390 and not drive other than above For 112$y$: drive laser 43$_y$ is LSYNC-CRT$_1$=5286 to 12,005 and not drive other than above.

When a plurality of copies are printed continuously, the next "START" command is received from SCON 700. If LYSNC-CRT$_1$ is being in operation, LSYNC-CTR$_1$ is cleared and started.

Further, for the image data for the second sheet, lasers 43$_{bk}$, 43$_c$, 43$_m$ and 43$_y$ are controlled in the same manner as above. Further, when the start signal for the third sheet is received and, when LSYNC-CTR$_2$ is in operation, the first counter is cleared and started. Such a toggling operation is hereinafter repeated to prepare a plurality of sheets of copy prints. Accordingly, if irregular values are received for the BK data from IP 200 or C, M, Y data from MU 400 out of the effective image section, they are not prepared as images on the lightsensitive materials 18$_{bk}$, 18$_c$, 18$_m$ and 18$_y$.

Actually, a flag is set in the RAM of the microcomputer as to if each of the colors BK, C, M and Y is outputted or not and a logic product is taken between the flag and LSYNC-CTR$_1$, CTR$_2$ described above to determine if the laser 43$_{bk}$, 43$_c$, 43$_m$ or 43$_y$ is outputted or not. The flag is set by a "SET COLOR MODE" command from SCON 700.

(6) Console Unit (CU) 750

Figure 24B:
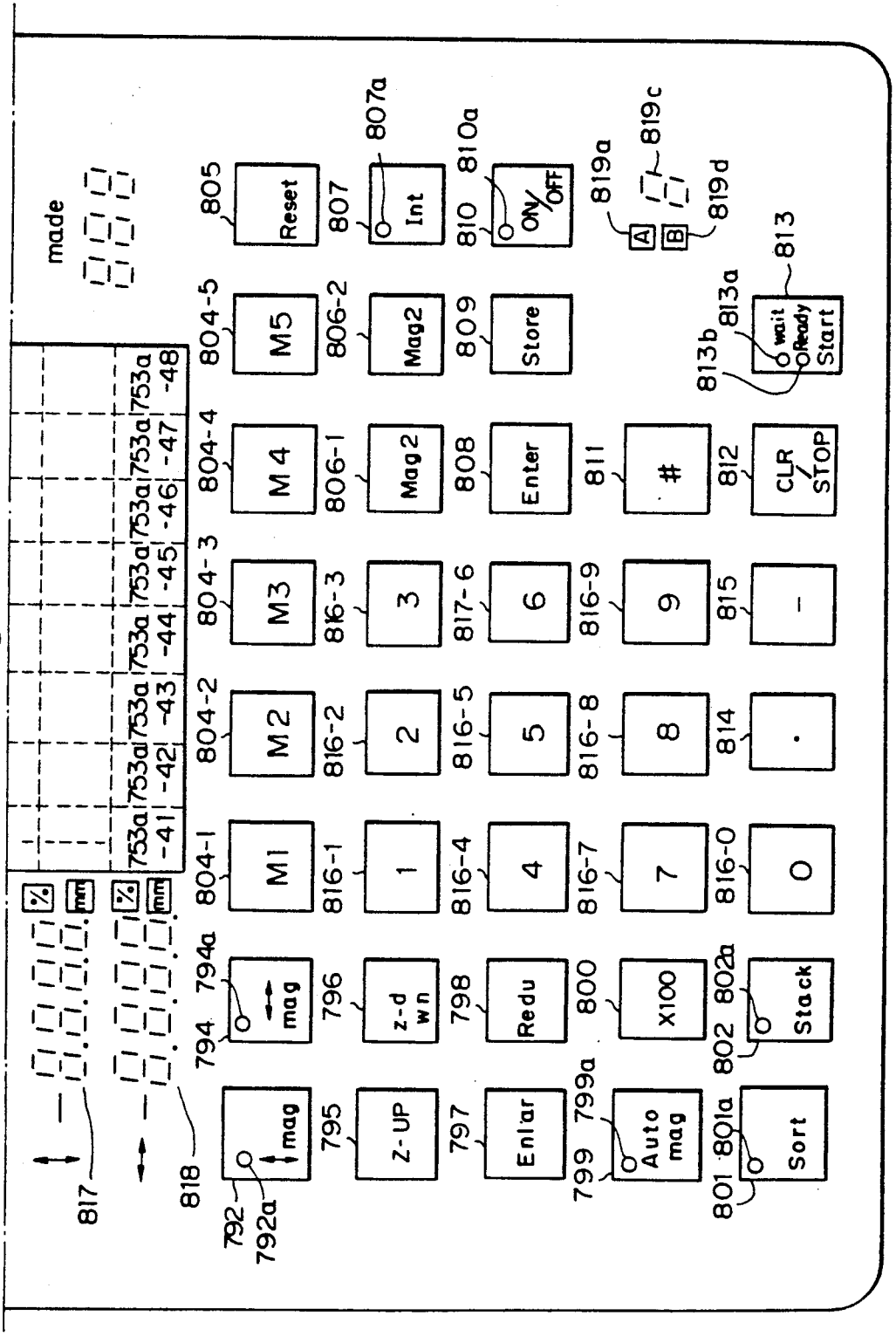
Figure 25A:
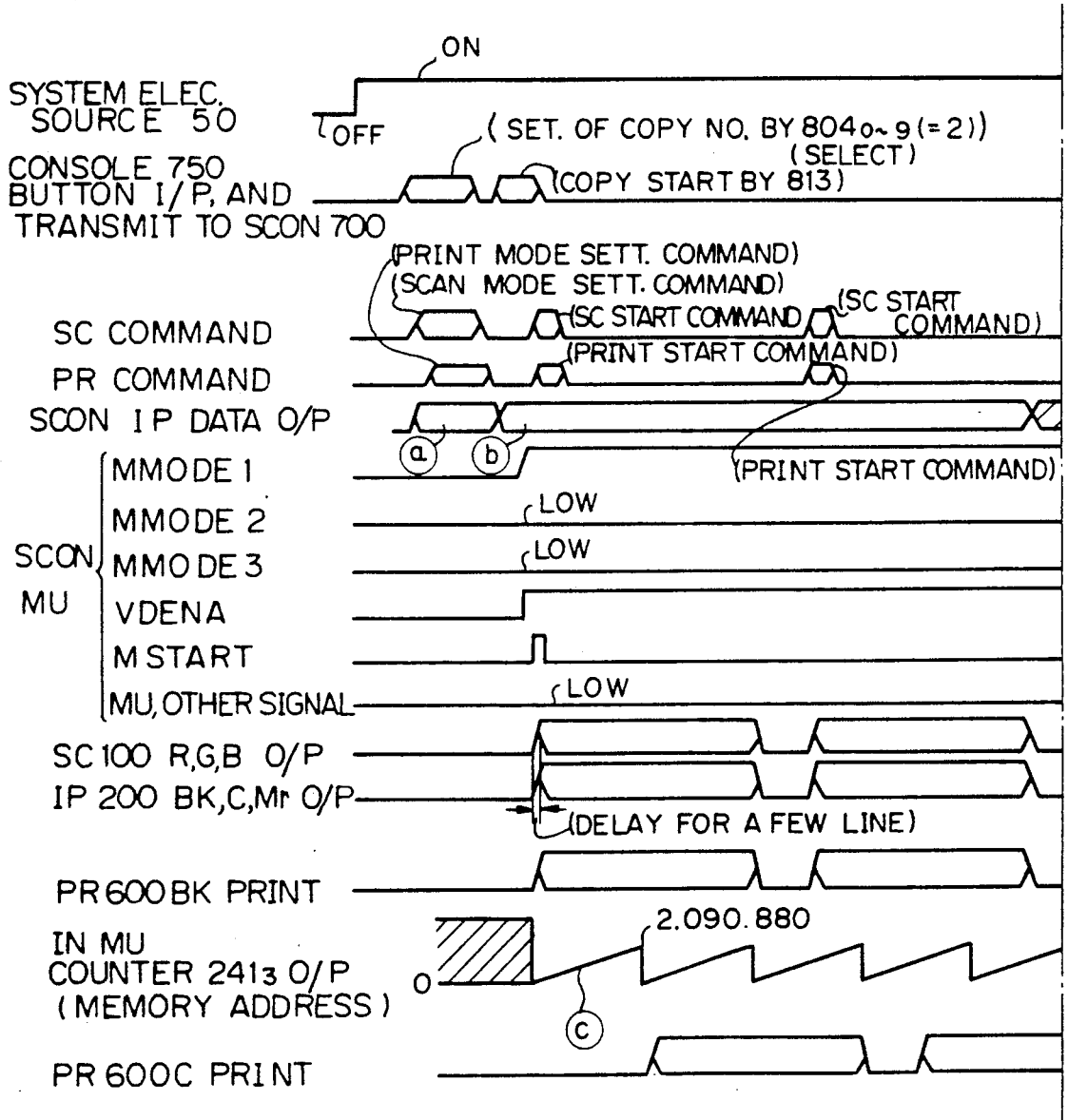
FIGS. 25a-25d are timing charts for the fundamental copy mode.
Figure 25B:
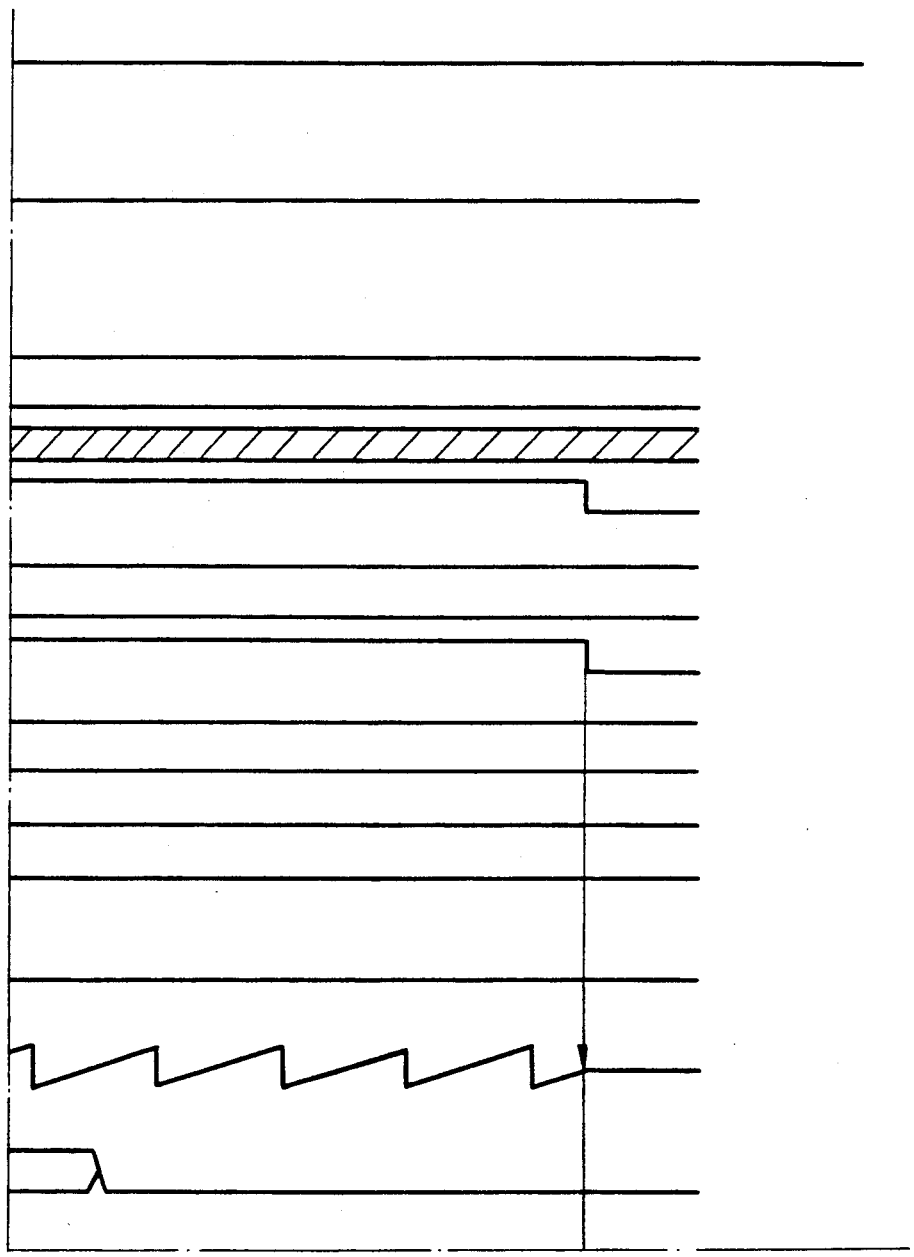
Figure 25C:
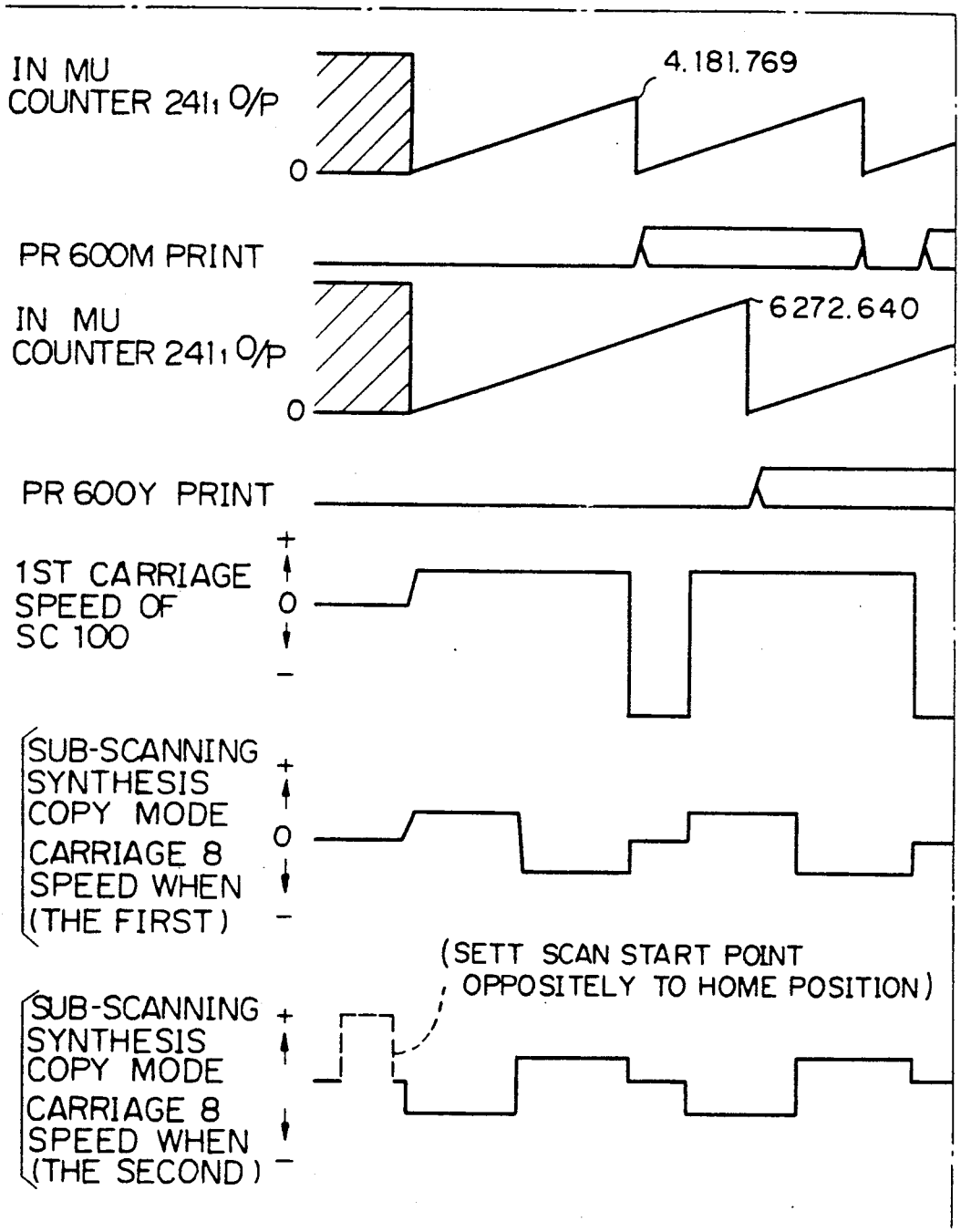
Figure 25D:
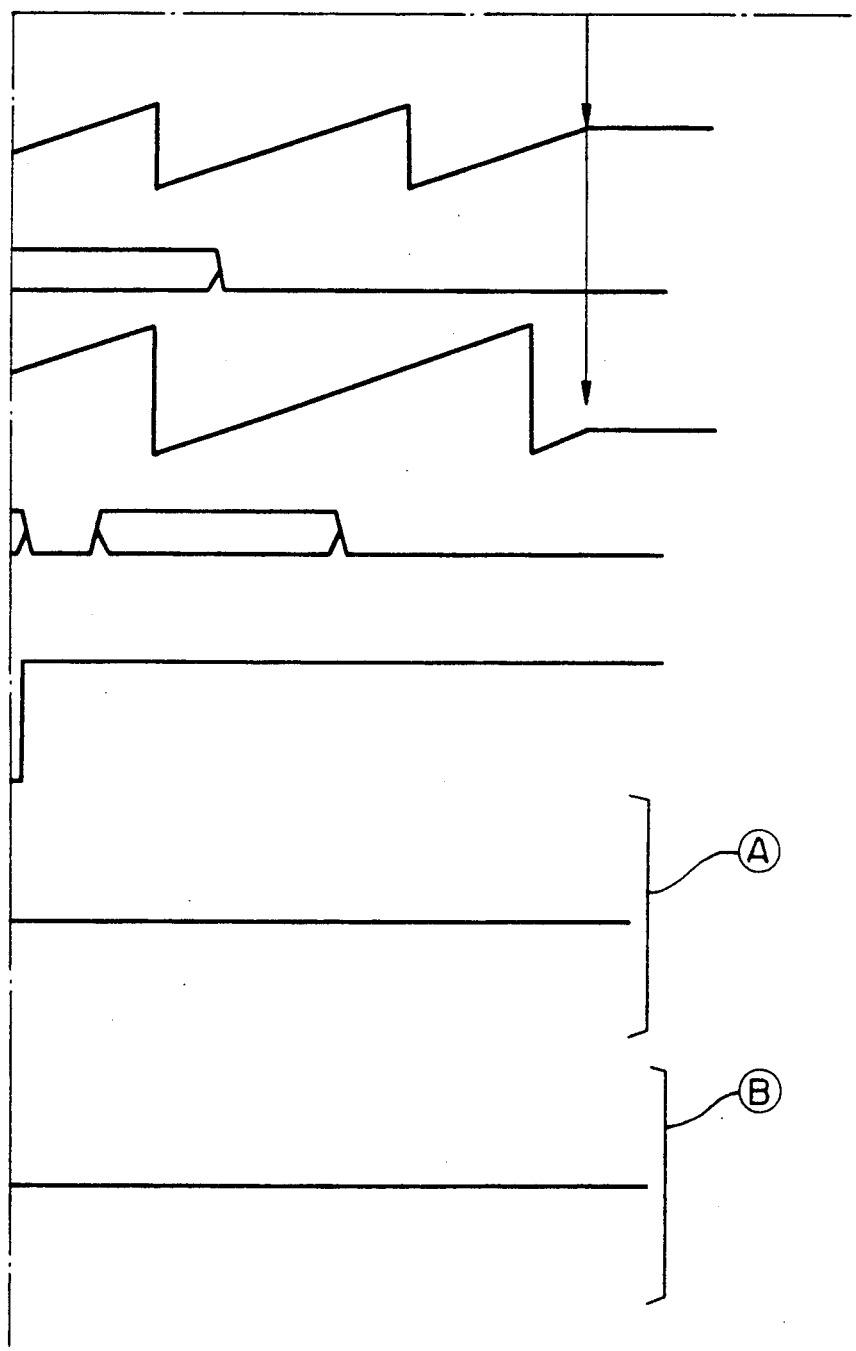

FIG. 23 is a block diagram for the console unit and FIG. 24 is a view for the arrangement of operation display buttons and display means.

In FIG. 23, the CU 750 comprises a console board 750', CPU 754, matrix type or dynamic drive type I/O decoder driver 756, LCD controller 757, VIDEO RAM 758, RAM 759, ROM 760, interrupt controller 761, serial I/O 762 and LCD driver 763. Further, the console board 750' comprises a 512×256 dot LCD dot matrix display 751, LED display group 752 and switch matrix group 753. The switch matrix group 753 includes group 1 and group 2 in which the group 1 comprises 49 switches (usual push buttons) 765 to 813 shown in FIG. 24, while the group 2 consists of transparent touch sensor buttons 753$a$-11 to 753$a$-48. The touch sensor and the LCD dot matrix display 751 are disposed at an identical position in FIG. 24. The touch sensor is divided laterally into 8 and vertically into 4 sections to constitute a matrix-like switch of 8×4=32 in total.

In FIG. 23, when the switch button of group 1 is pressed, the I/O decoder driver 756 makes the interrupt signal 756$a$ High. When the touch sensor of the group 2 is pressed, the interrupt signal 756$b$ is made High to enter into an interrupt service routine and ON/OFF state for all of the switches can be recognized by CPU 754.

In this case, information to be sent to SCON 700 is directly transmitted by way of SCON I/F762 (serial I/O) to SCON 700.

Further, if some other display is necessary, it is displayed on LED display group 752 or the LCD dot matrix display 751.

The display is changed when one or a plurality of switch matrix group 753 is pressed or a display command is received from SCON 700.

Then, explanation is to be made for the operation of preparing print copy in the system.

(1) Fundamental Copy Mode

Read scanning by the scanner unit SC 100 is conducted for N times for preparing N sheets of copies, in which the data read by SC 100 is subjected to image processing in the image processor IP 200 and BK data is directly outputted to the printer unit PR 600, while C, M, Y data is outputted to the memory unit MU 400. MU 400 receiving C, M, Y data outputs the C data with a delay corresponding to the distance 110 mm between the BK recording device and the C recording device in PR 600. The 110 mm value corresponds to 110×16 LSYNC=1760 main scanning line, and 1760 lines correspond to 1760×(297 mm (effective scanning line length)×16 dots)=8,363,520 picture elements. With this delay resulted and outputted to PR 600. In the same manner, the data are outputted to PR 600 with a delay of 1,672,707 picture elements for M and 25,090,560 picture elements for Y. That is, MU 400 is operated as the memory mode 1.

FIG. 25 is a timing chart for the fundamental copy mode in which the timing is shown for the case of two repeat copy sheets. In this case, it is assumed a four full color mode and SCON 700 sends "SET COLOR MODE" command to PR 600 that all of BK, C, M, Y data can be outputted. Each kind of scan mode setting commands such as "READ A SIZE" is sent to SC 100. UCR in IP 200 is set as UCR execution. In FIG. 25, regarding the item for "SCON IP DATA O/P":

(a) Output for setting before the image processing of IP 200, for example, writing to RAM 224.

(b) Those always outputted effective during image processing of IP 200, for example, UCR, D$_0$ to D$_{11}$, etc. which may change in the course of the processing.

Following this, "START SCAN" command is at first sent to SC 100 and, simultaneously, the counter of LYSNC in SCON 700 (referred to as SYS-L-CTR) is cleared and made count enable. When the count value of SYS-L-CTR reaches (the counter value is hereinafter referred as nIp) to a required number of the main scanning line for the processing in IP 200 (several to several tens), "START PRINT" command is outputted to PU 600 and one pulse is outputted to MU 400 on MSTART line. Then, among the image signals processed in IP 200, BK is directly outputted to PR 600 to instantly start the print operation. C, M and Y are inputted to PR 600 with a predetermined delay for several picture elements in MU 400 and a printing operation is executed for each of the colors. The portion (C) (also in other portion) outputs data stored in MU 400 the value may be incorrect. However, since the outputs of the lasers 43$_{bk}$, 43$_c$, 43$_m$, 43$_y$ are controlled by LSYNC-CTR 1, 2 in PR 600 as described above, these data are not printed.

When the value of SYS-L-CTR in SCON reaches an appropriate value, the counter is cleared, "START" command is sent again to SC 100 and, further, the "START" command is sent to PR 600. The MSTART pulse is not generated in MU 400.

By repeating the foregoing procedures, repeat copies can be prepared.

(2) High Speed Copy Mode

For preparing N sheets of copies;

SC read scanning is conducted for once, in which IP 200 conducts image processing and MU 400 is in MMODE 2.

PR printing operation is conducted for N times in which MU 400 is in MMODE 3.

Figure 26A:
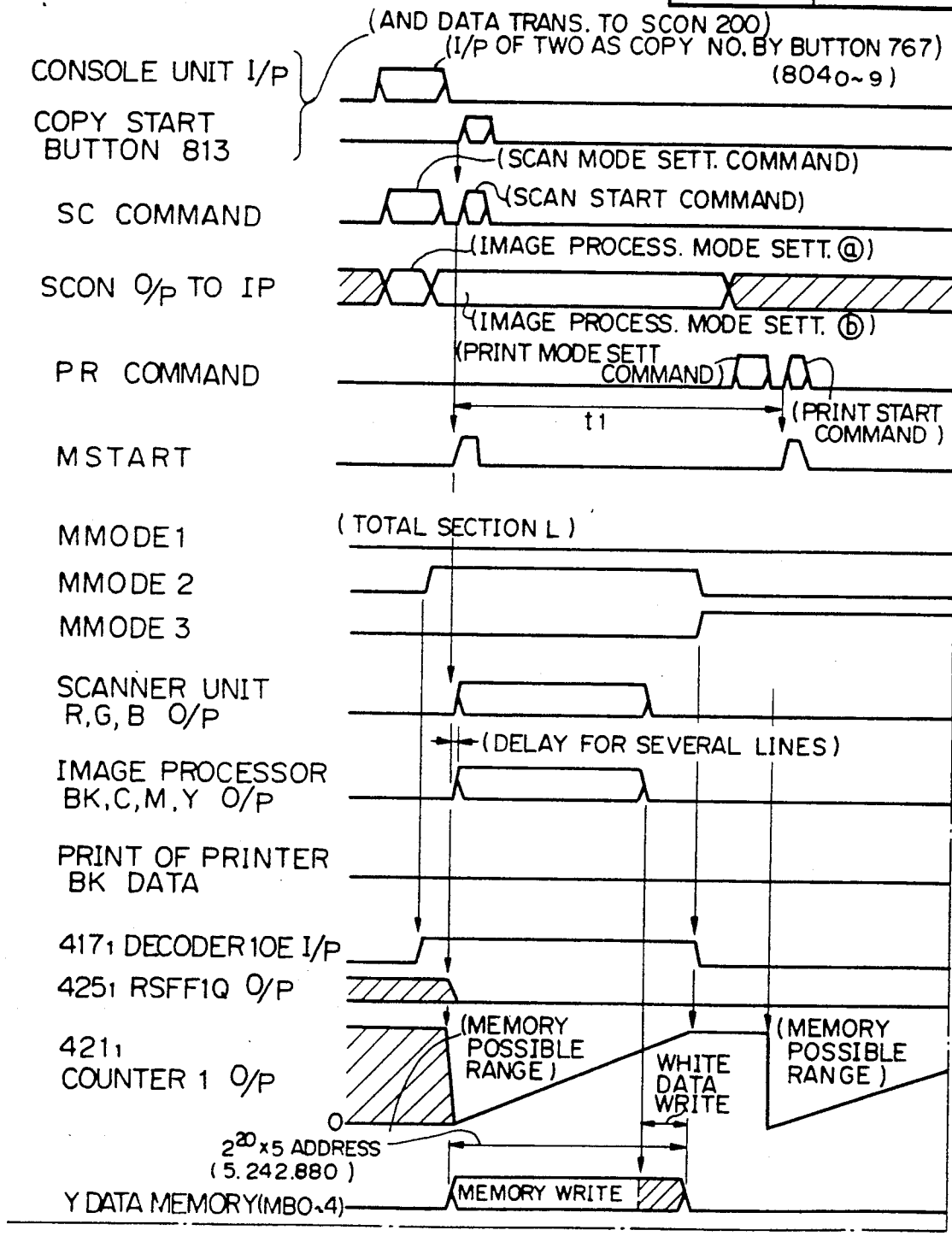
FIGS. 26a-26d are timing charts for the high speed copy mode.
Figure 26:
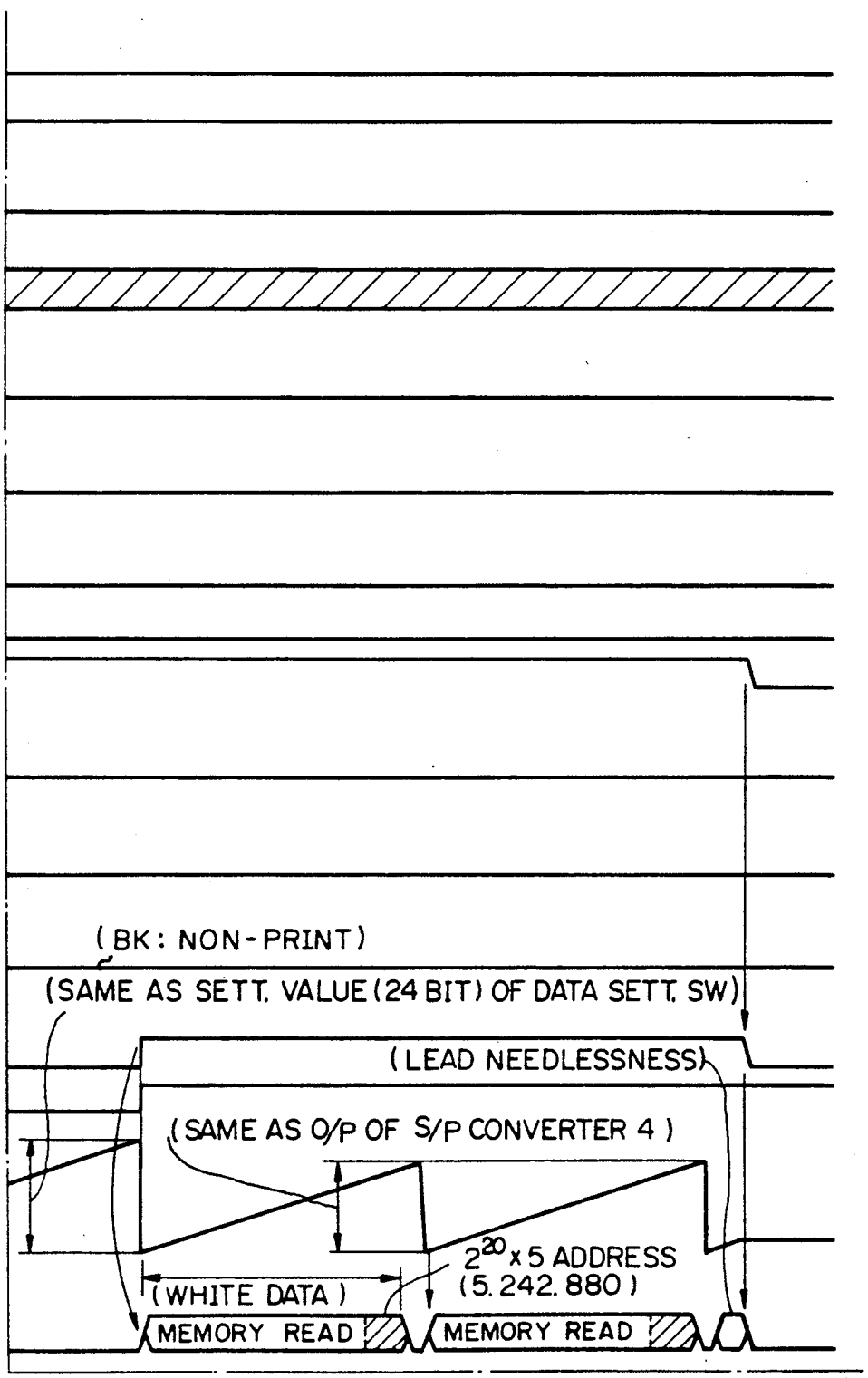
Figure 26C:
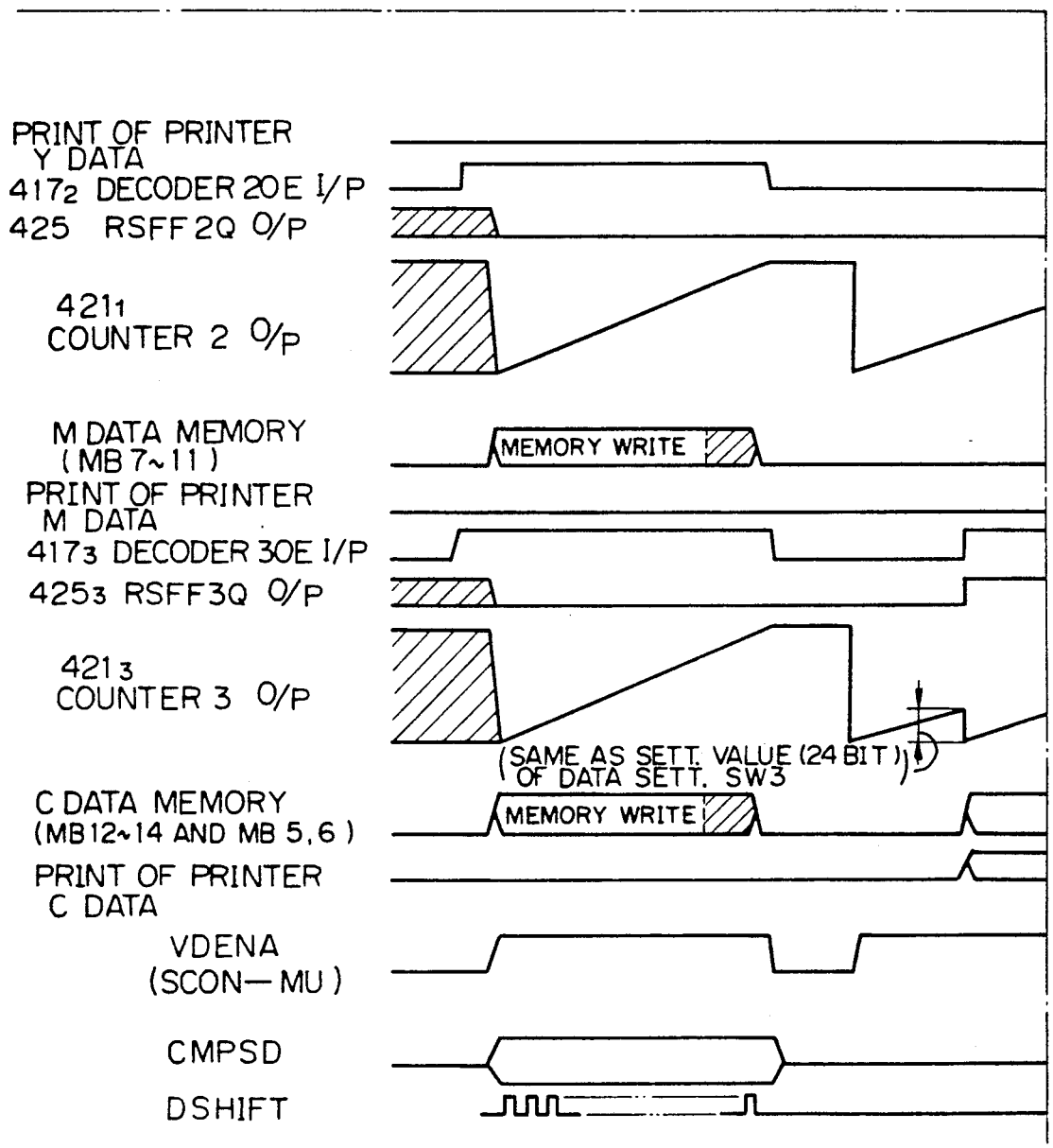
Figure 26D:
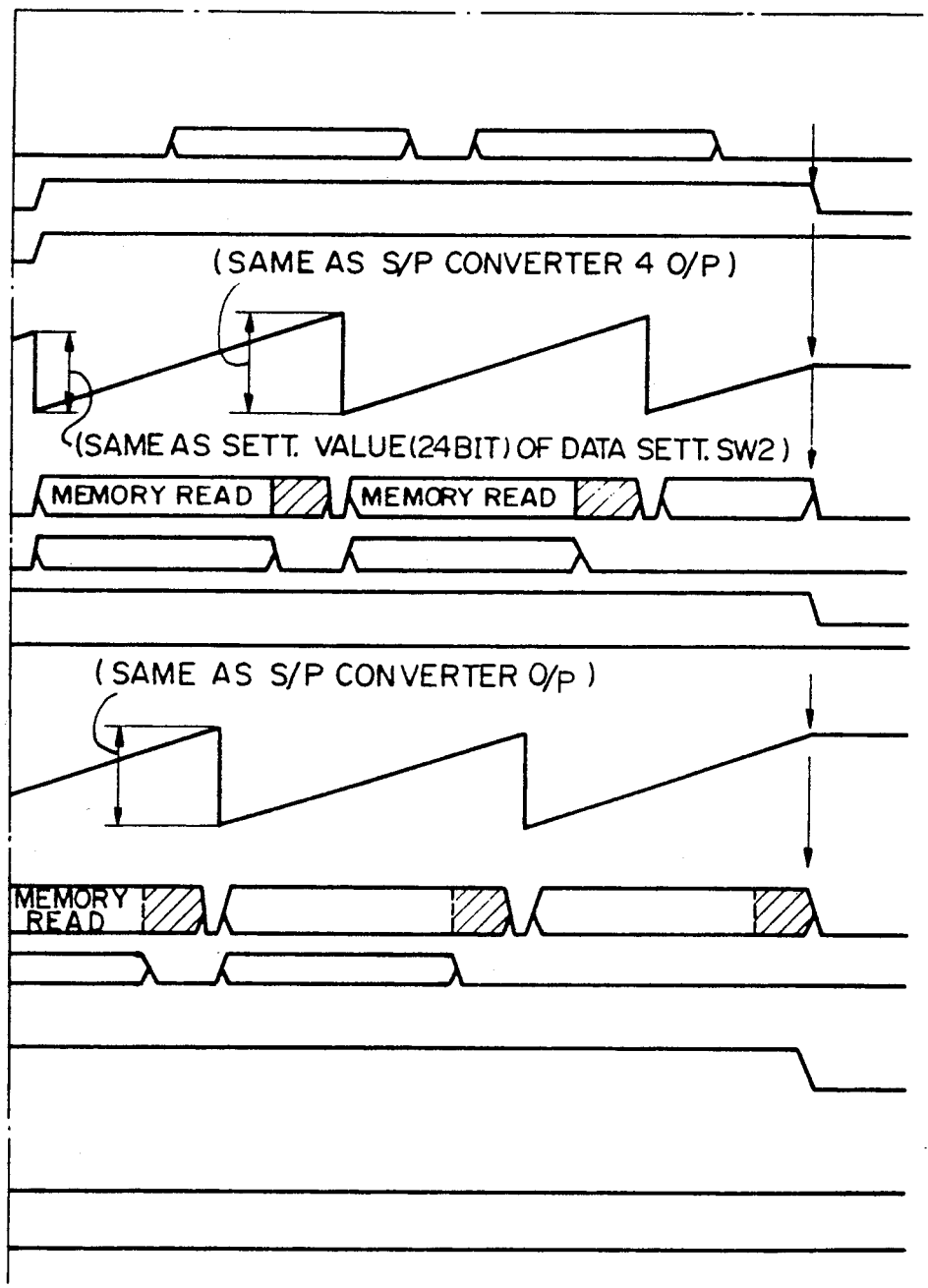
Figure 27A:
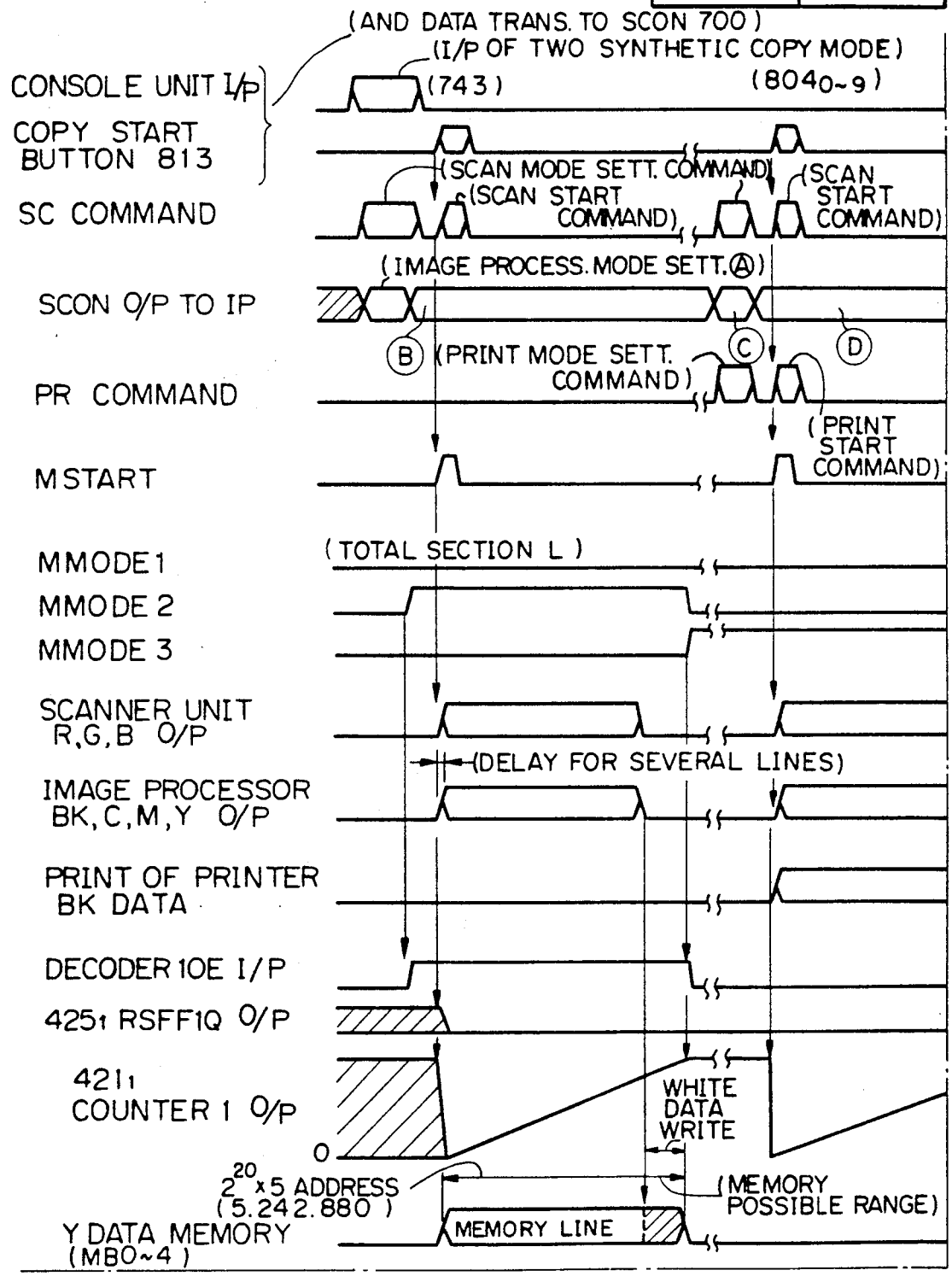
FIGS. 27a-27d are timing charts for the synthesis copy mode.
Figure 27B:
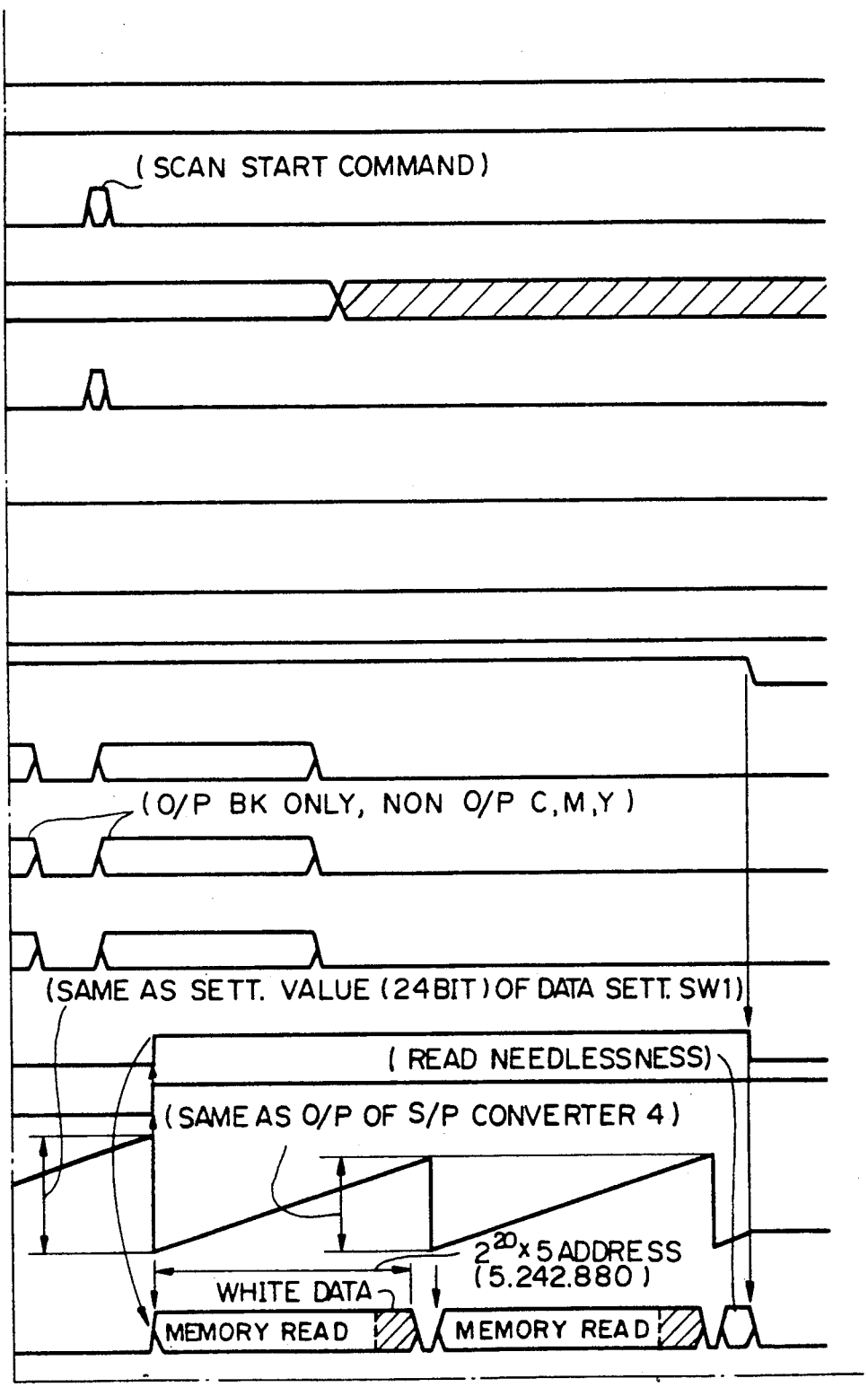
Figure 27C:
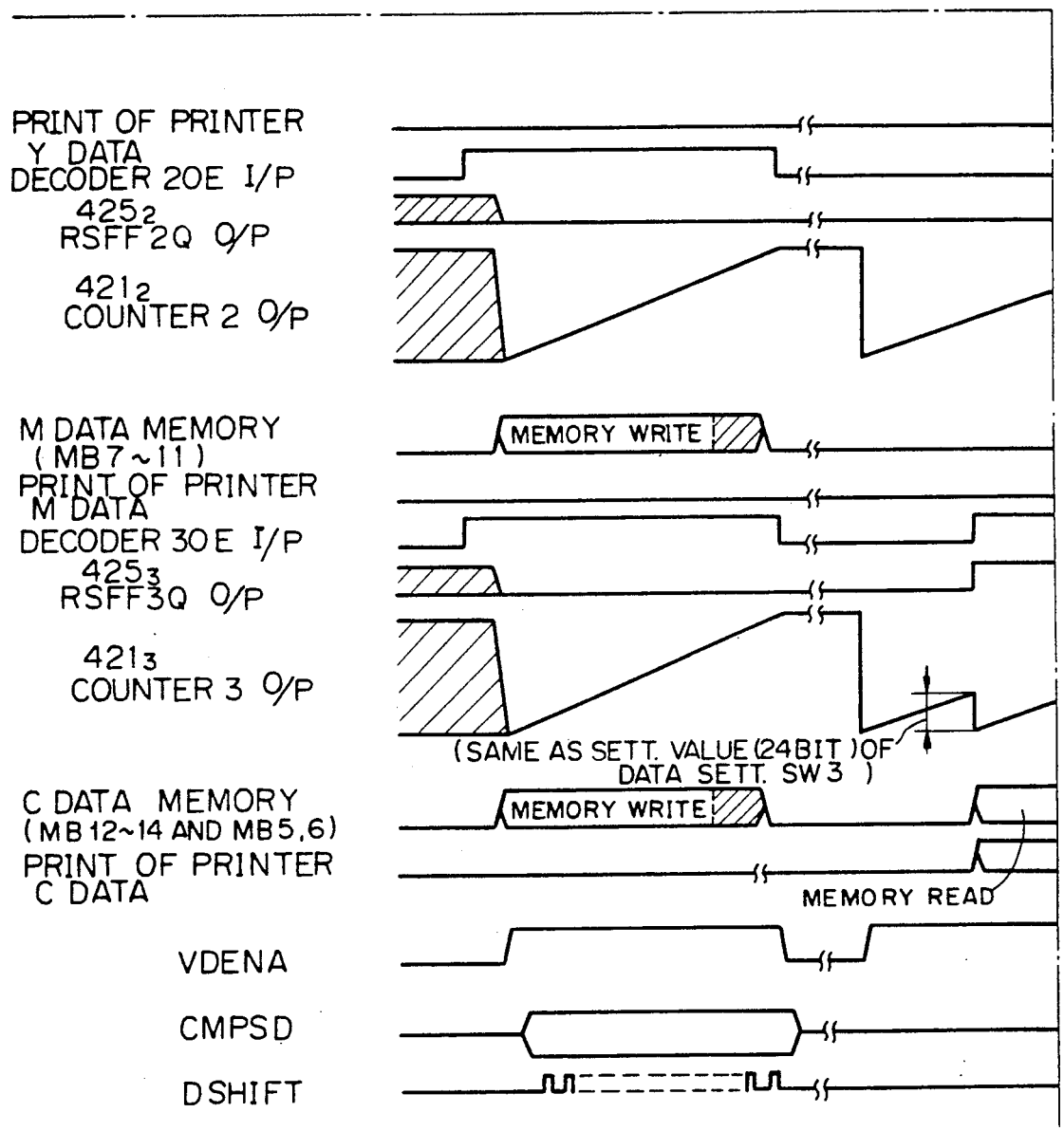
Figure 27D:
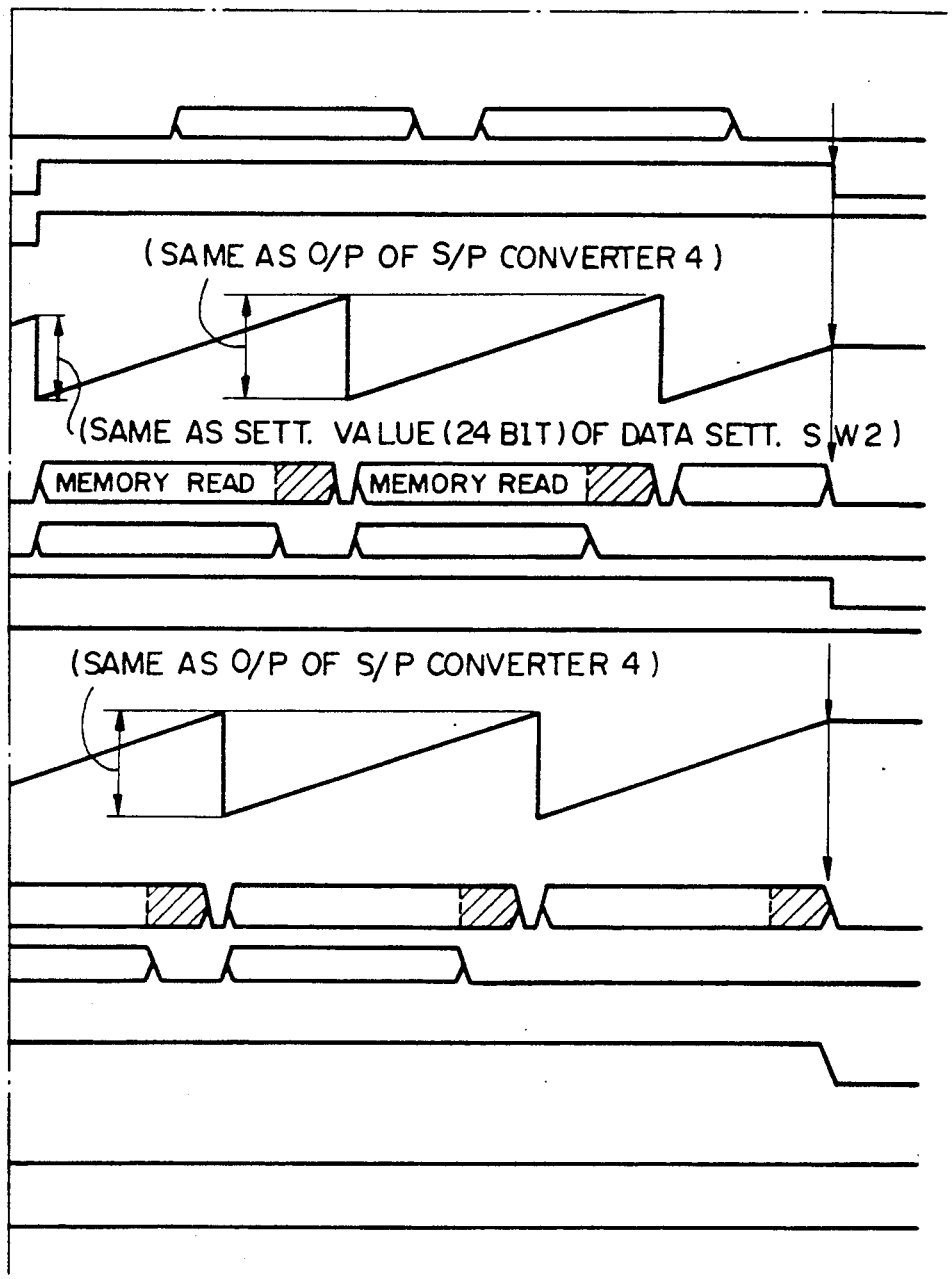

FIG. 26 is a timing chart for the high speed copy mode, which illustrate the timing in the case of preparing two sheets of copies. In CU 750 shown in FIG. 24, if High button 767 is pressed, CU 750 puts on by itself the display 767a and, the information is, directly, sent to SCON 700. Successively, when Start button 813 is pressed, the information is also sent directly to SCON 700.

SCON 700 sends "SET SCAN MODE" command to SC 100 if necessary. If a previous setting is required for IP, the data (a) described above is sent. Then, the data (b) is outputted to IP 200 making the MMODE 2 of MU 400 High and "START SCAN" command is sent to SC 100. When SYS-L-CTR counts by the number of processing delay LSYNC of IP 200 (nIp), MSTART signal is sent by one shot to MU 400.

In this way, the image data is at first stored in MU 400 and the storeable sub-scanning length is as below:

$$\text{each color}: \frac{60 \text{ Mbit} (= 18,874,380)}{297 \times 16 \times 16 \times 3} = 275.8 \text{ mm}$$

- Main scanning length
- Density of main scanning picture element
- Density of sub-scanning picture element
- Density information (octanary value) for 1 picture element This corresponds to 0 to 5,242,879 converted as the addressing of address counters $421_1$–$421_3$. The store length in the sub-scanning direction can be increased by adding memory blocks MBA, MBB and MBC and adding a chip select circuit in FIG. 8.

When "4-COLOR" display 769a is put on in CU 750, 769a is put off when the High button 767 is pressed and "3-COLOR" display 768a is put on.

Further, when SCON 700 outputs the data in (b) to IP 200 in the 3 color mode, UCR signal outputs Low.

Meanwhile, "SET PRINT MODE" command is sent to PR 600 in which "BK output disable" information is included.

When all of image data are stored in MU 400, SCON 700 makes MMODE 2 Low, MMODE 3 High in MU 400, generates MSTART pulse and also sends "START PRINT" command to PR 600. Then, the counter 1 to 3 ($421_1$–$421_3$) in MU 400 start increment from 0, and output data from the counters the counted value of which coincides with that of the data setting switch $416_1$–$416_3$ from the memory that the counter addresses to PR 600. Output is in the order of C, M and Y.

In each of the counters $421_1$–$421_3$, comparison from the next step is the parallel output value from S/P converter 440 and the procedures are repeated.

In FIG. 26, each of the time scales is down longer for the sake of easy observation. Actually, the timing for the sending of "START PRINT" command or generation of MSTART pulse (t1) is preferably generated after the processing of the effective data for SC 100 by IP 200.

Furthermore, the setting value for S/P converter is preferably reduced to the extreme of the effective data range (providing that the setting value has to be an integer multiple of the address 1188 used in one main scanning line X=4752 picture element ×¼).

With the procedures as described above, since there is no need for waiting printing for the SC 100 returning time upon preparing a great amount of copy, the copy producing speed can remarkably be improved.

Assuming the speed for preparing copies in the fundamental copy mode as described (1) above for A4 size as 20 CPM, it is about 26 CPM in this mode.

For MU 400, the CMPSD data 24 bits have previously been sent before the second MSTART pulse as shown in FIG. 20.

As has been described above, when the High button 767 (high speed copy mode input means) in FIG. 24 is released, it operates in the fundamental copy mode (1), whereas when High button 767 is pressed (set), it operates in the high speed mode (2).

Further, when 3 color button 768 in FIG. 24 is pressed to set the 3-full color mode, copies can be produced either by the fundamental copy mode (1) or by the high speed copy mode (2), in which the number of copies can be inputted by an operator with the number of not more than 999 by means of ten key 816-0 to 816-9 and the display is made on the display 820. The display 821 conducts display for the number of copies having been prepared.

As has been described above, the copy producing speed in the fundamental copy mode is about 20 CPM at A4 size, while the copy producing speed in the high speed copy mode is about 26 CPM for the same size and, accordingly, for preparing N number of copies in A4 size, it requires about $60/20 \times N$ (sec) in the fundamental copy mode, while about 2.4 (SC scanning time)+$60/26 \times N$ (sec) respectively.

Accordingly, the speed is higher in the fundamental copy mode during N=1 to 3, whereas the high speed copy mode is faster at N=4 or greater. For instance at N=4 the speed is 12 sec in the fundamental copy mode and 11.63 sec in the high speed copy mode. The judgement is conducted by SCON 700 and it operates in the fundamental copy mode as it is at N=1 to 3, whereas it operates in the high speed copy mode at $N \geq 4$.

Figure 42B:
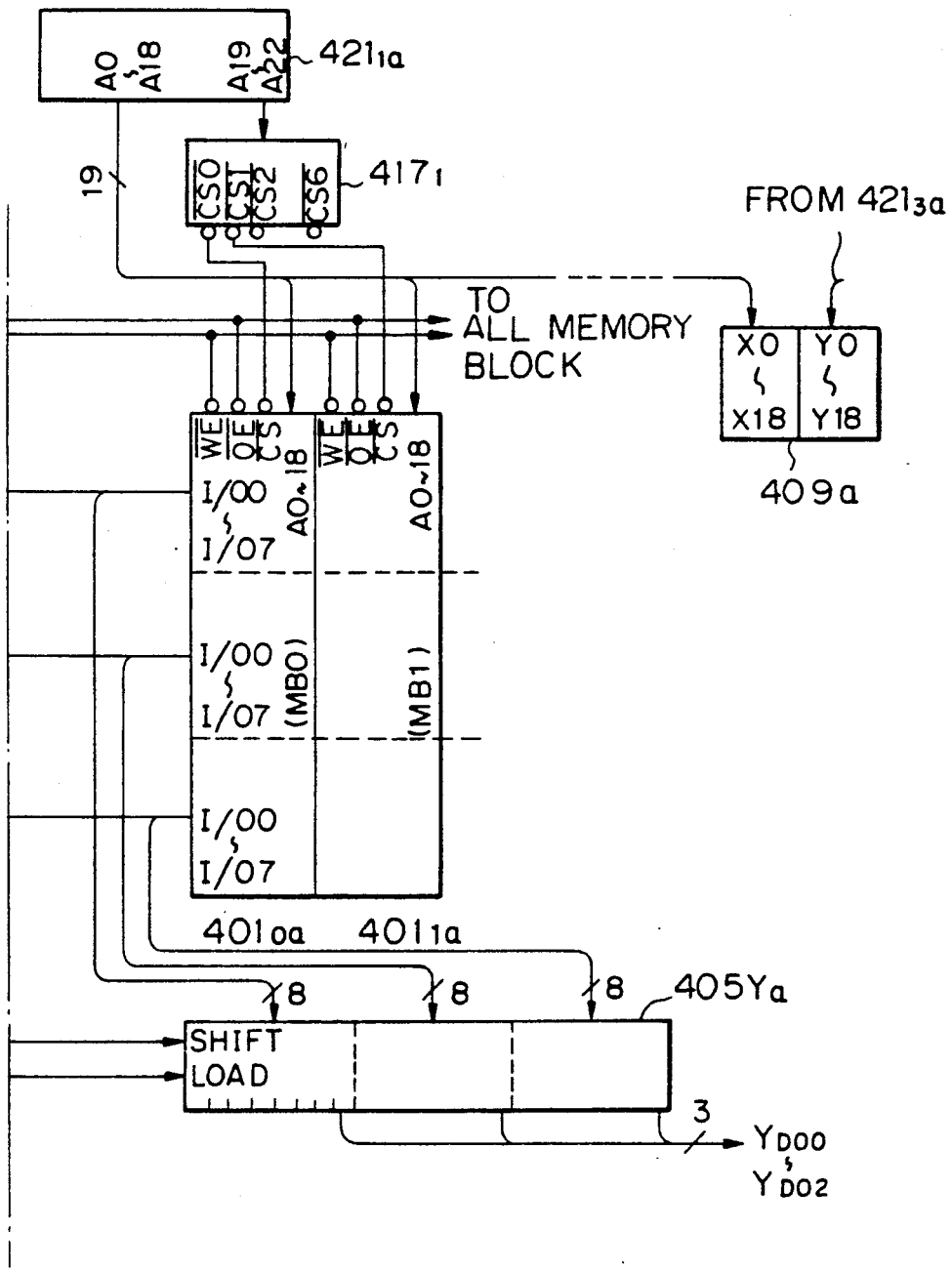

Furthermore, the sub-scanning length recorded on transfer paper is restricted in case it is shorter than the shortest period in the memory mode 1 (MMODE 1:RWMODE) of the memory unit MU 400 (corresponding to 110 mm of C data in FIG. 8 and FIG. 42). In the case of preparing 3-full color copies by N number of sheets, the scanner unit SC 100 and the memory unit MU 400 are operated in the memory mode 1 (RWMODE) for the first print while printing by PR 600 simultaneously. Then, after the second and the subsequent cycles, SC 100 is stopped and MU 400 is operated in the memory mode 4 (MMODE 3:RMODE).

Since printing is conducted also during scanning of SC 100 in the high speed copy mode, copy is prepared by the shortest time for all of the number of sheets N.

When SC 100 scans the original and image data processed in IP 200 is stored in MU 400, it is of course possible to obtain a single color copies or 2 color copy by properly controlling (L) MAX, C-GATE 207C, M-GATE 207M, Y-GATE 207Y, etc. of the block 204 in IP 200 by SCON 700.

Although it is possible for a 4 full color copy including BK by disposing a memory for BK in addition to the constitution described above, it increases the cost.

(3) Synthesis copy mode

In this mode, when N sheets of copies in each of which first and second originals are overlaid are prepared;

SC read scanning for N−1 times, and
PR printing operation for N cycles times are conducted.

In the SC read scanning for a first time, reading for the first original and image processing therefor are conducted and the image data are stored in MU 400 in MMODE 2.

In the SC read scanning for second to Nth, reading for a second original and image processing therefor are applied, transmitted from the BK output of IP 200 to BK input of PR 600 and, simultaneously, stores data are outputted in MMODE 3 from MU 400 to C, M, Y input of PR 600 to prepare a synthesized copy.

FIG. 27 is a timing chart for the synthesis copy mode, which shows the timing in the case of preparing two sheets of synthesis copies.

When Overlay button 793 is pressed by CU 750 in FIG. 24, the display 1 (793b) is directly put on and the information is transmitted to SCON 700. In this case, if 4 color display 769a is displayed, CU 750 puts off 4 color display 769a and blinks 3 color display 768a (repeating put ON and off). Then, it is transmitted to SCON 700 that this is 3 color printing. Successively, if a Start button 813 is pressed, it is directly transmitted to SCON 700.

SCON 700 sends "SET SCAN MODE" command to SC 100 if necessary and also sends data in (a) to IP 200 if previously set data is also necessary. Successively, SCON 700 sends data in (b) to IP 200. In this case, since a 3 color copy system is adopted, UCR signal is kept Low (UCR is not executed). Then, MMODE 2 is turned High in MU 400.

"START SCAN" command is sent to SC 100. When SYS-L-CTR counts by the number of delayed LSYNC processed in IP 200, i.e., MSTART pulse is sent to MU 400. Then, the data after the image processing for the first original is stored in MU 400. When SYS-L-SYNC of SCON 700 counts LSYNC corresponding to the effective sub-scanning length, SCON 700 sends a message "FIRST ORIGINAL HAS BEEN READ" to CU 750.

Upon receiving the message, CU 750 puts off the Overlay display 793b and, also Color display 768, blinks DK display 770 and puts ON Overlay display 2 (793a). The message from SCON 700 to CU 750 is not shown in FIG. 27.

SCON 700 sends "SET SCAN MODE" for the second original to SC 100 and sends data (c) if necessary to IP 200 and then sets data (d). The data (d) includes also CGATE=Low, MGATE=Low, YGATE=Low.

MMODE3=Low and MMODE3=High are outputted to MU 400. As shown in FIG. 20, CMPS data 24 bit is also sent. Further, various kinds of "SET MODE" commands are sent to PR 600.

Then, when Start button 813 on CU 750 is pressed again, the information is instantly transmitted to SCON 700, and SCON starts SYS-L-CTR again and sends a start command to SC 100. When it counts by the delayed number of LSYNC, i.e., nIp for IP processing, it sends MSTART pulse to MU 400 and "START PRINT" command to PR 600.

When SYS-L-CTR in SCON 700 reaches a predetermined value, it starts SYS-L-CTR again and sends "START SCAN" command to SC 100 to conduct the same process.

In this case, since two sheets of copies are prepared, when BK data for the second sheet has been transmitted from IP 200 to PR 600, SCON 700 sends message "COPY COMPLETE" to CU 750. CU 750 receives this message and conducts the same operation as that when the Overlay button 793 is pressed at first.

As has been described above, it is possible to prepare the first original in 3-full color while the second original in BK on an identical transfer paper.

If the first document has color images, it is possible to select C, M, Y, R, G, B or BK by pressing the Monocolor button 770 in a state where 3 color display 768 is in blinking. In the case of R, G, B and BK, it is possible to eliminate color separation processing by further pressing a color sep button 771 (in this case, the display 771a is put off to indicate that no color separation is conducted) thereby.

For instance, when R, Color sep not-display are selected, the information is transmitted from CU 750 to SCON 700. SCON 700 outputs MAX=High, CGATE=(BKGATE)=Low, MGATE=YGATE=High in IP 200, and applies image processing to store M, Y data at identical values within MU 400. For the Cdata, data corresponding to blank (111B for all address) are stored and, after all, M, Y data and BK for the second original are printed to obtain a 2-color synthesized copy for R (red) and BK.

(4) Sub-scanning direction mirroring copy mode

In this mode, when N sheets of copies each with sub-scanning direction mirroring are prepared, the following operations are conducted:

SC Read Scanning for One Sheet:

In this case, IP 200 conducts image processing and MU 400 stores the image data while decrementing from higher to lower addresses (contrary to the foregoings) in MMODE2.

Printing Operation for N Times:

In this case, MU 400 outputs data while incrementing from lower to higher addresses in MMODE 3.

Figure 28:
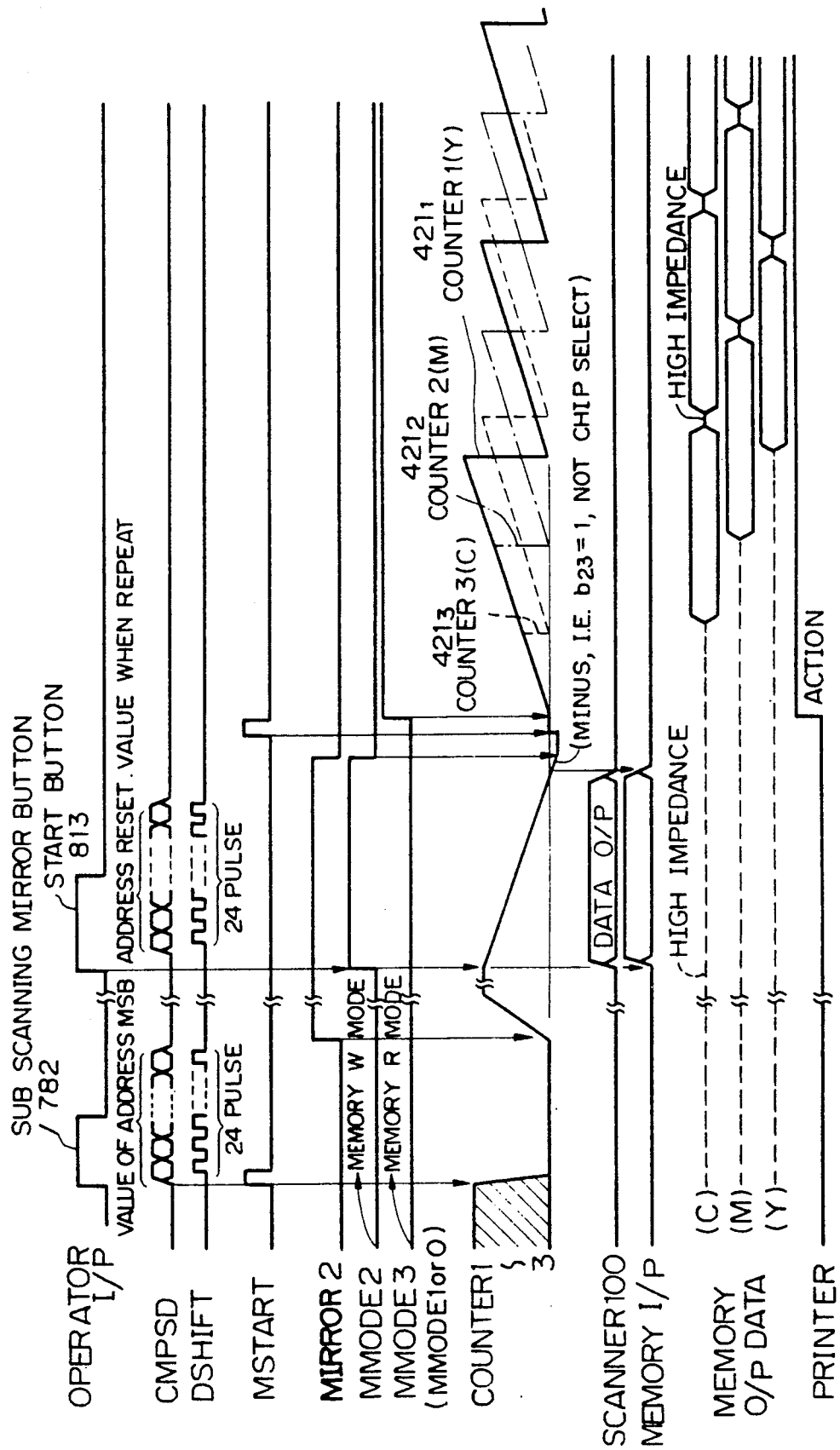
FIG. 28 is a timing chart for the mirroring copy mode in the sub-scanning direction.
Figure 29A:
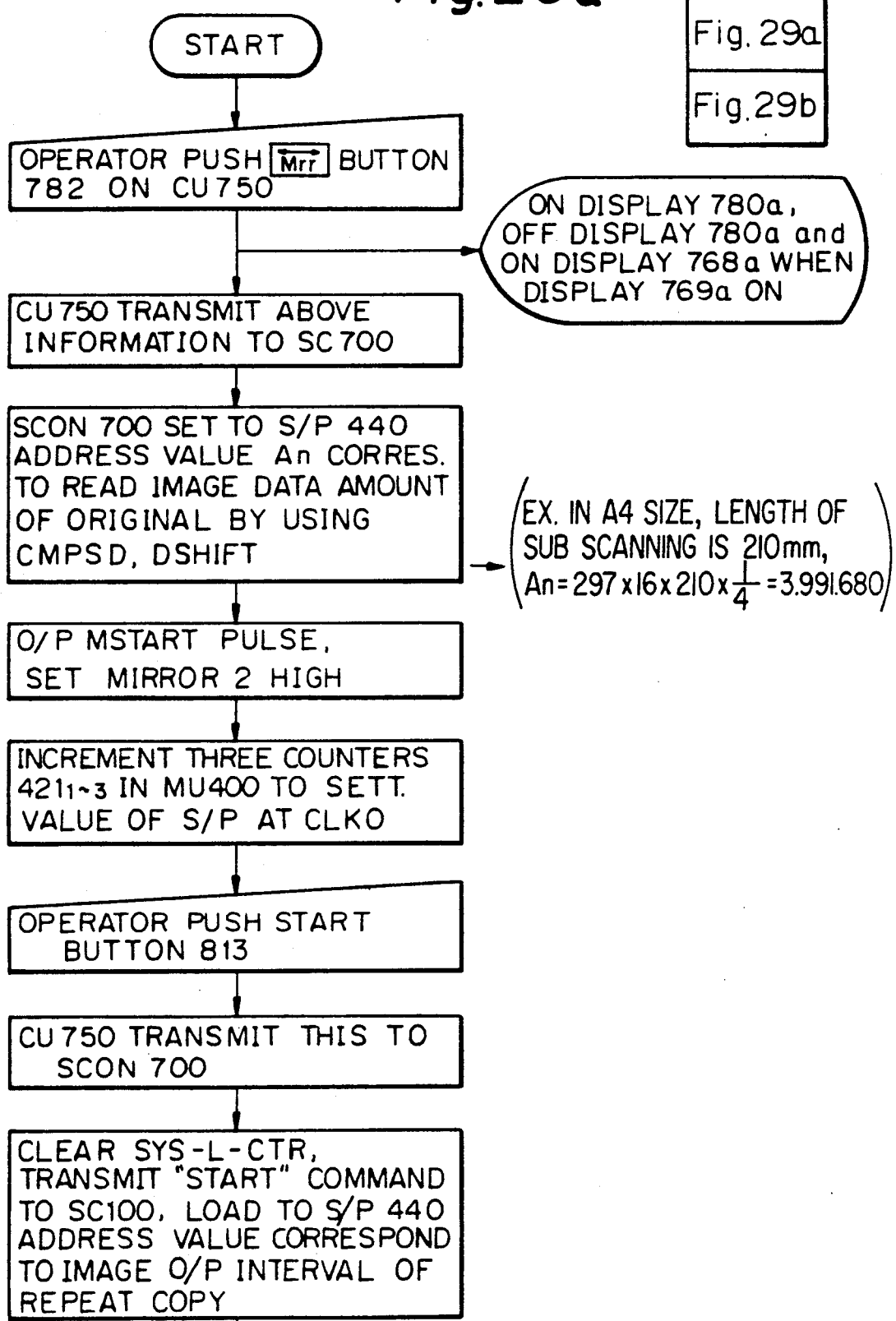
FIGS. 29a and 29b are a flow chart for the mirroring copy in the sub-scanning direction.
Figure 29B:
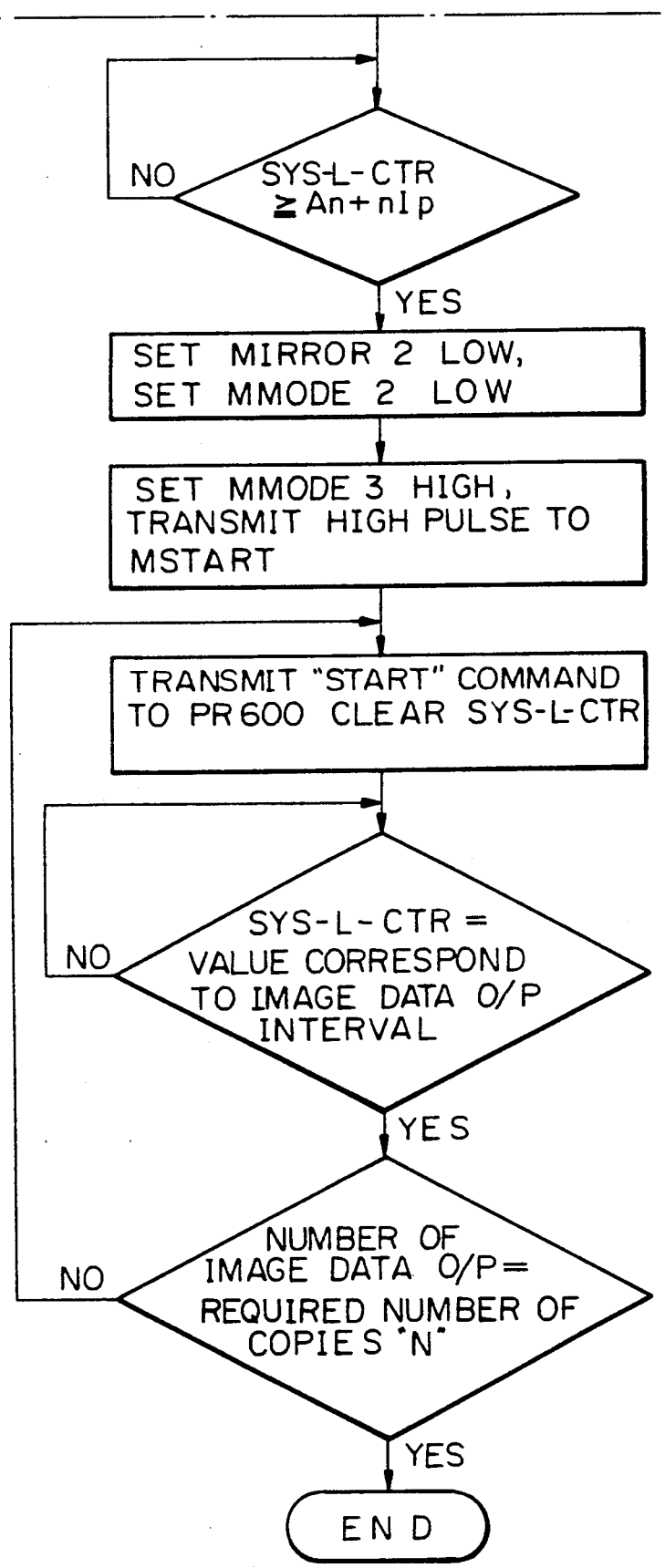

FIG. 28 is a timing chart and FIG. 29 is a flow chart therefor.

After loading 24 bit data to S/P 440 for the first time, when MIRROR 2 is turned High, since output of OR gate 443 is Low, output (0) of the comparator $425_1$ is Low and MMODE 2=Low, the gate 442 and OR gate 441 output the same continuous pulses as CLKO.

Further, since the output of NAND gate 444 is High, output of AND gates $429_1$ to $429_3$ are High and, accordingly, the counters 1 to 3 ($421_1$ to $421_3$) operate in the counter-up mode.

When each of the counters is incremented by CLKO pulses of OR gate 441 and A input to the comparator, that is, the output value of S/P converter 440 coincides with the output value of the counter 1, the comparator issues a High output and thereby turns the output of the gate 442 Low. Accordingly, pulses are inputted no more to the CLK input of the counter to keep the counter value as it is. Further, the counters $421_1$ to $421_3$ show a common value.

Then, when MMODE 2=High, 2 inputs of NAND gate turn Low and, accordingly, its output turns High, output of AND gates $429_1$ to $429_3$ goes Low, in which the counters $421_1$ to $421_3$ operate in the count-down mode. Accordingly, if SC 100 and IP 200 are operated in this state, mirrored image in the sub-scanning direction of the original is stored in MU 400.

The printing operation is the same as in the case of the high speed copy mode in (2) above.

In the foregoing case, the image data is applied with mirroring upon data input to the memory, but it may, alternatively, be adapted such that the image data is stored forwardly upon inputting the data to MU 400, while outputted from higher to lower addresses when the data is outputted to PR 600.

When the counters 1 to 3 ($421_1$ to $421_3$) are presettable up-down counters, the time for setting An (address value corresponding to the amount of image data of an original to be read) can be reduced to an extremely short period of time.

FIG. 30 is an explanatory view for the copy in the sub-scanning direction mirroring copy mode described above, in which (a) shows an original image of the original, while (b) shows a copy after applying mirroring.

As shown in the figures, a copy (b) in a mirror image relationship with respect to the original image (a) of the original, that is, the image which is inverted in the sub-scanning direction of the original can be obtained in the mirroring copy mode.

The mirroring copy mode in the sub-scanning direction is set by pressing the sub-scanning mirror button (Mrr) 782 shown in FIG. 24.

The reading of MU 400 in the opposite direction can be executed by reversing the addressing direction by changing the inputs to up/down (U/D) terminals of the address counters $421_1$ to $421_3$ in FIG. 8.

In a situation where the sub-scanning mirror button 782 is released, it is in the fundamental copy mode.

If a memory for BK is added, a 4-full color copy mode is also enabled but it increases the cost.

(5) Sub-scanning Direction Symmetric Copy Mode (1)

Assuming the sub-scanning length of an original as 1s and, the sub-scanning length for a reproduced image is 2 1s, the same copy image as the original image is from the beginning of the sub-scanning to 1s, while a copy image mirrored in the sub-scanning direction of the original is prepared from 1s to 2 1s for the transfer paper in this mode. For preparing N sheets of copies, scanning for SC 100 is conducted for once and N times of printing operation is conducted.

FIG. 31 is a timing chart in the symmetric copy mode in the sub-scanning direction.

Scanning with SC 100, processing with IP 200 and storing of image data to MU 400 are the same as those in the case of a high speed copy mode (2) described above. When image data is outputted from MU 400 to PR 600, SYMMETRY 2 outputs of MU 400 are kept High by SCON 700. Further, a high pulse is previously outputted before MSTART. In this state, Q outputs from RSFF $447_1$ to $447_3$ are Low and, accordingly, outputs from NAND gate $448_1$ to $448_3$ are High, while output from the inverter 446 is Low. Further, both of 2 inputs of AND gate 429 are High and, accordingly, counters $421_1$ to $421_3$ turn into the count-up operation mode.

When MMODE 3 is turned High from this state, the output of OR gate 437 is High and, if VDENA is turned High, the Q output of DFF 436 is High at next LSYCN to output ACLK from AND gate 438.

Respective counters are incremented by ACLK and, when they coincides with B input to respective comparators $415_1$ to $415_3$, the counters $421_1$ to $421_3$ and the decoders $417_1$ to $417_3$ are successively output-enabled to output image data to PR 600.

Then, when the counters $421_1$ to $421_3$ increment again from 0 and, when they coincide with A side inputs of the comparators $425_1$ to $425_3$ (=output of S/P 440) respectively, S inputs of RSFF $447_1$ to $447_3$ are successively formed and then each of the Q outputs turns Low. Accordingly, outputs of $429_1$ to $429_3$ also turn Low successively, and the counters $421_1$ to $421_3$ are successively turned to the count-down mode.

Since a counter turned to the count-down mode addresses the memory for the lower direction, this means that mirror images are outputted to PR 600 in this case.

When respective comparators $425_1$ to $425_3$ output coincidence output High, since the inputs of AND gates $432_1$ to $432_3$ connected to the inverter 446 are Low, CLR signals for the counters $421_1$ to $421_3$ are not generated.

When the value of SYS-L-CTR reaches a value corresponding to the output of the effective data is completed to the latest, SCON 700 again sends "START" command to PR 600 and, upon generation of MSTART pulse, printing operation for the second sheet is started and the same operations as described above repeated.

This mode is set in a state where button 776 on CU 750 is pressed only once and the display 786a is lighted up.

The copy in this mode can also be attained in the fundamental copy mode (1) above by scanning the carriage 8 of SC 100 as shown in (A) of FIG. 25.

(6) Sub-Scanning Direction Symmetric Copy Mode (2)

Assuming the sub-scanning length of an original as 1s and, the sub-scanning length of a reproduced image as 2 1s, in this mode, a mirrored image of the original in the sub-scanning direction is printed from the beginning of the sub-scanning, while the same image as that of the original is prepared for the portion of 1s to 2 1s on transfer paper. N sheets of copies sheets can be prepared by conducting scanning of SC 100 once and N times of printing operation.

During scanning of SC 100, scanning with SC, processing with IP 200 and storage of image data to MU 400, which are quite the same as those in the sub-scanning direction mirroring copy mode in (4) above are conducted and the printing operation is conducted quite in the same way as that in the sub-scanning direction symmetric copy mode (1) in (5) above.

This mode is set by pressing the button 786 on CU 750 thereby putting off the display 786b.

Alternatively, the copying operation in this mode can also be attained in the fundamental copy mode (1) described above by scanning the carriage 8 of SC 100 as shown by (B) in FIG. 25.

As has been described above, when the setting button (Sym) 786 for sub-scanning direction symmetric copy mode is pressed and sub-scanning direction symmetric copy mode is set, the sub-scanning direction symmetric copy mode (1) as described in (5) above is attained, by which a sub-scanning direction symmetric copy (b) is obtained in which the image of the original (a) situates on the upstream in the sub-scanning direction of copy, while a mirrored image of the original (a) is situated side by side on the downstream thereto as shown in FIG. 32.

Further, when the mirroring copy button (Mrr) 782 in the sub-scanning direction is pressed together with the setting button (Sym) 786 to set the sub-scanning direction mirroring copy mode, the sub-scanning direction symmetric copy mode (2) as described in (6) above is attained to obtain a copy (b) in which a mirrored image of the original (a) in the sub-scanning direction is situated upstream in the sub-scanning direction, while a copy (b) just the same as the image of the original (a) is situated side by side on the downstream as shown in FIG. 33.

In the mode described above, the original image or mirrored image may of course be applied with multiple magnification processing.

The addressing direction switching means for the memory comprises flip-flops $447_1$ to $447_3$, NAND gates $448_1$ to $448_3$, 24 bit comparators $425_1$ to $425_3$, AND gates $427_1$ to $427_3$, OR gates $428_1$ to $428_3$ and AND gates $429_1$ to $429_3$ shown in FIG. 8 and the switching is conducted by applying signals indicating up or down to the up/down (U/D) terminal of the counters $421_1$ to $421_3$.

The control described above is conducted by SCON 700.

When the sub-scanning direction symmetric copy mode is released, it is in the fundamental copy mode in (1) above and, by setting other mode buttons, it operates in each of the corresponding modes.

It is also possible to operate the apparatus as 4-full color mode by adding a memory for BK, but it increases the production cost.

(7) Sub-scanning Direction Swap Copy Mode

In this copy mode, assuming the sub-scanning length of an original as 1s and an optional position of the original in the sub-scanning direction as $1 \times (0 < 1 \times < 1s)$ in this mode, a copy is prepared such that the image between 1x to 1s of the original is reproduced between 0 to (1s to 1x) of the transfer paper, while the image between 0 to 1x of the original is reproduced between (1s to 1x) of the transfer paper. N sheets of copies can be prepared by conducting scanning with SC 100 once and printing operation for N times.

For setting this mode, the button 784 on CU 750 is depressed. Then, CU 750 puts on the display 784a and, simultaneously, displays "INPUT SWAP POSITION" on LCD display 751.

Successively, when an operator inputs a numeral value, for example, "85" by ten keys $816_1$ to $816_9$ and then presses enter key 808, LCD display displays as "SWAP POSITION 85 mm". Till the pressing of the start button 813, the numeral value is set to one-half of the length of the transfer paper in the sub-scanning direction. The information is transmitted from CU 750 to SCON 700, SCON 700 outputs one pulse, MSTART, to MU 400 and sends a memory address value corresponding to the swap position to the S/P converter 440 of MU.

For instance, if the value is 85 mm, the value: $297 \times 16 \times 85 \times 16 \times \frac{1}{4} = 1,615,680$ is sent by serial 24 bits. Then, SWAP 2 signal is turned High. Then, the output of OR gate 443 turns High and, like the sub-scanning direction mirroring copy mode (4) above, counters $421_1$ to $421_3$ count up to the output of S/P 440 and stop. Then, a memory address value corresponding to the sub-scanning length of the original, for example, 210 mm of A4 size is set to S/P 440. For 210 mm, it is a value: $297 \times 16 \times 210 \times \frac{1}{4} = 3,991,680$. Then, when the start button 813 is pressed, "START" command is sent to SU 100 and, when it counts up to SYSL-CTR=nIp, the output of MMODE 2 is turned High.

Then, the memory stores the image data from the top end of the original successively from the address for the initially counted value (1,615,680 in this example). Then, when the counter 421 reaches the second S/P setting value (3,991,680 in this embodiment), the comparator $425_1$ outputs High to 0 terminal, AND gate 445 outputs High, to turn the output of OR gates $430_1$ to $430_3$ High and MM $430_1$ to $430_3$ momentarily output High pulses and, accordingly, all of the counters are cleared to 0. Since ACLK is kept to be inputted continuously to each of the counters $421_1$ to $421_3$ during this period, the count-up is continued to store the image data continuously from the swap point of the original from the address 0 to higher address as successively. When SYS-L-CTR counts by the number of LSYNC for the sub-scanning length+nIp, MMODE 2 is instantly turned Low to interrupt wiring to MU 400.

In the printing operation, copy is prepared in the case of sending an address converted value corresponding to the repeating period, for example, in the case of sending the transfer paper at 270 mm interval, by setting $270 \times 16 \times 297 \times 16 \times \frac{1}{4} = 5,132,160$ to S/P 440 and generating MSTART pulse and sending "PRINT" command to PR 600.

FIG. 34 is a timing chart for the swap copy mode in the sub-scanning direction for the operation described above. In this case although (3) for CMPSD is shown in a large scale for the easy observation, it may preferably be sent actually after the completion of the data writing to MU 400.

When the image data are stored in MU 400, if the carriage 8 of SC 100 is scanned in the adverse direction as shown by (A) in FIG. 34, a copy image mirrored and swapped in the sub-scanning direction can be prepared.

FIG. 35 is an explanatory view for the original and the copy in the sub-scanning direction exchange copy mode in which (a) shows an original while (b) shows a copy.

As shown in the figure, a copy (b) in which the image on the right and the image on the left to the image of the original (a) are exchanged can easily be attained in this mode.

It is possible to prepare the exchange copy also in a 4-full color mode by adding a memory for BK, but it may increase the cost.

(8) Sub-scanning Direction Multi-Image Copy Mode

Assuming the length of the specific section in the sub-scanning direction of an original as 1s, printing is made arranging images for a plurality of specific sections side by side with no overlap in the sub-scanning direction of the transfer paper in this mode. N sheets of copies are prepared by SC scanning once and printing operation for N times.

Figure 36B:
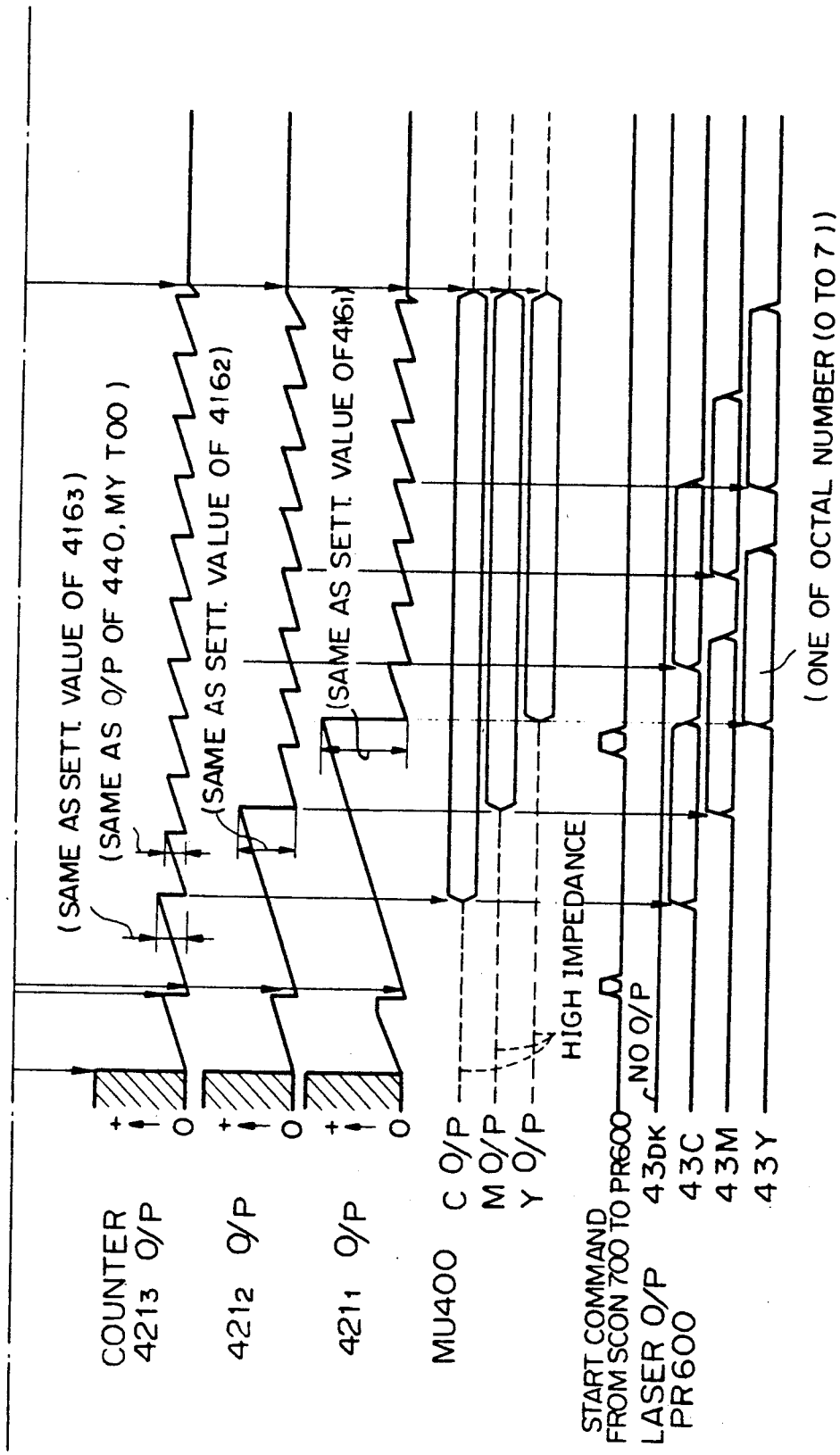
Figure 37A:
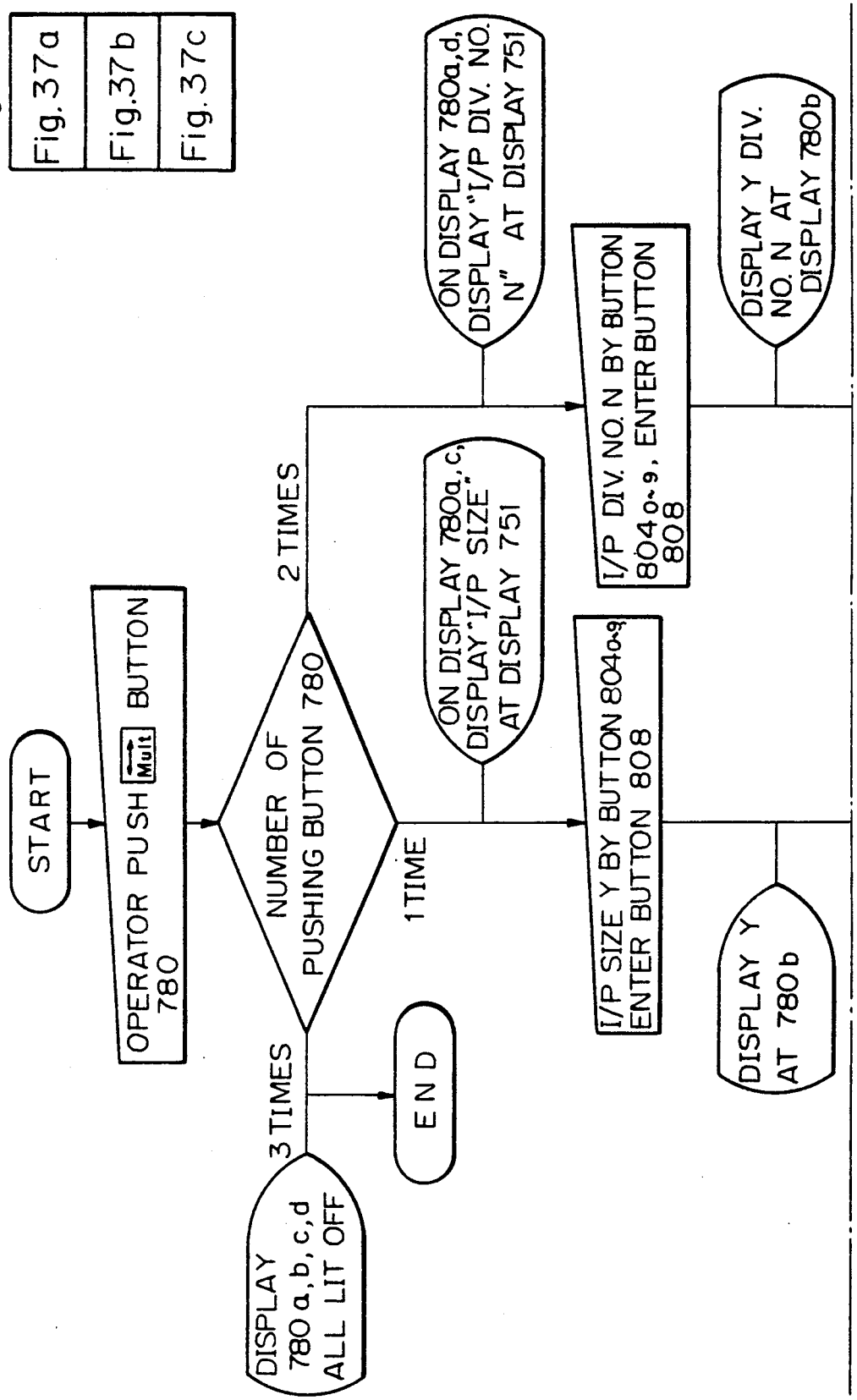

FIG. 36 is a timing chart in the case of preparing two sheet of copies in this mode and this is the case for preparing three images on one transfer paper sheet. FIG. 37 is a flow chart illustrating the operation.

As can be seen from FIG. 36 and FIG. 37, this mode is basically the same as the high speed copy mode described (2) above, except for the followings:

(1) the clear timing for the address counter upon outputting data from MU 400 to PR 600, that is, the value set to S/P converter 440 is smaller than the value corresponding to the length of the sub-scanning direction of the transfer paper, and (2) the timing of generating "START" command outputted to PR 600 is the same upon printing the first sheet, but it is different for the second and subsequent sheets. It is necessary at and after the second sheets to synchronize the top end of the transfer paper with 0 of the memory address. If it needs a time than required for taking synchronization depending on the value of y (length in the sub-scanning direction of the transfer paper: for example, 210 mm in the case of A4 size), one pulse of MSTART is outputted in the same way as the first sheet and, simultaneously, "START" command is sent to PR 600.

Further, if the scanning direction of the carriage in FIG. 36 is reversed as shown in (A), mirrored multi-image can be obtained.

Although not illustrated in FIG. 37, it may be adapted such that the size of the original, the size of the transfer paper and the number of multi-images are inputted. In this case, SCON 700 automatically can calculate the variable magnification ratio to cope with the original size and the transfer paper size.

The addressing to the memory means MU 400 in the multi-image copy mode is constituted with an address generating portion comprising counters $421_1$ to $421_3$, decoders $417_1$ to $417_3$ and MPX 418 to 420 shown in FIG. 8 and also a portion constituted with the counter 421, decoder $417_1$, MPX 409, etc. in FIG. 8.

In the multi-image mode, recording information is at first stored by energizing the memory means in the memory mode (addressing not recyclic) and, then the addressing of the memory means is recyclically energized in the output mode (when the reading is completed for a certain cycle, it returns to the beginning reading) to conduct reading for several times. FIG. 38 shows one example of an original and a copy in the multi-image copy mode.

When the multi-image copy mode is released, the copy preparing operation is made in the fundamental copy mode described in (1) above.

Further, when a 4-full color mode is set by the button 769 (4 Color button) in FIG. 24 (the display 769a is lighted up) and the button 780 as the multi-image mode input mode is pressed in this state, SCON 700 judges to release the 4 Color mode automatically and set a 3 Color mode (display 768a is lighted up).

Figure 39:
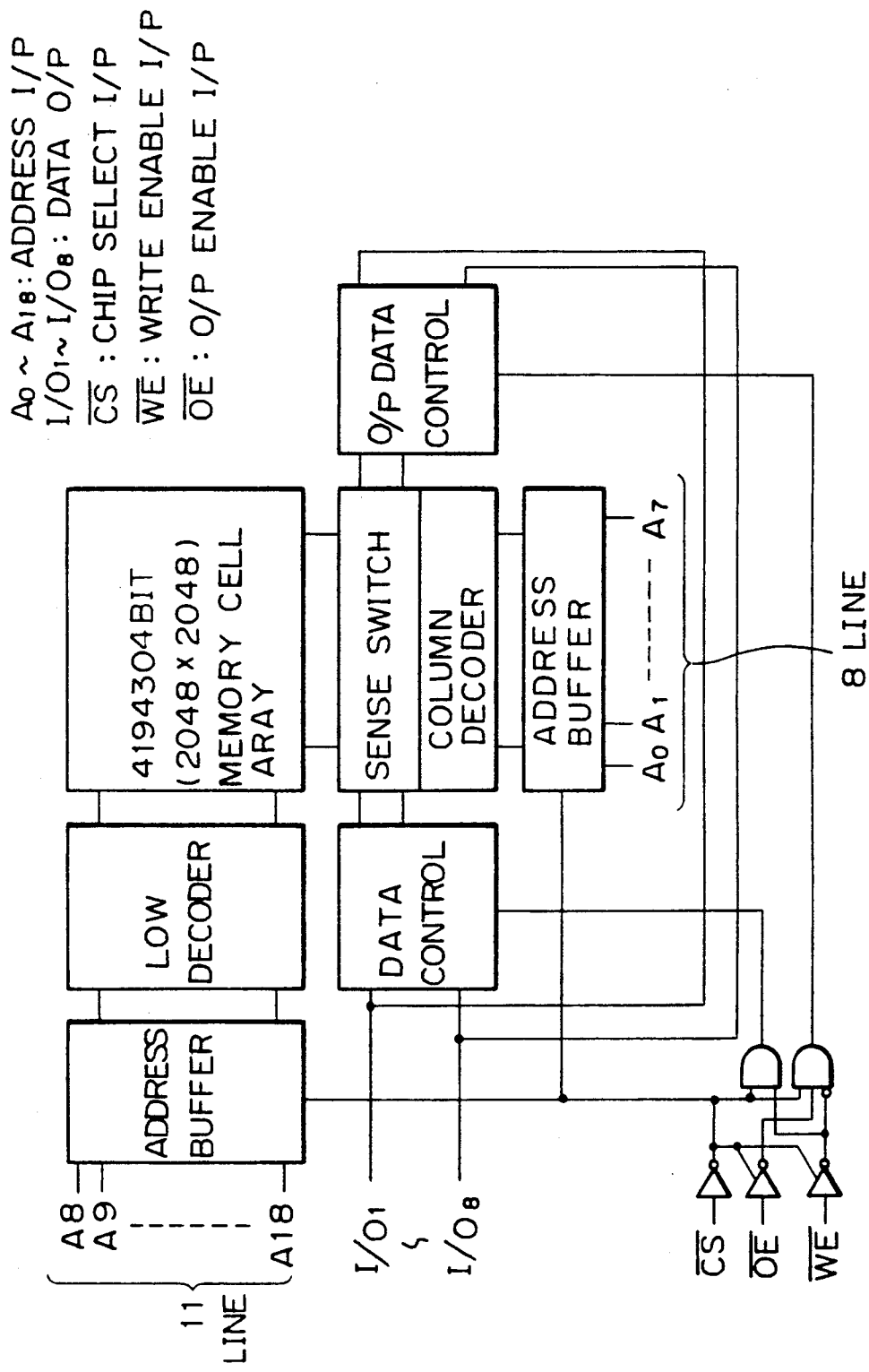
FIG. 39 is a view for the constitution of SRAM.
Figure 40:
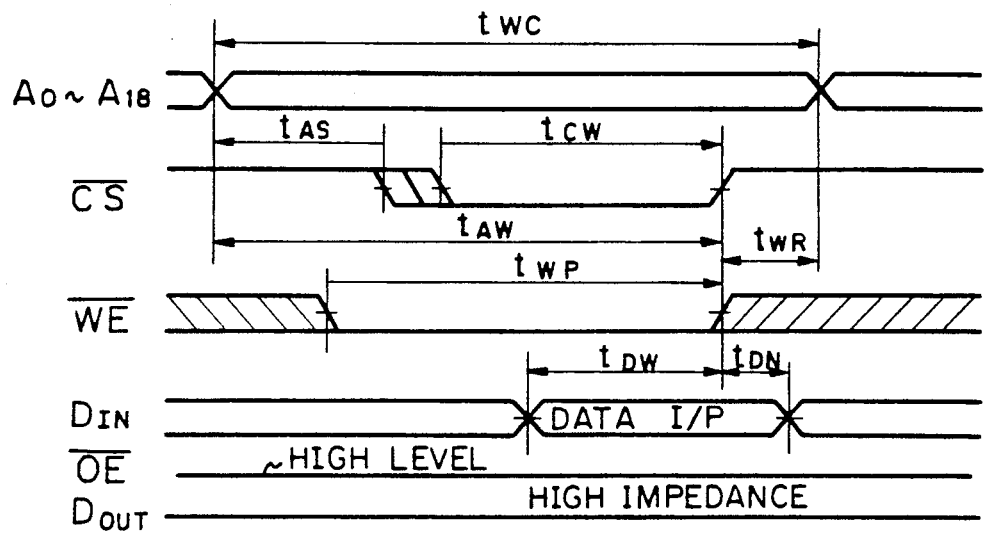
FIG. 40 is a timing chart for the writing cycle of SRAM.
Figure 41:
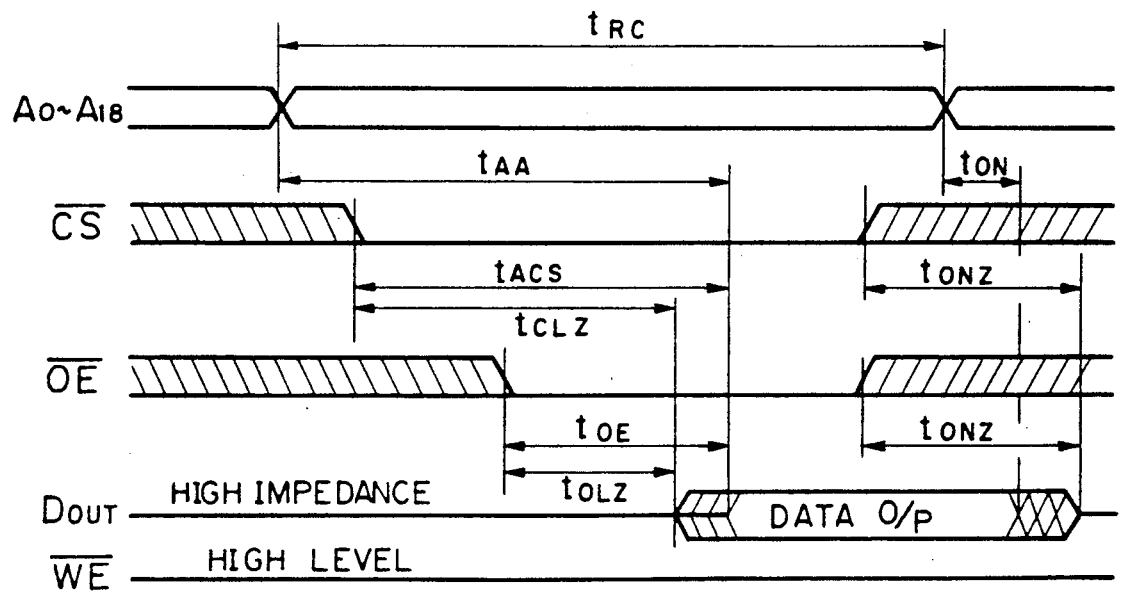
FIG. 41 is a timing chart for reading SRAM.

Although dynamic ram is used as the memory device in MU 400 in the embodiment shown in FIG. 8, MU 400 can also be constituted by replacing it with a static RAM. When the memory device having a constitution of 524,288 word×8 bit as shown, for example, in FIG. 39 is used, the write cycle timing of the device is as shown in FIG. 40, while the read cycle timing thereof is as shown in FIG. 41 respectively.

| Item | Write cycle Symbol | MIN. | MAX. |
|---|---|---|---|
| Cycle time | $t_{WC}$ | 100 | |
| $\overline{CS}$-$\overline{WE}$ reset time | $t_{CW}$ | 80 | |
| address $\overline{WE}$ reset time | $t_{AW}$ | 80 | |
| address set-up time | $t_{AS}$ | 0 | |
| write pulse width | $t_{WP}$ | 70 | |
| address hold time | $t_{WR}$ | 5 | |
| input data set time | $t_{DW}$ | 40 | |
| input data hold time | $t_{DH}$ | 0 | |
| $\overline{WE}$ output floating time | $t_{WHZ}$ | | 35 |
| $\overline{WE}$ output activating time | $t_{OW}$ | 10 | |

Unit: nsec

| Item | Read Cycle Symbol | MIN. | MAX. |
|---|---|---|---|
| cycle time | $t_{RC}$ | 100 | |
| address access time | $t_{AA}$ | | 100 |
| $\overline{CS}$ access time | $t_{ACS}$ | | 100 |
| $\overline{OE}$ Output delay time | $t_{OE}$ | | 50 |
| output hold time | $t_{OH}$ | 10 | |
| $\overline{CS}$-output set time | $t_{CLZ}$ | 10 | |
| $\overline{OE}$-output delay time | $t_{OLZ}$ | 5 | |
| $\overline{CS}$-output floating time | $t_{CHZ}$ | | 35 |
| $\overline{OE}$-output delay time | $t_{OHZ}$ | | 35 |

Unit: nsec.

FIG. 42 is a block diagram for the essential portion of another embodiment of the memory unit in the present invention. Since the overall constitution thereof is the same as that in FIG. 8, only a portion thereof is illustrated. Each suffix a shows that a reference numeral attached with such a suffix corresponds to the identical reference numeral in FIG. 8.

In the figure, since each of the memory blocks $MB_0$–$MB_{14}$ is constituted with three SRAM (shown in FIG. 39) and the total memory capacity for each of the blocks is made equal to that in the case of FIG. 8, that is, $524,288 \times 8 \times 3 = 125,812,912$ bit, each of the blocks can be regarded as 4288 words×24 bit constitution relative to 1,048,576 words×12 bit constitution in FIG. 8.

Accordingly, the lower 19 bits of the address counter $421_{1a}$ is supplied to each of the memory blocks in common, while the upper 4 bits (A 19 to A 22) are supplied to the address decoder $417_1$. This can save the number of bits for the counter by one as compared with the case of FIG. 8.

Figure 43:
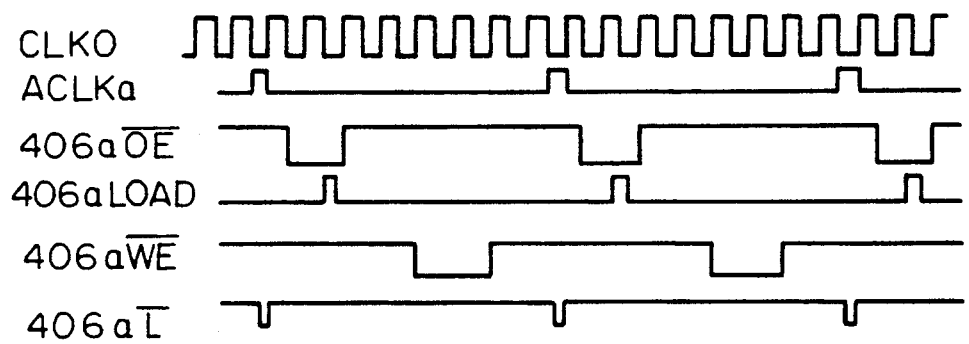
FIG. 43 is a timing chart for the operation of the timing signal generator.

FIG. 43 is an operational timing chart for the timing generator 206a in FIG. 42.

Since there is no requirement for the address input of SRAM to input at different timing to one identical terminal for ROW/COLUMN, MPx 418, 419, 420 are not necessary.

Three converters each with 8 shift steps are used such as 402 Ya as the S/P converter for data input (three devices each with 4 steps in FIG. 8).

In the same manner, the P/S converter 405Ya is constituted each with 8 step×3.

Data latch 454Y is latched upon rising from $\overline{L}$=Low to High. 454Y is a bus driver outputted at OE=Low and turned high impedance output at OE=High.

In view of the above, if the timing generator 406a is adapted to output each of the signals as shown in FIG. 43, Y data is inputted/outputted quite in the same manner as in the case of FIG. 8. The situations are the same for C, M data and, accordingly, explanations therefor are omitted.

Although a disc memory or optical disc, etc. may also be used as the memory, since the access time of R/W head is longer as compared with that of the semiconductor memory, a disc input/output buffer memory for several to several tens of lines for the main scanning line are required both for reading and writing.

Furthermore, in the case of synthesis copy mode, although the output timing for BK, C, M and Y are shown in FIG. 27 in the same case as the fundamental copy mode in (1) above, it is possible to change the output timing between BK and C, M and Y. This can be done by changing the MSTART pulse to MC 400, timing of VDENA to High, or transmission timing of "START" comman to PR 600 by SCON 700 (LSYNC is inputted to the terminal of the interrupt controller 710 of SCON 700 with the highest priority and, accordingly, it is possible to control the timing extremely correctly with SYS-L-CTR).

As a result, a synthesis copy in which positional relationship of two originals in the sub-scanning direction is deviated can be obtained. Further, the starting position for the reading of the original can actually be changed by "SET IMAGE READ RANGE" command to SC 100.

Figure 44:
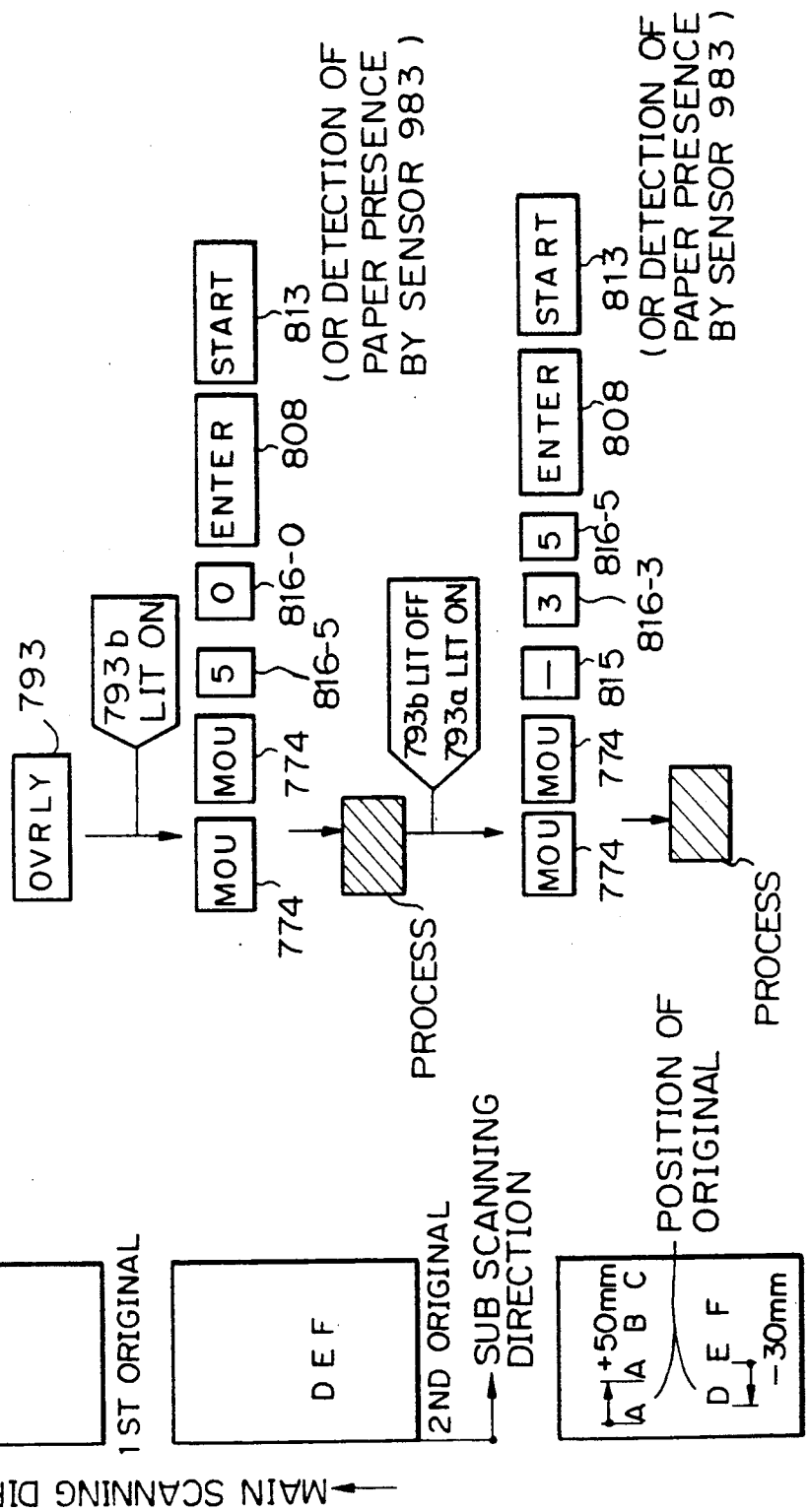
FIGS. 44a, 44b and FIG. 45 are explanatory views for the procedures of preparing a synthesis copy by varying the starting position for the reading.

FIG. 44a and FIG. 44b are explanatory views for the procedures of preparing a synthesis copy by varying the start position for image reading as described above, in which FIG. 44a is a view illustrating the positional relationship between first and second originals and a copy and FIG. 44b is an explanatory view for the operation procedures.

In the figures, input of the displacing amount between the originals by an operator can be executed by pressing Move button 774 twice in a state where the display 793b of the synthesis button (overlay button) 793 is lighted up for the first original, while the 793a is lighted up for the second original, and inputting the ten keys $816_0$ to $816_9$, button 815 and Enter button 808 in a case where the display 774b is being lighted up.

Figure 45:
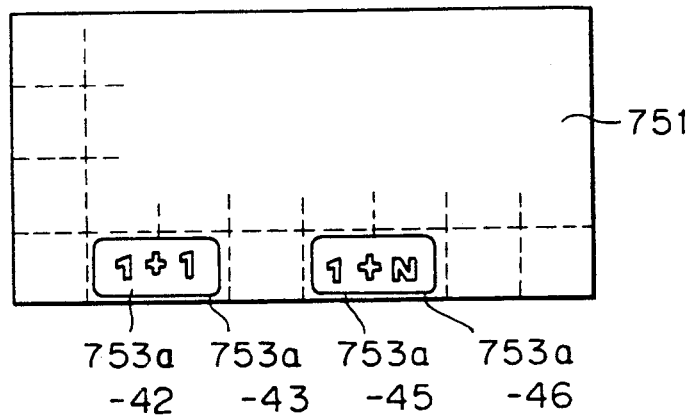

Furthermore, as shown in FIG. 45, when the synthesis button 793 is pressed and the display 793b is lighted up, display "1+1" and "1+N" are caused to blink at the LCD display 751 as shown in FIG. 45.

Corresponding to the display "1+1", there are touch sensors $253_{a-42}$ and $753_{a-43}$, while corresponding to "1+N", there are $753_{a-45}$, $753_{a-46}$ being disposed thereover. When $753_{a-42}$ or $753_{a-43}$ is pressed, or when a start button is pressed with no previous pressing, the same result as that upon pressing "1+1" can be obtained.

When $753_{a-45}$ or $753_{a-46}$ is pressed, "1−1" is put off, blinking of "1−N" is stopped and keeps it to always light up.

Then, when the start button 813 shown in FIG. 24 is pressed, reading for the first original and the storing to the memory are the same as usual. When the start button is pressed for the second time, the first original and the second original are printed in the same way, but it does not return to the step of pressing the synthesis button 793 but keeps the lighted up state of 793a. Upon pressing of the start button 813 for the third time, the same operation is conducted as the second pressing for the start button. That is, when a third original is placed on the platen 1 before the third pressing to the start button, synthesis copy for the first original and the third original can be obtained. In the same manner, synthesis copy for the second original and the fourth original—or the first original and the $N_{th}$ original can be obtained.

What is claimed is:

1. A digital color copying machine having a fundamental copy mode in which read scannings of an original are conducted N times for preparing N (N=1,2,3,...) sheets of copies and having a high speed copy mode in which a read scanning of the original is conducted one time for preparing N sheets of copies, comprising:

a) a reading means for reading an original image of an original with color separation and for outputting image signals based on said original image, b) a processing means for processing said image signals into respective recording information, c) a memory means having a first output means, a store means and a second output means, said memory means being adapted to receive recording color information selected from said processed recording information, said recording color information being less by one in number than said recording information, said first output means outputting said recording color information respectively with a delay by a respective predetermined number of picture elements corresponding to said respective recording color components, said store means for storing said recording color information selected from said processed recording information, said second output means outputting from said store means said stored recording color information with a delay by a respective predetermined number of picture elements corresponding to said respective recording color components, d) a plurality of first recording means for recording different colors on a recording medium based on said recording color information delivered from said first output means and said second output means, said different colors corresponding to said recording color information, e) a second recording means for recording a single color on said recording medium based on one of said recording information from said processing means, f) a first instruction means for instructing a setting of either said fundamental copy mode or said high speed copy mode, g) a second instruction means for instructing a start of said machine, h) a first actuating means for actuating for one time said reading means, said processing means, said first output means, said first recording means and said second recording means, depending on a start instruction from said second instruction means, when said fundamental copy mode is set by said first instruction means, i) a second actuating means for actuating for one time said reading means, said processing means and said store means, and actuating for N times for respective N sheets of copies said second output means and said first recording means, depending on a start instruction from said second instruction means, when said high speed copy mode is set by said first instruction means.

2. A digital color copying machine according to claim 1, which further comprises another instruction means for instructing a setting of a three full color copy mode and a setting means for setting automatically said high speed copy mode in a case where said three full color copy mode is set by said another instruction and a copy producing time is shorter in the enforcement of said high speed copy mode.

3. A digital color copying machine according to claim 2, wherein said second actuating means comprises means for actuating for a first sheet of copy said reading means, said processing means, said second output means and said first recording means, and for actuating for after second sheet of copy said second output means and said first recording means.

* * * * *